US012567625B2

(12) United States Patent
Patrick et al.

(10) Patent No.: US 12,567,625 B2
(45) Date of Patent: Mar. 3, 2026

(54) BIFACIAL SEALED GAS DIFFUSION ELECTRODE

(71) Applicant: FORM ENERGY, INC., Somerville, MA (US)

(72) Inventors: Meghan Marya Patrick, Somerville, MA (US); Glenn Donahey, Pittsburgh, PA (US); Erica Skye Traini, Cambridge, MA (US); William Henry Woodford, Cambridge, MA (US); Christopher Thomas Reynolds, Arlington, MA (US); Vladimir Sergeyevich Tarasov, Medford, MA (US); Nicholas McKibben, Oakland, CA (US); Christopher Evan Wood, Glenshaw, PA (US); Kalina Yang, Allston, MA (US)

(73) Assignee: FORM ENERGY, INC., Somerville, MA (US)

( * ) Notice: Subject to any disclaimer, the term of this patent is extended or adjusted under 35 U.S.C. 154(b) by 210 days.

(21) Appl. No.: 18/160,480

(22) Filed: Jan. 27, 2023

(65) Prior Publication Data

US 2023/0395904 A1 Dec. 7, 2023

Related U.S. Application Data

(60) Provisional application No. 63/304,425, filed on Jan. 28, 2022.

(51) Int. Cl.
H01M 12/06 (2006.01)
H01M 4/88 (2006.01)
H01M 50/505 (2021.01)

(52) U.S. Cl.
CPC ......... H01M 12/06 (2013.01); H01M 4/8807 (2013.01); H01M 4/8814 (2013.01);
(Continued)

(58) Field of Classification Search
CPC ...... H01M 12/02; H01M 12/06; H01M 12/08; H01M 2300/0002; H01M 2300/0017;
(Continued)

(56) References Cited

U.S. PATENT DOCUMENTS 1,940,385 A 12/1933 Karl
1,988,861 A 1/1935 Ernst
(Continued)

*Primary Examiner* — Victoria H Lynch
(74) *Attorney, Agent, or Firm* — The Marbury Law Group, PLLC

(57) ABSTRACT

Systems and methods of the various embodiments may provide bifacial sealed gas diffusion electrode (GDE) assemblies. In some embodiments, a bifacial sealed gas diffusion electrode (GDE) assembly includes active electrode layers on two opposing sides of the assembly. Various embodiments may provide architecture and/or sealing methods for GDE assemblies. In various embodiments, the GDE assemblies may be for use in devices. In various embodiments, the devices may be primary or secondary batteries. In various embodiments, these devices may be useful for energy storage. For example, bifacial sealed GDE assemblies of the various embodiments may form cathode electrodes (sometimes called air electrodes) of a battery, such as a metal-air battery.

13 Claims, 33 Drawing Sheets

(52) U.S. Cl.
CPC ....... *H01M 4/8882* (2013.01); *H01M 4/8896* (2013.01); *H01M 50/505* (2021.01)

(58) Field of Classification Search
CPC ............. H01M 4/8626; H01M 4/8657; H01M 4/8807; H01M 4/8814; H01M 4/8882; H01M 4/8896; H01M 50/505; H01M 8/0276; H01M 8/0284; H01M 8/0286; Y02E 60/10
See application file for complete search history.

(56) References Cited

U.S. PATENT DOCUMENTS

| | | |
|---|---|---|
| 2,643,276 A | 6/1953 | Jean |
| 2,646,454 A | 7/1953 | Victor |
| 2,661,387 A | 12/1953 | Karl |
| 2,683,182 A | 7/1954 | Jean |
| 2,798,110 A | 7/1957 | Freimut |
| 2,871,281 A | 1/1959 | Moulton |
| 2,980,747 A | 4/1961 | Daley |
| 3,055,963 A | 9/1962 | Willi |
| 3,066,178 A | 11/1962 | Winkler |
| 3,117,033 A | 1/1964 | Fritz |
| 3,223,611 A | 12/1965 | Kergan |
| 3,262,815 A | 7/1966 | Alois |
| 3,266,936 A | 8/1966 | Willi |
| 3,323,951 A | 6/1967 | Kreiselmaier |
| 3,326,676 A | 6/1967 | Werner |
| 3,329,530 A | 7/1967 | Yutaka |
| 3,415,689 A | 12/1968 | Carson, Jr. |
| 3,424,618 A | 1/1969 | Weilnbock |
| 3,462,303 A | 8/1969 | Reber |
| 3,507,696 A | 4/1970 | Jackovitz |
| 3,525,640 A | 8/1970 | Mccormick |
| 3,527,613 A | 9/1970 | Hardman |
| 3,615,844 A | 10/1971 | Spengler |
| 3,647,544 A | 3/1972 | Schneider |
| 3,650,835 A | 3/1972 | Jackovitz |
| 3,679,482 A | 7/1972 | Hardman |
| 3,785,867 A | 1/1974 | Edwards |
| 3,785,868 A | 1/1974 | Devitt |
| 3,802,878 A | 4/1974 | Lindstrom |
| 3,811,945 A | 5/1974 | De |
| 3,819,413 A | 6/1974 | Nippe |
| 3,822,149 A | 7/1974 | Hale |
| 3,836,397 A | 9/1974 | Hardman |
| 3,847,603 A | 11/1974 | Fukuda |
| 3,847,668 A | 11/1974 | Kramer |
| 3,849,198 A | 11/1974 | Seidel |
| 3,853,624 A | 12/1974 | Brown |
| 3,871,921 A | 3/1975 | Beatty |
| 3,895,961 A | 7/1975 | Gutridge |
| 3,898,098 A | 8/1975 | Giles |
| 3,898,099 A | 8/1975 | Baker |
| 3,907,603 A | 9/1975 | Kocherginsky |
| 3,918,989 A | 11/1975 | Gillman |
| 3,919,062 A | 11/1975 | Lundquist, Jr. |
| 3,945,849 A | 3/1976 | Hoffman |
| 3,947,292 A | 3/1976 | Jackovitz |
| 3,980,501 A | 9/1976 | Feder |
| 3,993,504 A | 11/1976 | Kramer |
| 4,021,911 A | 5/1977 | Kononenko |
| 4,029,854 A | 6/1977 | Walsh |
| 4,032,693 A | 6/1977 | Lindstrom |
| 4,064,331 A | 12/1977 | Patton |
| 4,078,120 A | 3/1978 | Lindstrom |
| 4,083,940 A | 4/1978 | Das |
| 4,109,060 A | 8/1978 | Andersson |
| 4,123,568 A | 10/1978 | Kononenko |
| 4,132,547 A | 1/1979 | Buzzelli |
| 4,201,653 A | 5/1980 | Charles |
| 4,207,383 A | 6/1980 | Oliapuram |
| 4,236,927 A | 12/1980 | Buhl |
| 4,250,236 A | 2/1981 | Haschka |
| 4,320,184 A | 3/1982 | Bernstein |

| | | | |
|---|---|---|---|
| 4,332,869 A | 6/1982 | Margalit | |
| 4,335,192 A | 6/1982 | Oliapuram | |
| 4,340,449 A | 7/1982 | Srinivasan | |
| 4,356,027 A | 10/1982 | Sugiyama | |
| 4,356,101 A | 10/1982 | Jackovitz | |
| 4,375,427 A | 3/1983 | Miller | |
| 4,384,928 A | 5/1983 | Hall | |
| 4,444,852 A | 4/1984 | Liu | |
| 4,447,509 A | 5/1984 | Maskalick | |
| 4,450,211 A | 5/1984 | Vignaud | |
| 4,474,862 A | 10/1984 | Buzzelli | |
| 4,487,818 A | 12/1984 | Ovshinsky | |
| 4,519,425 A | 5/1985 | Seidel | |
| 4,521,497 A | 6/1985 | Tamminen | |
| 4,535,039 A | 8/1985 | Naarmann | |
| 4,552,630 A | 11/1985 | Wheeler | |
| 4,585,710 A | 4/1986 | McEvoy | |
| 4,680,100 A | 7/1987 | Morin | |
| 4,689,880 A | 9/1987 | Brezillon | |
| 4,693,946 A | 9/1987 | Niksa | |
| 4,746,415 A | 5/1988 | Boulton | |
| 4,765,799 A | 8/1988 | Waldrop | |
| 4,828,942 A | 5/1989 | Licht | |
| 4,842,963 A | 6/1989 | Ross, Jr. | |
| 4,863,484 A | 9/1989 | Beauchamp | |
| 4,869,979 A | 9/1989 | Ohtani | |
| 4,894,355 A | 1/1990 | Takeuchi | |
| 4,925,747 A | 5/1990 | Kordesch | |
| 4,950,561 A | 8/1990 | Niksa | |
| 4,957,827 A | 9/1990 | Kordesch | |
| 5,006,424 A | 4/1991 | Evans | |
| 5,143,799 A | 9/1992 | Tsenter | |
| 5,145,752 A | 9/1992 | Goldstein | |
| 5,158,658 A | 10/1992 | Cawlfield | |
| 5,162,169 A | 11/1992 | Tomantschger | |
| 5,185,218 A | 2/1993 | Brokman | |
| 5,190,833 A | 3/1993 | Goldstein | |
| 5,242,765 A | 9/1993 | Naimer | |
| 5,318,861 A | 6/1994 | Harats | |
| 5,360,680 A | 11/1994 | Goldman | |
| 5,397,532 A | 3/1995 | Blaimschein | |
| 5,405,719 A | 4/1995 | Sonoda | |
| 5,415,949 A | 5/1995 | Stone | |
| 5,419,987 A | 5/1995 | Goldstein | |
| 5,431,823 A | 7/1995 | Gofer | |
| 5,432,022 A | 7/1995 | Cheiky | |
| 5,434,020 A | 7/1995 | Cooper | |
| 5,441,820 A | 8/1995 | Siu | |
| 5,447,805 A | 9/1995 | Harats | |
| 5,447,806 A | 9/1995 | Hoge | |
| 5,451,475 A | 9/1995 | Ohta | |
| 5,458,988 A | 10/1995 | Putt | |
| 5,512,391 A | 4/1996 | Fleischer | |
| 5,549,991 A | 8/1996 | Licht | |
| 5,569,551 A * | 10/1996 | Pedicini .............. | H01M 12/065 |
| | | | 429/405 |
| 5,637,421 A | 6/1997 | Poehler | |
| 5,700,596 A | 12/1997 | Ikoma | |
| 5,733,667 A | 3/1998 | Nakasuji | |
| 5,750,289 A | 5/1998 | Kejha | |
| 5,780,184 A | 7/1998 | Coco | |
| 5,780,186 A | 7/1998 | Casey, Jr. | |
| 5,788,943 A | 8/1998 | Aladjov | |
| 5,789,097 A | 8/1998 | Kistrup | |
| 5,851,698 A | 12/1998 | Reichman | |
| 5,935,724 A | 8/1999 | Spillman | |
| 5,935,728 A | 8/1999 | Spillman | |
| 5,938,899 A | 8/1999 | Forand | |
| 5,965,298 A | 10/1999 | Harada | |
| 6,027,827 A | 2/2000 | Gan | |
| 6,027,834 A | 2/2000 | Hayashi | |
| 6,127,061 A | 10/2000 | Shun | |
| 6,153,328 A | 11/2000 | Colborn | |
| 6,162,333 A | 12/2000 | Lemon | |
| 6,165,638 A | 12/2000 | Spillman | |
| 6,194,098 B1 | 2/2001 | Ying | |
| 6,207,037 B1 | 3/2001 | Dartnell | |
| 6,210,832 B1 | 4/2001 | Visco | |
| 6,228,535 B1 | 5/2001 | Fierro | |

(56) References Cited

U.S. PATENT DOCUMENTS

| | | |
|---|---|---|
| 6,249,940 B1 | 6/2001 | Asano |
| 6,268,085 B1 | 7/2001 | Manthiram |
| 6,333,123 B1 | 12/2001 | Davis |
| 6,379,833 B1 | 4/2002 | Hill |
| 6,383,673 B1 | 5/2002 | Faris |
| 6,383,675 B1 | 5/2002 | Zhong |
| 6,395,422 B1 | 5/2002 | Randell |
| 6,410,160 B1 | 6/2002 | Landin |
| 6,436,576 B1 | 8/2002 | Hossain |
| 6,489,056 B1 | 12/2002 | Davis |
| 6,500,576 B1 | 12/2002 | Davis |
| 6,537,701 B1 | 3/2003 | Nimon |
| 6,544,678 B2 | 4/2003 | Faris |
| 6,558,848 B1 | 5/2003 | Kobayashi |
| 6,653,252 B2 | 11/2003 | Kawahara |
| 6,673,490 B2 | 1/2004 | Miki |
| 6,680,140 B1 | 1/2004 | Berlureau |
| 6,713,206 B2 | 3/2004 | Markoski |
| 6,790,265 B2 | 9/2004 | Joshi |
| 6,849,356 B2 | 2/2005 | Dow |
| 6,858,347 B2 | 2/2005 | Tanigawa |
| 6,927,000 B2 | 8/2005 | Ndzebet |
| 6,994,933 B1 | 2/2006 | Bates |
| 7,020,355 B2 | 3/2006 | Lahann |
| 7,070,632 B1 | 7/2006 | Visco |
| 7,112,383 B2 | 9/2006 | Konabe |
| 7,169,504 B2 | 1/2007 | Armacanqui |
| 7,201,857 B2 | 4/2007 | Ovshinsky |
| 7,238,440 B2 | 7/2007 | Damore |
| 7,273,541 B2 | 9/2007 | Choban |
| 7,291,186 B2 | 11/2007 | Zhang |
| 7,303,835 B2 | 12/2007 | Mathias |
| 7,399,391 B2 | 7/2008 | Oldani |
| 7,468,221 B2 | 12/2008 | Lafollette |
| 7,482,081 B2 | 1/2009 | Hong |
| 7,488,547 B1 | 2/2009 | Iacovelli |
| 7,527,890 B2 | 5/2009 | Kodama |
| 7,563,537 B2 | 7/2009 | Pratt |
| 7,670,575 B2 | 3/2010 | Jarvinen |
| 7,670,724 B1 | 3/2010 | Chan |
| 7,960,061 B2 | 6/2011 | Jost |
| 8,206,469 B2 | 6/2012 | Chiang |
| 8,260,203 B2 | 9/2012 | Brantner |
| 8,309,259 B2 | 11/2012 | Friesen |
| 8,361,288 B2 | 1/2013 | Reece |
| 8,372,255 B2 | 2/2013 | Perego |
| 8,383,267 B2 | 2/2013 | Konishiike |
| 8,445,133 B2 | 5/2013 | Friesen |
| 8,480,932 B2 | 7/2013 | Takeuchi |
| 8,486,563 B2 | 7/2013 | Chou |
| 8,546,028 B2 | 10/2013 | Friesen |
| 8,563,150 B2 | 10/2013 | Bugnet |
| 8,632,921 B2 | 1/2014 | Friesen |
| 8,658,318 B2 | 2/2014 | Friesen |
| 8,728,671 B1 | 5/2014 | Brost |
| 8,758,948 B2 | 6/2014 | Narayan |
| 8,859,145 B2 | 10/2014 | Stevanovic |
| 8,877,391 B2 | 11/2014 | Friesen |
| 8,904,626 B2 | 12/2014 | Liu |
| 8,906,563 B2 | 12/2014 | Friesen |
| 8,920,969 B2 | 12/2014 | Issaev |
| 9,065,120 B2 | 6/2015 | Carlson |
| 9,105,946 B2 | 8/2015 | Friesen |
| 9,117,581 B2 | 8/2015 | Omura |
| 9,136,563 B2 | 9/2015 | Hucker |
| 9,178,207 B2 | 11/2015 | Friesen |
| 9,184,478 B2 | 11/2015 | Friesen |
| 9,214,830 B2 | 12/2015 | Friesen |
| 9,236,643 B2 | 1/2016 | Friesen |
| 9,263,779 B2 | 2/2016 | Lee |
| 9,287,592 B2 | 3/2016 | Gifford |
| 9,312,553 B2 | 4/2016 | Yoo |
| 9,312,572 B2 | 4/2016 | Trimble |
| 9,325,037 B2 | 4/2016 | Trimble |
| 9,368,788 B2 | 6/2016 | Ogg |
| 9,419,273 B2 | 8/2016 | Kakeya |
| 9,450,233 B2 | 9/2016 | Ogg |
| 9,478,793 B2 | 10/2016 | Ogg |
| 9,478,806 B2 | 10/2016 | Ogg |
| 9,537,144 B2 | 1/2017 | Huang |
| 9,559,385 B2 | 1/2017 | Ogg |
| 9,577,298 B2 | 2/2017 | Narayan |
| 9,583,779 B2 | 2/2017 | Chiang |
| 9,680,151 B2 | 6/2017 | Mullins |
| 9,680,154 B2 | 6/2017 | Chen |
| 9,732,409 B2 | 8/2017 | Ogg |
| 9,780,379 B2 | 10/2017 | Zhamu |
| 9,816,170 B2 | 11/2017 | Ogg |
| 9,882,215 B2 | 1/2018 | Johnson |
| 9,893,397 B2 | 2/2018 | Yoshida |
| 9,911,985 B2 | 3/2018 | Dong |
| 9,947,481 B2 | 4/2018 | Solomon |
| 9,972,874 B2 | 5/2018 | Toussaint |
| 9,990,578 B2 | 6/2018 | Johnson |
| 10,008,754 B2 | 6/2018 | Englert |
| 10,014,530 B2 | 7/2018 | Lang |
| 10,033,036 B2 | 7/2018 | Christensen |
| 10,090,520 B2 | 10/2018 | Friesen |
| 10,147,988 B2 | 12/2018 | Park |
| 10,177,417 B2 | 1/2019 | Van Dijk |
| 10,177,426 B2 | 1/2019 | Nitta |
| 10,256,460 B2 | 4/2019 | Friesen |
| 10,482,367 B2 | 11/2019 | Johnson |
| 10,522,840 B2 | 12/2019 | Gayden |
| 10,909,437 B2 | 2/2021 | Johnson |
| 11,196,057 B2 | 12/2021 | Friesen |
| 11,552,290 B2 | 1/2023 | Chakraborty |
| 2001/0007725 A1 | 7/2001 | Faris |
| 2002/0015871 A1 | 2/2002 | Tao |
| 2002/0142202 A1 | 10/2002 | Li |
| 2002/0142203 A1 | 10/2002 | Ma |
| 2002/0155351 A1 | 10/2002 | Licht |
| 2003/0059668 A1 | 3/2003 | Visco |
| 2003/0099882 A1 | 5/2003 | Hampden-Smith |
| 2003/0162068 A1 | 8/2003 | Wilson |
| 2004/0023112 A1 | 2/2004 | Lin |
| 2004/0053104 A1* | 3/2004 | Novkov ............... H01M 8/0256 |
| | | 429/513 |
| 2004/0053132 A1 | 3/2004 | Smedley |
| 2004/0069622 A1 | 4/2004 | Martelli |
| 2004/0104124 A1 | 6/2004 | Cobley |
| 2004/0157101 A1 | 8/2004 | Smedley |
| 2004/0221426 A1 | 11/2004 | Igawa |
| 2005/0201918 A1 | 9/2005 | Gordon |
| 2006/0194107 A1 | 8/2006 | Licht |
| 2006/0234855 A1 | 10/2006 | Gorte |
| 2006/0269826 A1 | 11/2006 | Katz |
| 2007/0077491 A1 | 4/2007 | Burchardt |
| 2007/0092787 A1 | 4/2007 | Wang Chen |
| 2007/0141450 A1 | 6/2007 | Yang |
| 2007/0166602 A1 | 7/2007 | Burchardt |
| 2007/0259234 A1 | 11/2007 | Chua |
| 2007/0264550 A1 | 11/2007 | Zhang |
| 2007/0278107 A1 | 12/2007 | Barnett |
| 2008/0008911 A1 | 1/2008 | Stroock |
| 2008/0096061 A1 | 4/2008 | Burchardt |
| 2008/0160413 A1 | 7/2008 | Dopp |
| 2008/0261094 A1 | 10/2008 | Licht |
| 2009/0092882 A1 | 4/2009 | Kjeang |
| 2009/0176162 A1 | 7/2009 | Exnar |
| 2009/0233153 A1 | 9/2009 | Carlisle |
| 2009/0284229 A1 | 11/2009 | Friesen |
| 2010/0069228 A1 | 3/2010 | Dopp |
| 2010/0143824 A1 | 6/2010 | Tucker |
| 2010/0285369 A1 | 11/2010 | Takahata |
| 2010/0304274 A1 | 12/2010 | Bennett |
| 2011/0003213 A1 | 1/2011 | Burchardt |
| 2011/0020534 A1 | 1/2011 | Chou |
| 2011/0027648 A1 | 2/2011 | Rolison |
| 2011/0048962 A1 | 3/2011 | Reece |
| 2011/0070500 A1 | 3/2011 | Chen |
| 2011/0086278 A1 | 4/2011 | Friesen |
| 2011/0091777 A1 | 4/2011 | Mizuno |
| 2011/0096388 A1 | 4/2011 | Agrawal |

(56) References Cited

U.S. PATENT DOCUMENTS

| | | |
|---|---|---|
| 2011/0114496 A1 | 5/2011 | Dopp |
| 2011/0316485 A1 | 12/2011 | Krishnan |
| 2012/0000789 A1 | 1/2012 | Turek |
| 2012/0034498 A1 | 2/2012 | Hsu |
| 2012/0068667 A1 | 3/2012 | Friesen |
| 2012/0098499 A1 | 4/2012 | Friesen |
| 2012/0139496 A1 | 6/2012 | Krishnan |
| 2012/0171594 A1 | 7/2012 | Mizuno |
| 2012/0193242 A1 | 8/2012 | Marchal |
| 2013/0037760 A1 | 2/2013 | Maeda |
| 2013/0078548 A1 | 3/2013 | Lee |
| 2013/0115523 A1 | 5/2013 | Friesen |
| 2013/0115525 A1 | 5/2013 | Friensen |
| 2013/0149615 A1 | 6/2013 | Narayan |
| 2013/0216923 A1 | 8/2013 | Hosseiny |
| 2013/0230771 A1 | 9/2013 | Deronzier |
| 2013/0302705 A1 | 11/2013 | Yoshida |
| 2014/0038036 A1 | 2/2014 | Nishide |
| 2014/0075745 A1 | 3/2014 | Lu |
| 2014/0087147 A1 | 3/2014 | Shelby |
| 2014/0162129 A1 | 6/2014 | Kim |
| 2014/0217985 A1 | 8/2014 | Gifford |
| 2014/0220256 A1 | 8/2014 | Ogg |
| 2014/0220434 A1 | 8/2014 | Ogg |
| 2014/0220435 A1 | 8/2014 | Ogg |
| 2014/0220440 A1 | 8/2014 | Ogg |
| 2014/0322598 A1 | 10/2014 | Ogg |
| 2015/0010812 A1 | 1/2015 | Ohyama |
| 2015/0056505 A1 | 2/2015 | Ogg |
| 2015/0064561 A1 | 3/2015 | Ogg |
| 2015/0064562 A1 | 3/2015 | Ogg |
| 2015/0155559 A1 | 6/2015 | Zimmerman |
| 2015/0162601 A1 | 6/2015 | Ogg |
| 2015/0200431 A1 | 7/2015 | Martirosyan |
| 2015/0255787 A1 | 9/2015 | Mine |
| 2015/0295291 A1 | 10/2015 | Sata |
| 2015/0303530 A1 | 10/2015 | Toussaint |
| 2015/0311519 A1 | 10/2015 | Kawanaka |
| 2015/0372357 A1 | 12/2015 | Kruglak |
| 2016/0111729 A1 | 4/2016 | Kim |
| 2016/0111730 A1 | 4/2016 | Kim |
| 2016/0197351 A1 | 7/2016 | Tani |
| 2016/0301077 A1 | 10/2016 | Huang |
| 2016/0308220 A1 | 10/2016 | Qi |
| 2016/0351896 A1 | 12/2016 | Yushin |
| 2017/0040597 A1 | 2/2017 | Ogg |
| 2017/0092990 A1 | 3/2017 | Tarrant |
| 2017/0141434 A1 | 5/2017 | Narayan |
| 2017/0162857 A1 | 6/2017 | Ogg |
| 2017/0194635 A1 | 7/2017 | Kudo |
| 2017/0194795 A1 | 7/2017 | Ensling |
| 2017/0207464 A1 | 7/2017 | Gyenge |
| 2017/0222246 A1 | 8/2017 | Kreiner |
| 2017/0237063 A1 | 8/2017 | Ogg |
| 2017/0244106 A1 | 8/2017 | Mortensen |
| 2018/0010228 A1 | 1/2018 | Ogg |
| 2018/0123116 A1 | 5/2018 | Lee |
| 2018/0219220 A1 | 8/2018 | Hayashi |
| 2019/0123339 A1 | 4/2019 | Yushin |
| 2019/0123340 A1 | 4/2019 | Friesen |
| 2019/0205717 A1 | 7/2019 | Johnson |
| 2019/0229343 A1 | 7/2019 | Roumi |
| 2020/0006745 A1 | 1/2020 | Westwood |
| 2020/0036002 A1 | 1/2020 | Chakraborty |
| 2020/0136153 A1 | 4/2020 | Jaramillo |
| 2020/0411879 A1 | 12/2020 | Hartman |
| 2021/0028452 A1 | 1/2021 | Su |
| 2021/0028457 A1 | 1/2021 | Newhouse |
| 2021/0151775 A1 | 5/2021 | Perkins |
| 2021/0277527 A1 | 9/2021 | Narayan |
| 2022/0149359 A1 | 5/2022 | Gibson |
| 2022/0223845 A1 | 7/2022 | Yang |
| 2022/0352498 A1 | 11/2022 | Narayan |
| 2023/0369576 A1 | 11/2023 | Chakraborty |

* cited by examiner

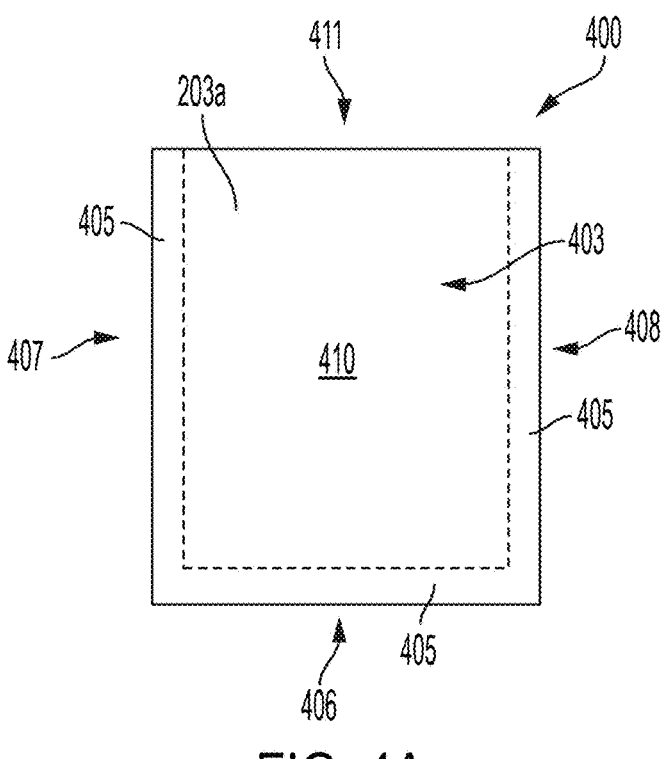
FIG. 4A
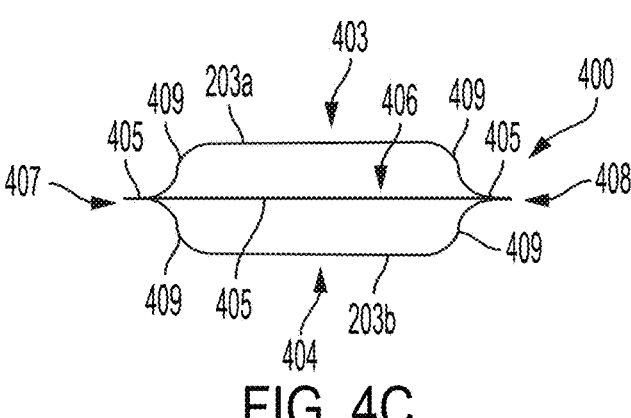
FIG. 4B
FIG. 4C

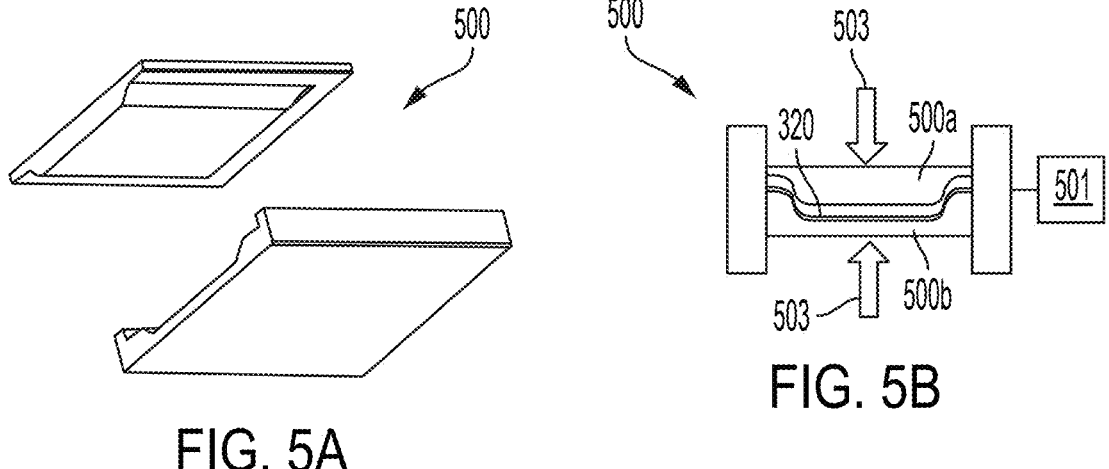
FIG. 5A
FIG. 5B
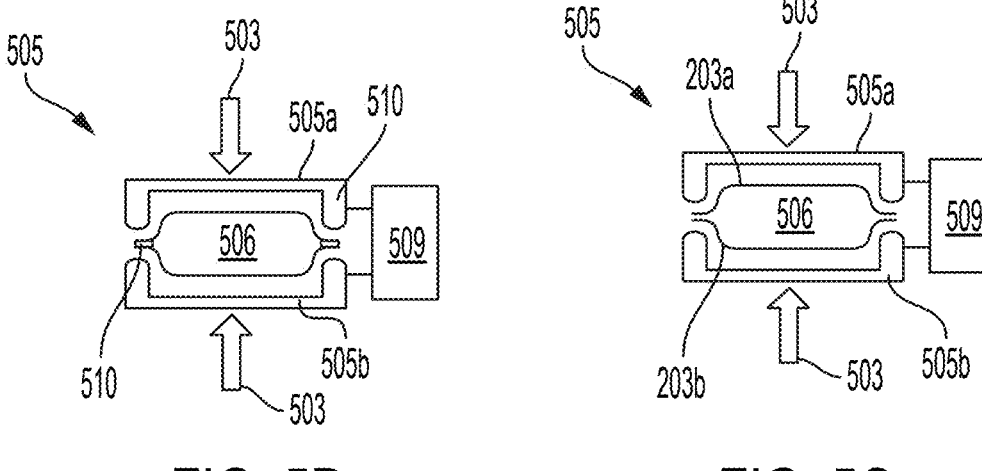
FIG. 5D
FIG. 5C

BIFACIAL SEALED GAS DIFFUSION ELECTRODE

RELATED APPLICATIONS

This application claims the benefit of priority to U.S. Provisional Patent Application No. 63/304,425 entitled "BIFACIAL SEALED GAS DIFFUSION ELECTRODE" filed Jan. 28, 2022, the entire contents of which are hereby incorporated by reference for all purposes.

BACKGROUND

Energy storage technologies are playing an increasingly important role in electric power grids; at a most basic level, these energy storage assets provide smoothing to better match generation and demand on a grid. The services performed by energy storage devices are beneficial to electric power grids across multiple time scales, from milliseconds to years. Today, energy storage technologies exist that can support timescales from milliseconds to hours, but there is a need for long and ultra-long duration (collectively, at least ≥8 h) energy storage systems.

Metal-air batteries are attractive options for electrochemical energy storage due to the low cost and abundance of air as a reagent for the energy storing reactions. Many challenges associated with the development of metal-air batteries are associated with the mechanical cell architecture. Certain architectures which are suitable for small-scale storage, such as are used for zinc-air hearing aid batteries are not suitable for large scale energy storage such as for grid-connected applications.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Systems and methods of the various embodiments may provide bifacial sealed gas diffusion electrodes (GDE) assemblies. In various embodiments, the bifacial GDE assemblies may be GDE assemblies for use in devices. In various embodiments, the devices may be primary or secondary batteries. In various embodiments, these devices may be useful for energy storage.

BRIEF DESCRIPTION OF THE FIGURES

The accompanying drawings, which are incorporated herein and constitute part of this specification, illustrate example embodiments of the claims, and together with the general description given above and the detailed description given below, serve to explain the features of the claims.

FIGS. 4A-4D are front, top, bottom and side views, respectively, of a sealed gas diffusion electrode (GDE) assembly according to an embodiment of the present disclosure.

FIG. 5A is a perspective view of a mold that may be used to fabricate a laminate structure GD electrode having a desired three-dimensional shape.

FIGS. 5B and 5C schematically illustrate a method of fabricating a bifacial sealed GDE assembly using a "two-step" lamination and sealing process according to an embodiment of the present disclosure.

FIG. 5D schematically illustrates a method of fabricating a bifacial sealed GDE assembly using an alternative two-step lamination and sealing process according to an embodiment of the present disclosure.

DETAILED DESCRIPTION

Figure 1:
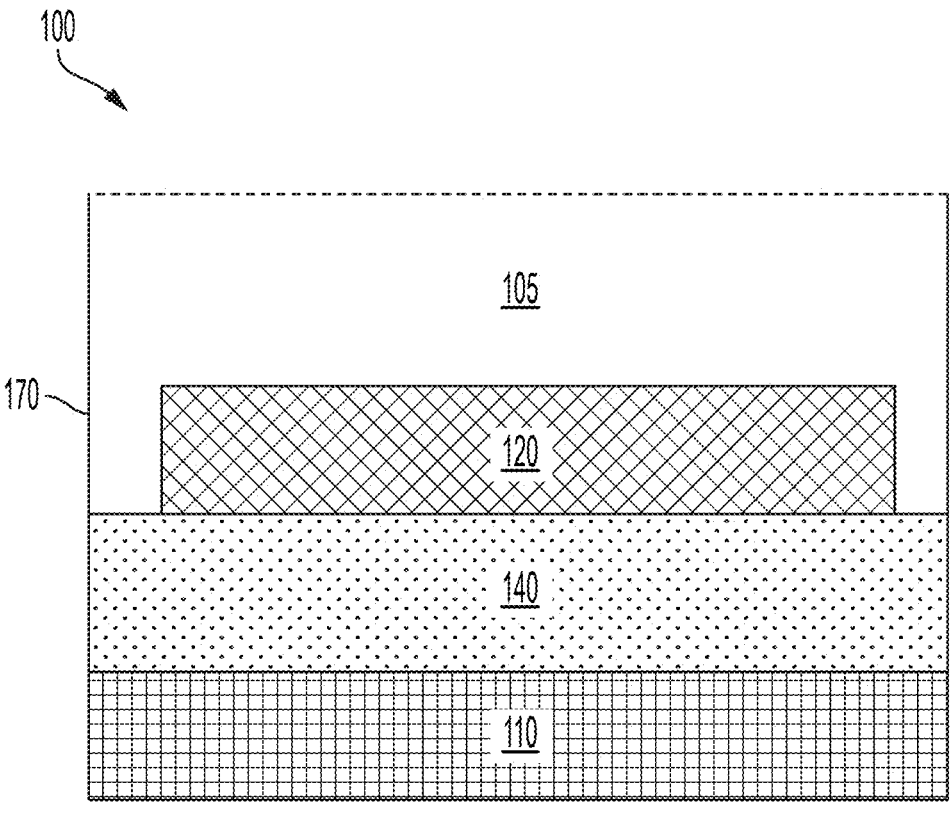
FIG. 1 illustrates a portion of an embodiment battery.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories may not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments and examples set forth in this specification may be used with each other, in whole or in part, and in different and various combinations. Thus, for example, the configurations provided in the various embodiments of this specification may be used with each other. For example, the components of an embodiment having A, A' and B and the components of an embodiment having A", C and D can be used with each other in various combination, e.g., A, C, D, and A. A" C and D, etc., in accordance with the teaching of this specification. Thus, the scope of protection afforded the present inventions should not be limited to a particular embodiment, configuration or arrangement that is set forth in a particular embodiment, example, or in an embodiment in a particular figure.

Embodiments of the present invention include apparatus, systems, and methods for long-duration, and ultra-long-duration, low-cost, energy storage. Herein, "long duration" and "ultra-long duration" and similar such terms, unless expressly stated otherwise, should be given their broadest possible meaning and include periods of energy storage of 8 hours or longer, such as periods of energy storage of 8 hours, periods of energy storage ranging from 8 hours to 20 hours, periods of energy storage of 20 hours, periods of energy storage ranging from 20 hours to 24 hours, periods of energy storage of 24 hours, periods of energy storage ranging from 24 hours to a week, periods of energy storage ranging from a week to a year (e.g., such as from several days to several weeks to several months), etc. and would include LODES systems. Further, the terms "long duration" and "ultra-long duration", "energy storage cells" including "electrochemical cells", and similar such terms, unless expressly stated otherwise, should be given their broadest possible interpretation; and include electrochemical cells that may be configured to store energy over time spans of days, weeks, or seasons.

In general, in an embodiment, the long duration energy storage cell can be a long duration electrochemical cell. In general, this long duration electrochemical cell can store electricity generated from an electrical generation system, when: (i) the power source or fuel for that generation is available, abundant, inexpensive, and combinations and variations of these; (ii) when the power requirements or electrical needs of the electrical grid, customer or other user, are less than the amount of electricity generated by the electrical generation system, the price paid for providing such power to the grid, customer or other user, is below an economically efficient point for the generation of such power (e.g., cost of generation exceeds market price for the electricity), and combinations and variations of these; and (iii) combinations and variations of (i) and (ii) as well as other reasons. This electricity stored in the long duration electrochemical cell can then be distributed to the grid, customer or other user, at times when it is economical or otherwise needed. For example, the electrochemical cells may be configured to store energy generated by solar cells during the summer months, when sunshine is plentiful and solar power generation exceeds power grid requirements, and discharge the stored energy during the winter months, when sunshine may be insufficient to satisfy power grid requirements.

FIG. 1 shows a portion of an embodiment battery 100, such as a metal air battery. The battery 100 (e.g., a metal air battery) includes a first negative electrode (commonly called the anode) 110, a first positive electrode 120 (commonly called the cathode), an electrolyte 140, and a housing 170.

In various embodiments, the electrolyte 140 is liquid. In various embodiments, the anode 110 is solid and the electrolyte 140 is excluded from the anode. In various other embodiments the anode 110 is porous and the electrolyte 140 is interspersed geometrically with the anode 110, creating a greater interfacial surface area for reaction. In various embodiments, the cathode 120 is porous and the electrolyte is interspersed geometrically with the anode 110, creating a greater interfacial surface area for reaction. In various embodiments, the cathode 120 is positioned at the interface of the electrolyte and a gaseous headspace 105. In various embodiments, the gaseous headspace is sealed in the housing 170. In various other embodiments, the housing 170 is unsealed and the gaseous headspace is an open system which can freely exchange mass with the environment.

The anode 110 may be formed from a metal or metal alloy, such as lithium (Li), sodium (Na), potassium (K), magnesium (Mg), calcium (Ca), silicon (Si), aluminum (Al), zinc (Zn), or iron (Fe); or alloys substantially comprised of one or more of the forgoing metallic elements, such as an aluminum alloy or iron alloy (e.g., FeAl, FeZn, FeMg, etc.) that can undergo an oxidation reaction for discharge. As such, the anode 110 may be referred to as the metal electrode herein. In certain embodiments, the battery is rechargeable and the metal electrode undergoes a reduction reaction when the battery is charged. The anode 110 may be a solid, including a dense or porous solid, or a mesh or foam, or a particle or collection of particles, or may be a slurry, ink, suspension, or paste deposited within the housing 170. In various embodiments, the anode 110 composition may be selected such that the anode 110 and the volume of liquid electrolyte 140 may not mix together. For example, the anode 110 may be a metal electrode that may be a bulk solid. As another example, the anode 110 may be a collection of particles, such as small or bulky particles, within a suspension that are not buoyant enough to escape the suspension into the electrolyte. As another example, the anode 110 may be formed from particles that are not buoyant in the electrolyte.

The cathode electrode (sometimes called an air electrode) 120 supports the reaction with oxygen on the positive electrode. The cathode 120 may be a so-called gas diffusion electrode (GDE) in which the cathode is a solid, and it sits at the interface of the gas headspace 105 and the electrolyte 140. During the discharge process, the cathode 120 supports the reduction of oxygen from the gaseous headspace 170, the so-called Oxygen Reduction Reaction (ORR). In certain embodiments, the battery 100 is rechargeable and the reverse reaction occurs, in which the cathode 120 supports the evolution of oxygen from the battery, the so-called Oxygen Evolution Reaction (OER). The OER and ORR reactions are commonly known to those skilled in the art.

In certain embodiments the cathode 120 is a single electrode which supports only ORR and the battery is a primary (discharge-only) metal-air battery. In certain other embodiments the cathode 120 is a single electrode which supports both ORR (discharge reaction) and OER (charge reaction) and the metal-air battery is rechargeable (a secondary battery). The cathode 120 may be a single air electrode, a "bifunctional electrode," which operates in both OER and ORR mode, or it may be a combination of two electrodes, a "dual electrode," in which one electrode is configured to operate in OER mode and another electrode is configured to operate in ORR mode.

In various embodiments the electrolyte 140 is a liquid. In certain embodiments, the electrolyte 140 is an aqueous solution, a non-aqueous solution, or a combination thereof. In various embodiments the electrolyte 140 is an aqueous solution which may be acidic (low-pH), neutral (intermediate pH), or basic (high pH; also called alkaline or caustic). In certain embodiments the liquid electrolyte 140 may comprise an electropositive element, such as Li, K, Na, or combinations thereof. In some embodiments, the liquid electrolyte may be basic, namely with a pH greater than 7. In some embodiments the pH of the electrolyte is greater than 10, and in other embodiments, greater than 12. For example, the electrolyte 140 may comprise a 6M (mol/liter) concentration of potassium hydroxide (KOH). In certain embodiments, the electrolyte 140 may comprise a combination of ingredients such as 5.5M potassium hydroxide (KOH) and 0.5M lithium hydroxide (LiOH). In certain embodiments the electrolyte 140 may comprise a 6M (mol/liter) concentration of sodium hydroxide (NaOH). In certain embodiments the electrolyte 140 may comprise a 5M (mol/liter) concentration of sodium hydroxide (NaOH) and 1M potassium hydroxide (KOH).

In certain embodiments, the battery 100 (e.g., metal-air battery) discharges by reducing oxygen ($O_2$) typically sourced from air. This requires a triple-phase contact between gaseous oxygen, an electronically active conductor which supplies the electrons for the reduction reaction, and an electrolyte 140 which contains the product of the reduction step. For example, in certain embodiments involving an aqueous alkaline electrolyte, oxygen from air is reduced to hydroxide ions through the half-reaction $O_2 + 2H_2O + 4e^- \rightarrow 4OH^-$.

Thus, oxygen delivery to metal-air cells requires gas handling and maintenance of triple-phase points. The triple phase points or boundary describes the region where solid, electrolyte, and gas all contact. This is where the heterogeneous reaction actually occurs. In certain embodiments, called "normal air-breathing" configurations, the cathode 120 is mechanically positioned at the gas-liquid interface to promote and maintain triple-phase boundaries. The cathode 120 may be positioned vertically or horizontally, or at any intermediate angle with respect to gravity, and maintain a "normal air-breathing" configuration. In these "normal air-breathing" configurations, the gas phase is at atmospheric pressure (i.e., it is unpressurized beyond the action of gravity).

In various embodiments, battery (e.g., battery 100) may include three electrodes, an anode (e.g., 110) and a dual cathode (e.g., cathode 120 constituted in two parts, such as a first cathode, and a second cathode). The electrodes may have finite useful lifetimes, and may be mechanically replaceable. For example, the anode may be replaced seasonally.

The first cathode may be configured to operate in an ORR mode, and may also be referred to as an "ORR electrode." The first cathode (i.e., the ORR electrode) may be divided into two portions, a first portion having a hydrophilic surface and a second portion having a hydrophobic surface. For example, the hydrophobic surface may have a polytetrafluorethylene (PTFE) (e.g., Teflon®) hydrophobic surface. For example, the second portion may be a microporous layer (MPL) of polytetrafluorethylene (PTFE) and high surface area carbon while the first portion may be carbon fiber partially coated with PTFE. As another example, the second portion may be a MPL of PTFE and carbon black and the first portion may be PTFE of approximately 33% by weight. As a further example, the second portion may be an MPL of 23% by weight PTFE and 77% by weight carbon black and the first portion may be a low loading MPL.

The second cathode may be configured to operate in an OER mode, and may also be referred to as an "OER electrode." The second cathode (i.e., the OER electrode) may have a hydrophilic surface. The second cathode may have a metal substrate, such as carbon (C), titanium (Ti), steel, etc., coated with nickel (Ni). Electrolyte (e.g., electrolyte 140) may be disposed between the three electrodes. The electrolyte may be infiltrated into one or more of the three electrodes.

In certain embodiments, it may be advantageous to submerge the ORR electrode below the liquid level (e.g., the gas-liquid interface) of a cell. In these embodiments, which may be referred to as "inverse air-breathing" configurations, the triple-phase boundary is generated by delivery of air (oxygen) to the ORR electrode, which is positioned under the liquid level. This presents several advantages. First, the ORR electrode is normally wetted, which mitigates the risk of dry out and salt crusting on the electrode. Secondly, leaking through the electrode may be purely internal to the cell and does not result in leakage of electrolyte to the external environment. Third, the depth of a cell may be significantly greater (the height dimension of a primary housing).

Figure 2:
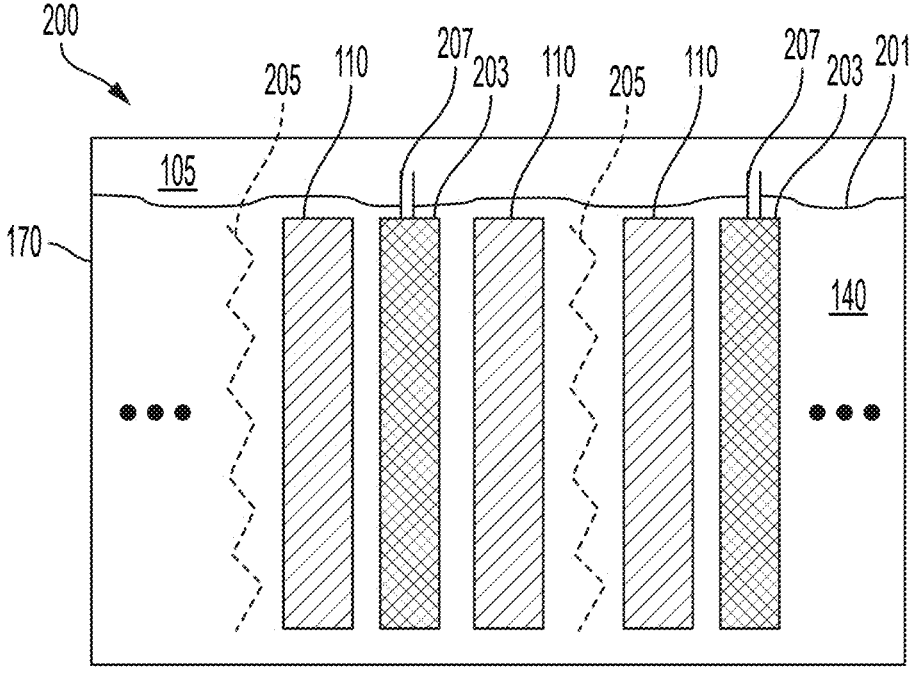
FIG. 2 schematically illustrates a battery having a submerged Oxygen Reduction Reaction (ORR) electrode according to various embodiments of the present disclosure.

FIG. 2 illustrates an exemplary embodiment of a battery 200 having a submerged ORR electrode 203. The battery 200 includes a liquid electrolyte solution 140, at least one anode electrode 110 and at least one ORR electrode 203 located within the primary housing 5170. The battery 200 may also include at least one OER electrode 205 within the primary housing 170. The electrodes 110, 203 and 205 may each be partially or completely submerged below the liquid level 201 of the electrolyte solution 140. An outer portion of each of the submerged ORR electrodes 203 may contact the electrolyte 140, which may partially infiltrate into the ORR electrode 203. An interior portion of each of the ORR electrodes 203 may contain air (oxygen), and may be at least substantially free of electrolyte 140. Each of the ORR electrodes 203 may also include an active conductor (e.g., a current collector, not shown in FIG. 2) for supplying electrons for the reduction reaction. Thus, each of the ORR electrodes 203 may support multiple triple phase points or boundaries within the ORR electrode 203.

One or more air lines 207 may provide air to the interior portions of each of the ORR electrodes 203. The air lines 207 may provide air from a headspace 105 of the primary housing 170, from the external atmosphere, and/or from a blower or similar mechanism that may actively provide air to the ORR electrode(s) 203. In some embodiments, the air provided to the ORR electrode(s) 203 may be pressurized above atmospheric pressure. In some embodiments, air may be circulated through each of the ORR electrodes 203 and may exit the respective ORR electrode 203 through a separate outlet air line or conduit. Alternatively, or in addition, air may be vented from the ORR electrodes 203 into the liquid electrolyte 140.

A battery 200 as shown in FIG. 2 may have a repeating anode-cathode-anode-cathode array configuration, where the number of repeat units, and the dimensions, locations and orientations of the anode and cathode electrodes 110, 203 and/or 205 may vary in various embodiments.

Figures 3A, 3B, 3C:
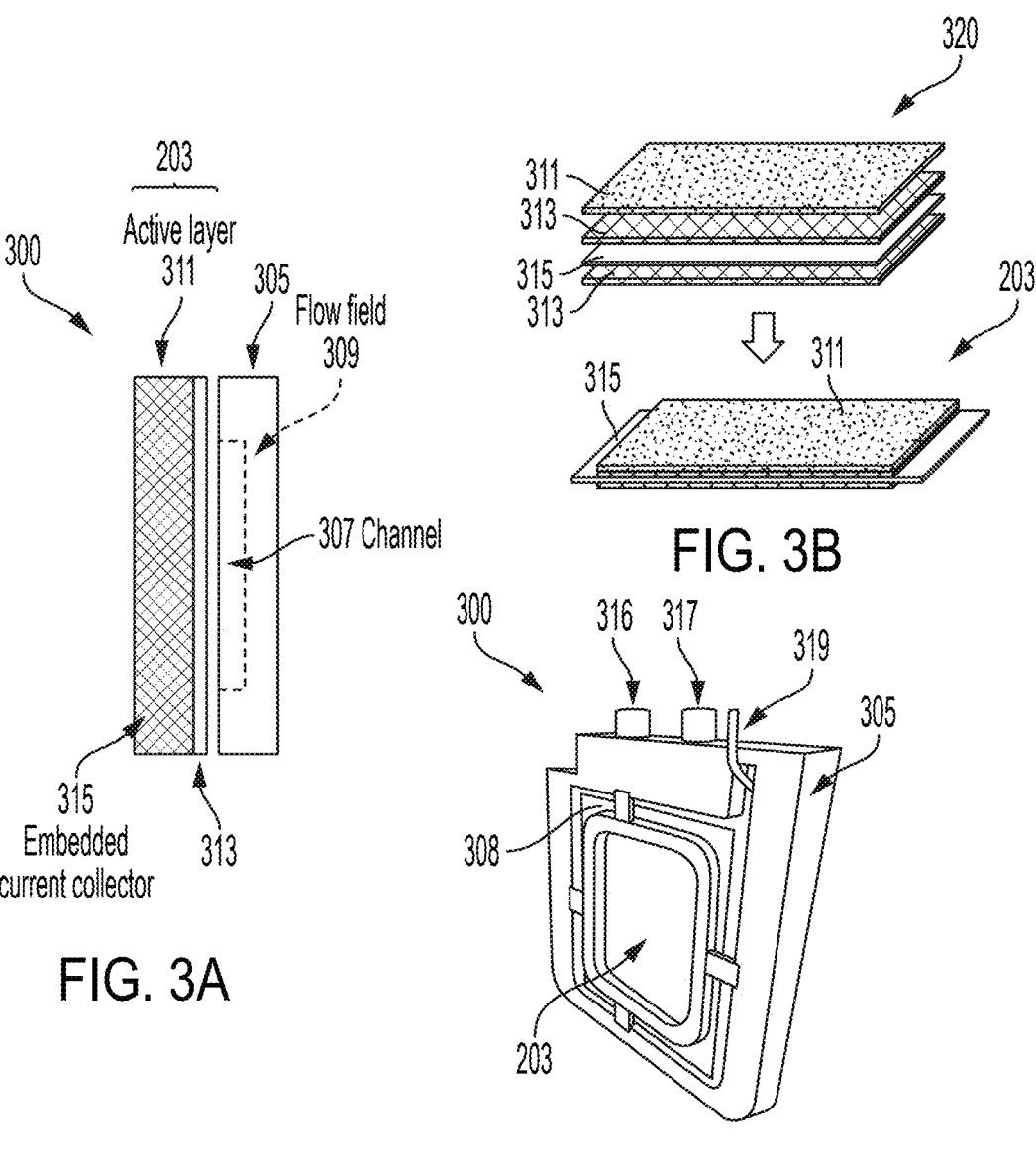
FIG. 3A is a side cross-section view of an exemplary electrode assembly.
FIG. 3B schematically illustrates a process for fabricating a laminate structure gas diffusion (GD) electrode according to various embodiments of the present disclosure.
FIG. 3C is a perspective view of an GD electrode assembly that includes a laminate structure GD electrode mounted to a support frame.
Figure 4D:
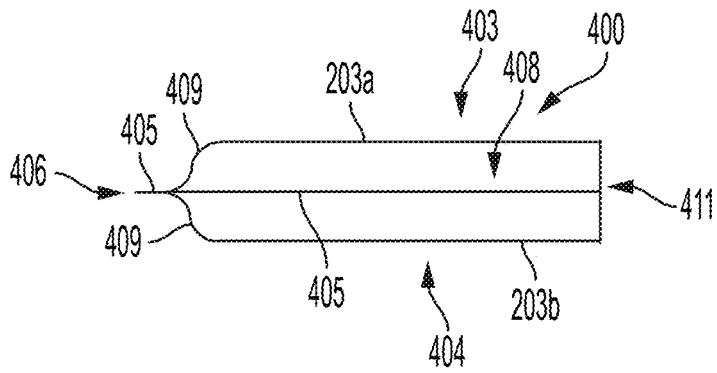

FIG. 3A is a side cross-section view of an exemplary electrode assembly 300. In operation, the electrode assembly 300 may be partially or fully submerged below the liquid level of an electrolyte of a battery, such as a battery 200 shown in FIG. 2. The electrode assembly 300 includes an electrode 203, such as an ORR electrode, that is comprised of a laminated sheet or film which is mounted to a support frame 305. The support frame 305 may include one or more open regions or channels 307 that may provide a flow field 309 for air or oxygen gas. One or more inlet conduits (not shown in FIG. 3A) may provide gas (e.g., air) to the flow field 309 where the gas may be directed to and across the electrode 203. The support frame 305 may be comprised of a plastic (e.g., polypropylene, HDPE, acrylonitrile butadiene styrene (ABS), etc.) and/or a metal (e.g., steel, nickel, etc.) material. The channels 307 of the flow field 309 may be configured direct gas flow through the flow field 309 and across the electrode 203. The channels 307 may take the form of a parallel, interdigitated, serpentine, or spiral geometric pattern. The support frame 305 may be sealed to prevent liquid electrolyte from entering the flow field 309 through the support frame 305. One or more outlet conduits (not shown in FIG. 3A) may direct gas flow from the flow field 309 out of the electrode assembly 300.

The electrode 203 may include a laminate structure including at least one first layer 311, which may also be referred to as an "active" layer, that is proximate to the electrolyte, and at least one second layer 313, which may also be referred to as a "backing" layer, proximate to the flow field 309. The active layer 311 may include a hydrophilic surface and the backing layer 313 may include a hydrophobic surface. The backing layer 313 may be a gas diffusion layer (GDL). A current collector may be embedded within the laminate structure of the electrode 203. An electrode 203 such as shown in FIG. 3A may be referred to as a gas diffusion (GD) electrode 203.

FIG. 3B schematically illustrates a process for fabricating a planar laminate structure GD electrode 203 according to various embodiments. A plurality of individual sheets or films may be arranged to provide a layer stack 320. The layer stack 320 may include at least one active layer 311 and at least one backing layer 313. A current collector 315 may be located within the stack 320, such as between a pair of backing layers 313 as shown in FIG. 3B. Alternatively, the current collector 315 may be located between an active layer 311 and a backing layer 313, or between two active layers 311. In various embodiments, an active layer 311 may be located on an outer surface of the layer stack 320.

In some embodiments, the active layer(s) 311 and the backing layer(s) 313 may each include a carbon-based material and may also include additional materials, such as binder(s) and other functional additives, such as PTFE. The current collector 315 may include an electrically conductive material, such as a metal material. Suitable materials for the current collector 315 include nickel-plated carbon steel or copper. Other suitable conductive materials are within the contemplated scope of disclosure. The current collector 315 may have a porous structure, and may include, for example, a wire mesh, a metal foam, a porous sintered metal sheet, a metal fiber product, a perforated metal sheet, or the like.

Referring again to FIG. 3B, the layer stack 320 may be subjected to mechanical pressure at elevated temperature to adhere the individual layers together and form a laminate structure GD electrode 203. In various embodiments, a laminate structure GD electrode 203 may be formed using a hot press process. During the hot press process, the layer stack 320 may be compressed to a pressure of at least about 400 psi while heated to a temperature of at least about 300° C. The current collector 315 may be embedded within the laminate structure GD electrode 203. A portion of the current collector 315 may optionally extend beyond the edge of the laminate structure to facilitate electrical contact to the current collector 315. An active layer 311 may be exposed on an outer surface of the laminate structure GD electrode 203.

FIG. 3C is a perspective view of an GD electrode assembly 300 that includes a planar laminate structure GD electrode 203 mounted to a support frame 305. An assembly 300 as shown in FIG. 3C may be assembled by fixturing a laminate structure GD electrode 203 such as shown in FIG. 3B in a support frame 305. The support frame may be composed of a plastic material, such as polypropylene, HDPE, or ABS. The support frame 305 may include a flow field defined by one or more channels as described above with reference to FIG. 3A. Inlet and outlet conduits 316 and 317 may provide gas (e.g., air) flow to and from the flow field. A potting material 318 may be provided over portions of the assembly 300 to help seal the interior of the assembly 300 against infiltration by liquid electrolyte. In some embodiments, the potting material 308 may include a two-part epoxy that may be cured at elevated temperature for a curing period. In some cases, the curing period may be 10 hours or more, such as at least about 14 hours. Following the curing process, at least a portion of the active layer 311 of the GD electrode 203 may be exposed on an outer surface of the GD electrode assembly 300. A backing layer 313 of the GD electrode 203 may be pressed against the flow field. An electrical conductor 319 (e.g., a wire) may be electrically connected to the current collector 315 of the GD electrode 300.

Various embodiments of the present disclosure are directed to electrodes, including Oxygen Reduction Reaction (ORR) electrodes 203, electrode assemblies, and methods of fabricating electrodes and electrode assemblies. An electrode assembly in accordance with various embodiments may be a sealed gas diffusion electrode (GDE) assembly that may be partially or fully submerged in a liquid, such as a liquid electrolyte of a metal-air battery. In some embodiments, a bifacial sealed gas diffusion electrode (GDE) assembly includes active electrode layers on two opposing sides of the assembly. Various embodiments may provide architecture and/or sealing methods for GDE assemblies. In various embodiments, the GDE assemblies may be for use in devices. In various embodiments, the devices may be primary or secondary batteries. In various embodiments, these devices may be useful for energy storage. For example, bifacial sealed GDE assemblies of the various embodiments may form cathode electrodes (sometimes called air electrodes) 120 of a battery.

FIGS. 4A-4D are front, top, bottom and side views, respectively, of a sealed gas diffusion electrode (GDE) assembly 400 according to an embodiment of the present disclosure. The GDE assembly 400 according to various embodiments may be formed of two laminate structure GD electrodes 203 as described above which have been bonded together to form a pouch- or pocket-like structure having an open interior chamber 401. In some embodiments, a continuous sheet or film structure containing a pair of laminate structure GD electrodes 203 thereon may be assembled (e.g., folded on itself) and sealed around its edges to form a pouch- or pocket-like GDE assembly 400. The GDE assembly 400 may be submerged into the electrolyte bath of a metal-air battery such that the interior chamber 401 may be hydraulically isolated from the exterior electrolyte. Air may be present within the interior chamber 401 of the assembly 400 and may react with electrolyte that is controllably wetted to the exterior surface of the electrode material. In various embodiments, the electrode(s) of the GDE assembly 400 support an oxygen reduction reaction (ORR), and may also be referred to as "ORR electrodes."

Referring to FIGS. 4A-4D, the GDE assembly 400 may have a first side 403 and a second side 404 that is opposite the first side 403. For convenience, the first side 403 may be referred to as the "front" side 403, and the second side 404 may be referred to as the "rear" side 403. The GDE assembly 400 may have a first peripheral edge 411, a second peripheral edge 406 opposite the first peripheral edge 411, a third peripheral edge 407, and a fourth peripheral edge 408 opposite the third peripheral edge 407. For convenience, the first peripheral edge 411 may be referred to as the "top" peripheral edge of the GDE assembly 400, the second peripheral edge 406 may be referred to as the "bottom" peripheral edge of the GDE assembly 400, and the third and fourth peripheral edges 407 and 407 may be referred to as "lateral" peripheral edges of the GDE assembly 400.

As shown in FIGS. 4A-4D, the GDE assembly 400 may have a substantially planar, flat portion 405 having a shape resembling the letter "U" extending continuously adjacent to the lateral peripheral edges 407 and 408 and the bottom peripheral edge 406 of the GDE assembly 400. The front 403 and rear sides 404 of the GDE assembly 400 may also include convex portions 409 that are angled or curved outwards from the flat portion 405 and extend away from the flat portion 405 towards a central region 410 of the GDE assembly 400. In some embodiments, the central region 410 of the GDE assembly 400 may include substantially planar, flat surfaces on the front 403 and rear sides 404 that are raised relative to the substantially planar, flat portion 405 extending around the periphery of the GDE assembly 400. The raised central region 410 on the front 403 and rear 404 sides of the GDE assembly 400 may extend to the top peripheral edge 411 of the GDE assembly 400. The top peripheral edge 411 of the GDE assembly 400 may define an opening to the interior chamber 401 of the GDE assembly 400. In embodiments in which the GDE assembly 400 is formed of a pair of laminate structure GD electrodes 203a, 203b, the respective GD electrodes 203a, 203b may contact each other along the substantially planar, flat portion 405 extending around the periphery of the GDE assembly 400. The respective laminate structure GD electrodes 203a and 203b may be bonded together along the flat, planar portion 405 so as to form a liquid-tight seal. In some embodiments, described in further detail below, a sealant material may be located between the pair of laminate structure GD electrodes 203a and 203b along the substantially planar, flat portion 405 and/or along the lateral peripheral edges 407 and 408 and the bottom peripheral edge 406 of the GDE assembly 400. The outer surfaces of the GDE assembly 400 on the front 403 and rear 404 sides may each include an active electrode layer as described above. The active electrode layers may include a hydrophilic surface. The interior surfaces of the GDE assembly 400, which enclose and form the outer surfaces of the interior chamber 401, may include a backing layer as described above. The backing layers may each include a hydrophobic surface. Current collectors may be embedded between the active electrode layers on the outer surfaces of the GDE assembly and the backing layers which form the surfaces of the interior chamber 401 of the GDE assembly 400. Thus, the GDE assembly 400 may include a pair of functional electrodes, such as laminate structure GD electrodes, on two opposing sides 403, 404

(i.e., faces) of the GDE assembly 400, and may be referred to as a "bifacial" sealed GDE assembly 400.

A bifacial sealed GDE assembly 400 such as shown in FIG. 4A-4D may be advantageous in terms of manufacturability and cost-effectiveness. In various embodiments discussed in further detail below, a bifacial sealed GDE assembly 400 may be fabricated using a few simple steps, including, in some cases, a single-step process that includes the formation of one or more electrodes via lamination of a multi-layer stack with the simultaneous formation of the sealed housing of the GDE assembly 400. This may avoid the complex processes used to manufacture an electrode assembly 300 such as shown in FIG. 3C, which often requires complex jigs, skilled operators, and long curing times to manufacture and adequately seal the assembly 300.

FIG. 5A is a perspective view of a mold 500 that may be used to fabricate a laminate structure GD electrode 203 having a desired three-dimensional shape. The mold 500 may be used to form a laminate structure GD electrode 203 having a three-dimensional shape having a flat, flange-like portion extending around the GD electrode 203 adjacent to the bottom peripheral edge and lateral peripheral edges of the electrode, and a convex portion that extends between the flange-like portion and a raised portion located in a central region and extending to the top peripheral edge of the GD electrode 203. In various embodiments, a pair of GD electrodes 203 having such a three-dimensional shape may be bonded together and sealed along the respective flange-like portions to provide a bifacial sealed GDE assembly 400 as shown in FIGS. 4A-4D.

FIGS. 5B and 5C schematically illustrate a method of fabricating a bifacial sealed GDE assembly 400 using a "two-step" lamination and sealing process. Referring to FIG. 5B, in a first step of the two-step lamination and sealing process, a layer stack 320, such as a layer stack 320 as described above with reference to FIG. 3B, may be placed in the cavity of a mold 500. In various embodiments, the layer stack 320 may include at least one active electrode layer 311 and at least one backing layer 313. The layer stack 320 may also include a current collector 315. The mold 500 may include a two-part structure including a first piece 500a having a convex cross-sectional shape and a second piece 500b having a complementary concave cross-sectional shape. The layer stack 320 may be placed in the mold 500 such that an active electrode layer 311 is located on an outer surface of the layer stack 320 facing the second piece 500b, and a backing layer 313 is located on an outer surface of the layer stack 320 facing the first piece 500a.

Then, the layer stack 320 may be mechanically pressed between the first piece 500a and the second piece 500b of the mold 500, as schematically illustrated by arrows 503 in FIG. 5B. In some embodiments, the layer stack 320 may be pressed using a hot press process. A heat source 501, which may be for example, an inductive heat source, an indirect resistive heating source and/or a direct resistive heating source, may heat the layer stack 320 to an elevated temperature during the hot press process. In some embodiments, during the hot press process, the layer stack 320 may be compressed to a pressure of at least about 400 psi while heated to a temperature of at least about 300° C. The hot press process may produce a laminate structure ORR electrode 203 having a desired three-dimensional shape as discussed above. A plurality of layer stacks 320 may be pressed in a mold 500 as shown in FIG. 5B to produce a plurality of laminate structure GD electrodes 203. Each laminate structure GD electrode 203 may have an identical or substantially identical three-dimensional shape.

Referring to FIG. 5C, in a second step of the two-step lamination and sealing process, a pair of laminate structure GD electrodes 203a and 203b may be placed in a mechanical press apparatus 505. Each of laminate structure GD electrodes 203a and 203b may have an identical or substantially identical three-dimensional shape, and may be formed using a process as described above in FIG. 5B. The laminate structure GD electrodes 203a and 203b may be placed in the mechanical press apparatus 505 such that flat, flange-like portions extending around the periphery of the GD electrodes 203a and 203b adjacent to the bottom and lateral peripheral edges of the GD electrodes 203a and 203b are in contact with each other. Convex portions of the GD electrodes 203a and 203b extending away from the respective flat, flange-like portions of the GD electrodes 203a and 203b may face away from each other to provide a void region 506 between the respective GD electrodes 203a and 203b within the mechanical press apparatus 505.

Then, the pair of GD electrodes 203a and 203b may be mechanically pressed together between a pair of heated press plates 505a and 505b of the mechanical press apparatus 500, as schematically illustrated by arrows 503 in FIG. 5C. The heated press plates 505a and 505b may mechanically press the GD electrodes 203a and 203b along the flat, flange-like portions extending around the periphery of the GD electrodes 203a and 203b to bond the GD electrodes 203a, 203b together and provide a continuous seal around the bottom and lateral sides of the GD electrodes 203a and 203b. A heat source 509 may heat the press plates 505a and 505b during the pressing process. In some embodiments, the press plates 505a and 505b may apply a pressure of at least about 400 psi while heating the GD electrodes 203a and 203b to a temperature of at least about 300° C. The pressing process may produce a bifacial sealed GDE assembly 400 including an internal chamber 401 as shown in FIGS. 4A-4D.

In some embodiments, a bifacial sealed GDE assembly 400 may be fabricated using a "three-step" process that includes an initial lamination step to form the GD electrodes 203a and 203b, such as via a hot press process as shown in FIG. 5B, followed by an initial bonding step to adhere a pair of GD electrodes 203a and 203b together in the shape of the final GDE assembly 400, followed by a high-temperature mechanical pressing step as shown in FIG. 7C to form a permanent bond and provide a continuous seal around the bottom and lateral sides of the GD electrodes 203a and 203b. The initial bonding step may include a relatively low-pressure and/or low-temperature bonding step in some embodiments.

FIG. 5D schematically illustrates an alternative two-step lamination and sealing process according to an embodiment of the present disclosure. Referring to FIG. 5D, a sealant material 510 may be provided between the GD electrodes 203a and 203b prior to the mechanical pressing step. The sealant material 510 may be provided between the GD electrodes 203a and 203b along the flat, flange-like portions extending around the periphery of the GD electrodes 203a and 203b. The sealant material 510 may include, for example, fluorinated ethylene propylene (FEP), polytetrafluoroethylene (PTFE), or another thermoplastic material, an epoxy material, and/or a hot-melt adhesive material, such as ethylene vinyl acetate. Other suitable sealant materials are within the contemplated scope of disclosure. The sealant material 510 may function similarly to a "gasket" in the final, pressed product, and may improve the sealing of the bifacial sealed GDE assembly 400 to help minimize or prevent liquid infiltration into the internal chamber 401 when the GDE assembly 400 is submerged in electrolyte. In some embodiments, the sealant material 510 may be electrically insulating to provide electrical isolation between the respective electrodes 203a and 203b of the bifacial sealed GDE assembly 400.

Figure 6:
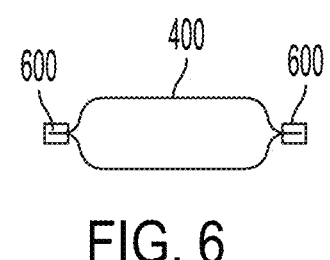
FIG. 6 illustrates a GDE assembly that includes a sealant material that is located around edges of the GDE assembly according to an embodiment of the present disclosure.

Alternatively, or in addition, an exterior seal may be provided over an outer surface of the GDE assembly 400. FIG. 6 illustrates a GDE assembly 400 that includes a sealant material 600 that is located around the bottom peripheral edge 406 and the lateral peripheral edges 407 and 408 of the GDE assembly 400. For example, the sealant material 600 may include an epoxy paint, epoxy dose or epoxy dip seal that may be provided around the edges of the GDE assembly 400 to provide additional integrity to the seal. In some embodiments, the sealant material 600 may include a mechanical seal, such as one or more clamps, clips or tape that may be provided around the outer edges of the GDE assembly 400. In some embodiments, the sealant material 600 may include an epoxy-lined tape that is adhered around the edges of the GDE assembly 400 to "dose" the edge seal with additional epoxy for improved seal integrity.

In some embodiments, the hydrostatic pressure of the liquid electrolyte when the GDE assembly 400 is submerged in the electrolyte may be sufficient to "clamp" the laminate structure GD electrodes 203a, 203b together to provide adequate hydraulic isolation of the interior chamber 401 of the GDE assembly 400 from the surrounding liquid electrolyte.

Figure 7:
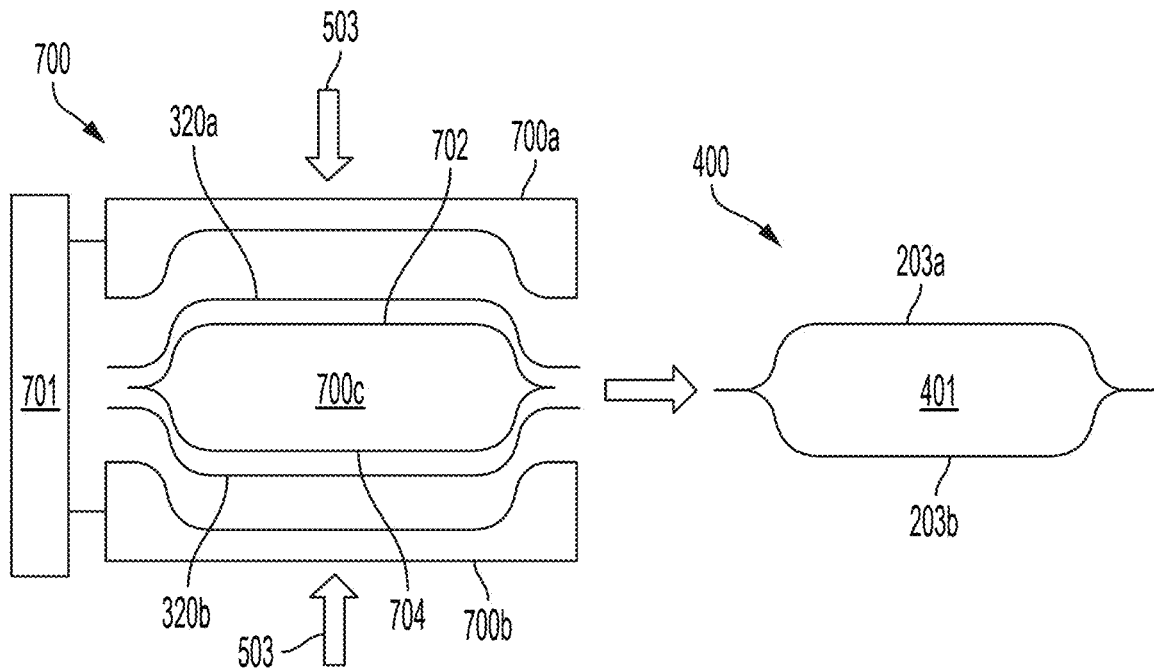
FIG. 7 schematically illustrates a method of fabricating a bifacial sealed GDE assembly using a "one-step" lamination and sealing process according to an embodiment of the present disclosure.

FIG. 7 schematically illustrates a method of fabricating a bifacial sealed GDE assembly 400 using a "one-step" lamination and sealing process. Referring to FIG. 7, a pair of layer stacks 320a and 320b may be placed in the cavity of a mold 700. In various embodiments, each of the layer stacks 320a and 320b may include at least one active electrode layer 311 and at least one backing layer 313, as shown in FIG. 3B. Each of the layer stacks 320a and 320b may also include a current collector 315. The mold 700 may include a three-part structure including a first piece 700a having a concave cross-sectional shape and a second piece 700b also having a concave cross-sectional shape. The concave cross-sectional shapes of the first piece 700a and the second piece 700b may be identical or substantially identical to each other, and the concave surfaces of the first and second piece 700a and 700b may be arranged in the mold 700 such that they face towards each other as shown in FIG. 7. The mold 700 in the embodiment of FIG. 7 may additionally include a third piece 700c that is located between the first piece 700a and the second piece 700b. The third piece 700a may include a convex cross-sectional shape that includes a first convex surface 702 that is complementary to and faces the concave surface of the first piece 700a of the mold 700, and a second convex surface 704 that is complementary to and faces the concave surface of the second piece 700b of the mold 700.

A first layer stack 320a may be placed in the mold 700 between the first piece 700a and the third piece 700a, and a second layer stack 320b may be placed in the mold 700 between the second piece 700b and the third piece 700c, as shown in FIG. 7. Portions of the layer stacks 320a and 320b along a bottom side and two lateral sides of the respective layer stacks 320a and 320b may extend beyond the peripheral edges of the third piece 700c of the mold 700. The first layer stack 320a and the second layer stack 320b may be arranged such that a backing layer 313 on an outer surface of the respective layer stacks 320a and 320b faces the third piece 700c, and an active layer 311 located on an outer surface of the respective layer stacks 320a and 320b faces either the first piece 700a or the second piece 700b of the mold 700.

Then, the first layer stack 320a may be mechanically pressed between the first piece 700a and surface 702 of the third piece 700c of the mold 700 while, simultaneously, the second layer stack 320b may be mechanically pressed between the second piece 700b and surface 704 of the third piece 700c of the mold 700, as schematically illustrated by arrows 503 in FIG. 7. Peripheral portions of the first layer stack 320a and the second layer stack 320b along a bottom side and two lateral sides of the layer stacks 320a and 320b may contact each other and may be mechanically pressed between the first piece 700a and the second piece 700b of the mold 700 to form the substantially planar, flat portion 405 of the finished GDE assembly 400 (see FIGS. 4A-4D). In some embodiments, the first layer stack 320a and the second layer stack 320b may be pressed using a hot press process. A heat source 701, which may be for example, an inductive heat source, an indirect resistive heating source and/or a direct resistive heating source, may heat the layer stacks 320a and 320b to an elevated temperature during the hot press process. In some embodiments, during the hot press process, the layer stacks 320a and 320b may be compressed to a pressure of at least about 400 psi while heated to a temperature of at least about 300° C. The hot press process may laminate each of the layer stacks 320a and 320b to produce a pair of laminate structure GD electrodes 203a and 203b having a desired three-dimensional shape while simultaneously bonding the pair of laminate structure GD electrodes 203a and 203b together and providing a continuous seal around the bottom and lateral sides of the GD electrodes 203a and 203b. Accordingly, a bifacial sealed GDE assembly 400 may be fabricated using a single, one-step lamination and sealing process. The bifacial sealed GDE assembly 400 may be removed from the mold 700 as shown on the right-hand side of FIG. 7.

Figure 8:
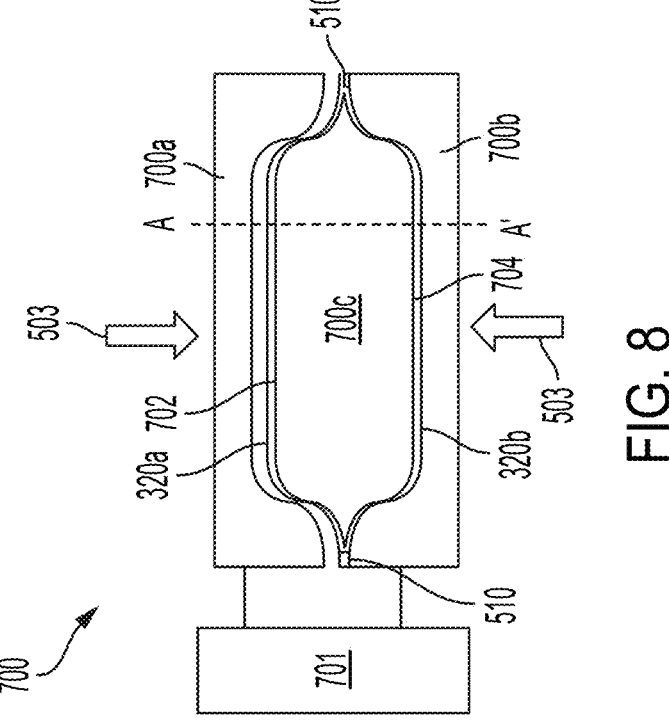
FIG. 8 schematically illustrates a method of fabricating a bifacial sealed GDE assembly using an alternative one-step lamination and sealing process according to an embodiment of the present disclosure.

FIG. 8 schematically illustrates a method of fabricating a GDE assembly 400 using an alternative one-step lamination and sealing process according to an embodiment of the present disclosure. Referring to FIG. 8, a sealant material 510 may be provided between the first layer stack 320a and the second layer stack 320b prior to the lamination and sealing using the mold 700. The sealant material 510 may be provided between the layer stacks 320a and 320b where the layer stacks 320a and 320b contact each other near the bottom and lateral peripheral edges of the layer stacks 320a and 320b. The sealant material 510 may include any suitable sealant material, such as the sealant materials described above with reference to FIG. 5D. The sealant material 510 may improve the sealing of the bifacial sealed GDE assembly 400 to help minimize or prevent liquid infiltration into the internal chamber 401 when the GDE assembly 400 is submerged in electrolyte. In some embodiments, the sealant material 510 may be electrically insulating to provide electrical isolation between the respective electrodes 203a and 203b of the bifacial sealed GDE assembly 400. Alternatively, or in addition, following the lamination and sealing step in the mold 700, an exterior seal may be provided over an outer surface of the GDE assembly 400 along the edges between electrodes 203a and 203b as described above with reference to FIG. 6.

Figure 9:
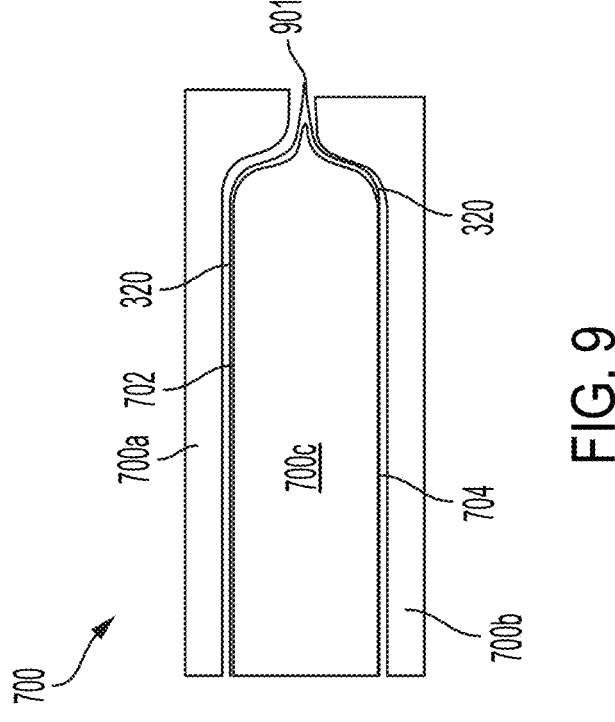
FIG. 9 is a cross-section side view of a mold taken along line A-A' in FIG. 8 illustrating a method of fabricating a GDE assembly using a one-step lamination and sealing process according to an embodiment of the present disclosure.

FIG. 9 is a cross-section side view of a mold 700 such as shown in FIGS. 7 and 8 taken along line A-A' in FIG. 8. FIG. 9 shows an alternative one-step lamination and sealing process according to an embodiment of the present disclosure. In the alternative one-step lamination and sealing process of FIG. 9, a single continuous layer stack 320 may be provided within the mold. The single continuous layer stack 320 may be folded over such that a first portion of the continuous layer stack 320 may be located between the first piece 700a and the third piece 700c of the mold 700, and a second portion of the continuous layer stack 320 may be located between the second piece 700b and the third piece 700c of the mold 700 as shown in FIG. 9. Portions of the continuous layer stack 320 adjacent to the lateral edges of the continuous layer stack 320 may extend beyond the peripheral edges of the third piece 700c of the mold 700. A portion of the continuous layer stack 320 including the fold 901 in the continuous layer stack 320 may also extend beyond the peripheral edge of the third piece 700c of the mold 700 as shown in FIG. 9. The continuous layer stack 320 may be mechanically pressed and subjected to elevated temperature to laminate and seal the single continuous layer stack 320 and produce a bifacial sealed GDE assembly 400 in a single step, as described above with reference to FIG. 7. In some embodiments, the pressing process may provide a pair of seals extending along the lateral sides of the GDE assembly 400 but may not seal the assembly 400 along the bottom side of the assembly 400. In such embodiments, the fold 901 in the continuous layer stack 320 may provide sufficient hydraulic isolation along the bottom peripheral edge 406 of the GDE assembly 400.

Although the embodiment shown and described with reference to FIG. 9 includes a "single-step" lamination and sealing assembly process, it will be understood that a similar technique may be utilized to form a GDE assembly 400 from a single layer stack 320 using a "two-step" lamination and sealing assembly process. In particular, a layer stack 320 as described above may be pressed (e.g., hot pressed) in an initial step to provide a laminate structure having a desired three-dimensional shape as described above with reference to FIG. 5B. For example, an initial lamination step may provide a pair of laminate structure GD electrodes 203 arranged back-to-back on a single laminated sheet. The laminated sheet may be folded over in a clam-shell configuration and arranged in a mold 700 as shown in FIG. 9, or alternatively, in a mechanical press apparatus 505 such as shown in FIGS. 5C and 5D. A second mechanical pressing step at elevated temperature may be used to seal the continuous laminate structure and provide a bifacial sealed GDE assembly 400.

Figure 10:
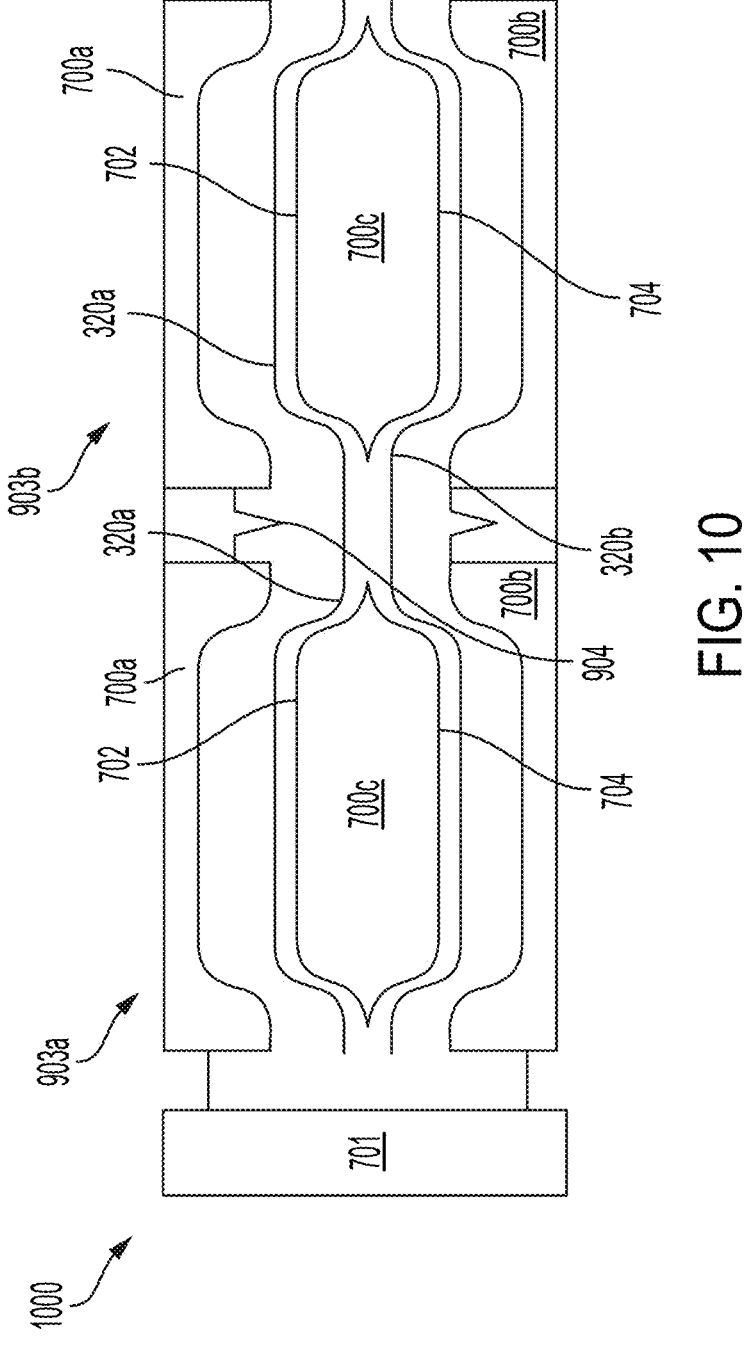
FIG. 10 schematically illustrates an alternative one-step lamination and sealing process that may be used to produce a plurality of GDE assemblies at the same time according to another embodiment of the present disclosure.

FIG. 10 schematically illustrates an alternative one-step lamination and sealing process that may be used to produce a plurality of GDE assemblies 400 at the same time according to another embodiment of the present disclosure. FIG. 10 illustrates an apparatus 1000 that includes a pair of molds 903a and 903b located adjacent to one another. Each of the molds 903a and 903b may include a three-part structure including a first piece 700a, a second piece 700b and a third piece 700c between the first piece 700a and the second piece 700b as discussed above with reference to FIG. 7. A first continuous layer stack 320a may be provided to the apparatus 1000 such that the first continuous layer stack 320a extends between the first piece 700a and the third piece 700c in the first mold 903a, and between the first piece 700a and the third piece 700c in the second mold 903b. A second continuous layer stack 320b may be provided to the apparatus 100 such that the second continuous layer stack 320a extends between the second piece 700b and the third piece 700c in the first mold 903a in the first mold 903a and between the second piece 700b and the third piece 700c in the second mold 903b. In some embodiments, one or more feed apparatuses, such as rollers (not shown in FIG. 10) may be used to feed the respective layer stacks 320a and 320b into the apparatus 1000. The apparatus 1000 may mechanically press the layer stacks 320a and 320b within the molds 903a and 903b while the layer stacks 320a and 320b are heated using a heat source 701 to laminate and seal the layer stacks 320a and 320b and produce a pair of bifacial sealed GDE assemblies 400. In some embodiments, a cutting apparatus 904 may cut through the layer stacks 320a and 320b during the pressing process to separate the two GDE assemblies 400 that are produced during the pressing step.

Although the embodiment shown in FIG. 10 illustrates two continuous layer stacks 320a and 320b within the apparatus 1000, it will be understood that in some embodiments a single layer stack 320 may be provided within the apparatus 1000 such that the layer stack 320 is folded over the upper and lower surfaces of the third pieces 700c of the respective molds 903a and 903b, such as shown in FIG. 9. Thus, a single layer stack 320 may be used to produce a pair of GDE assemblies 400 in a single-step lamination and sealing process.

Further, although the embodiment shown and described with reference to FIG. 10 includes a "single-step" lamination and sealing assembly process, it will be understood that a similar process may be utilized to form a plurality of GDE assemblies 400 using a "two-step" lamination and sealing assembly process. In particular, a pair of continuous layer stacks 320a and 320b as described above may be pressed (e.g., hot pressed) in an initial step to provide a pair of laminate structure GD electrodes 203 on a single laminated sheet. The laminated sheet may be arranged in an apparatus 1000 including two molds 903a and 903b such as shown in FIG. 10, or alternatively, in an apparatus including a pair of mechanical press apparatuses 505 such as shown in FIGS. 5C and 5D. A second mechanical pressing step at elevated temperature may be used to seal the continuous laminate structures and provide a pair of bifacial sealed GDE assemblies 400. A cutting apparatus 904 as shown in FIG. 10 may separate the individual GDE assemblies 400.

In addition, although the embodiment shown in FIG. 10 illustrates a mold apparatus 1000 that includes a pair of molds 903a and 903b located adjacent to one another, it will be understood that a mold apparatus 1000 can include more than two molds 903 or press apparatuses 505, and may be capable of producing more than two GDE assemblies 400 at the same time. A mold apparatus 1000 may include a line of molds 903/press apparatuses 505 disposed along one direction, or may include a two-dimensional array of molds 903/press apparatuses 505 extending along two perpendicular directions.

Figures 11A, 11B, 11C:
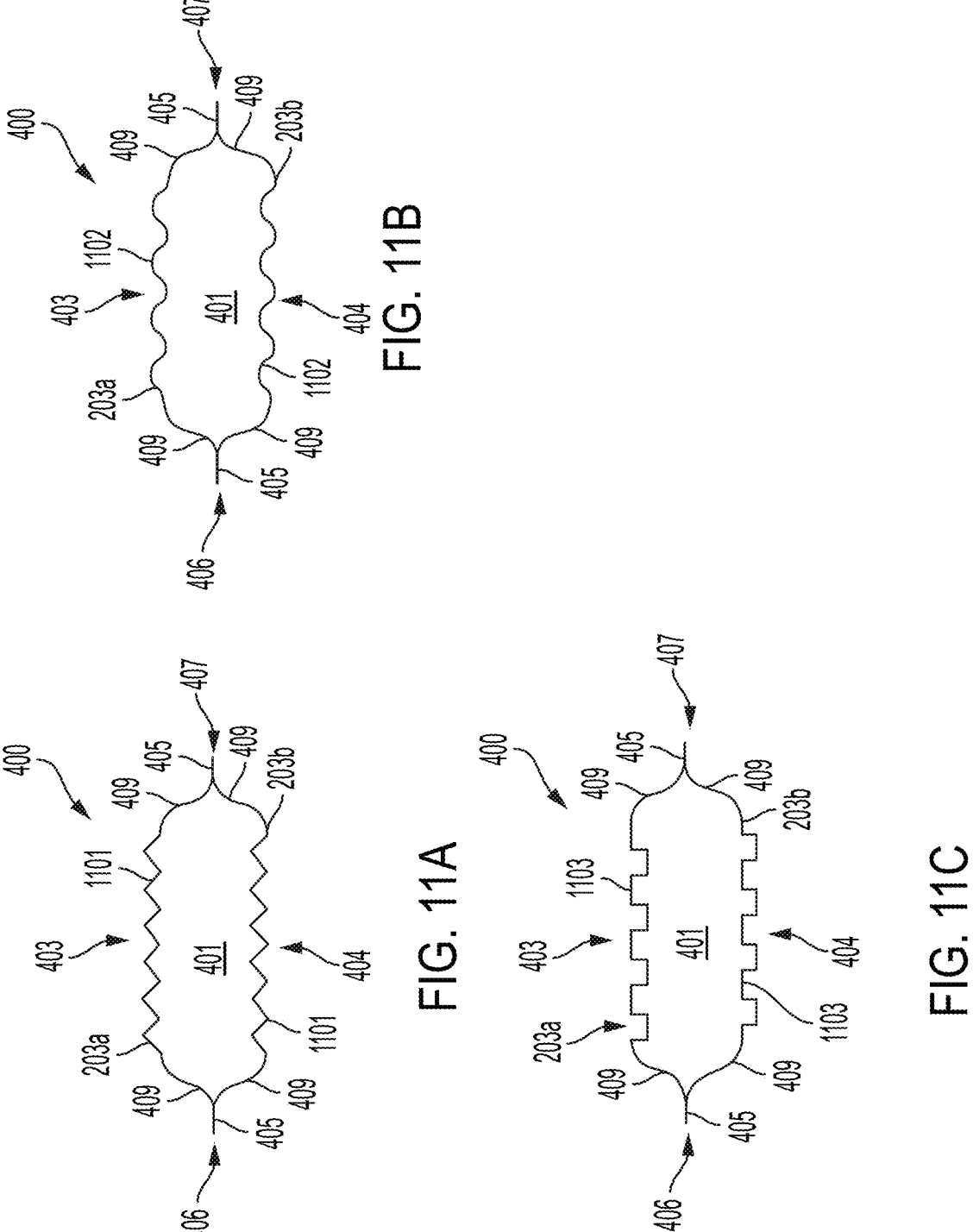
FIGS. 11A-11C are cross-section views of exemplary GDE assemblies having contoured outer surfaces according to an embodiment of the present disclosure.

In some embodiments, a bifacial sealed GDE assembly 400 formed using a "one-step" or a "two-step" lamination and sealing process may include at least one outer surface having a textured, contoured and/or roughened three-dimensional shape. In particular, the central region(s) 410 of the front 403 and/or rear 404 sides of the GDE assembly 400 (see FIGS. 4A-4D) may include a textured, contoured and/or roughened surface rather than a substantially planar surface as shown in FIGS. 4A-4D. A textured, contoured and/or roughened surface may increase the surface area of the GDE assembly 400, which may increase the area and/or quantity of triple-phase boundaries. FIGS. 11A-11C are cross-section views of exemplary GDE assemblies 400 having contoured outer surfaces. In particular, the front 403 and rear 404 sides of the GDE assemblies of FIG. 11A-11C include a ribbed configuration, including sawtooth-shaped ribs 1101 (FIG. 11A), sinusoidal-shaped ribs 1102 (FIG. 11B), and square-wave shaped ribs 1103 (FIG. 11C). Other suitable three-dimensional contours, textures, and/or patterns may also be utilized. The textured, contoured and/or roughened shape(s) may be formed during the lamination process used to produce the laminate structure GD electrodes 203a and 203b. For example, a mold 500, 700, 903a, 903b such as shown in FIGS. 5A-5B and 7-10 may be shaped so as to impart a textured, contoured and/or roughened three-dimensional shape to the layer stacks 320 during either a "one-step," a "two-step," or a "three-step" lamination and sealing process as described above.

Figures 12A, 12B:
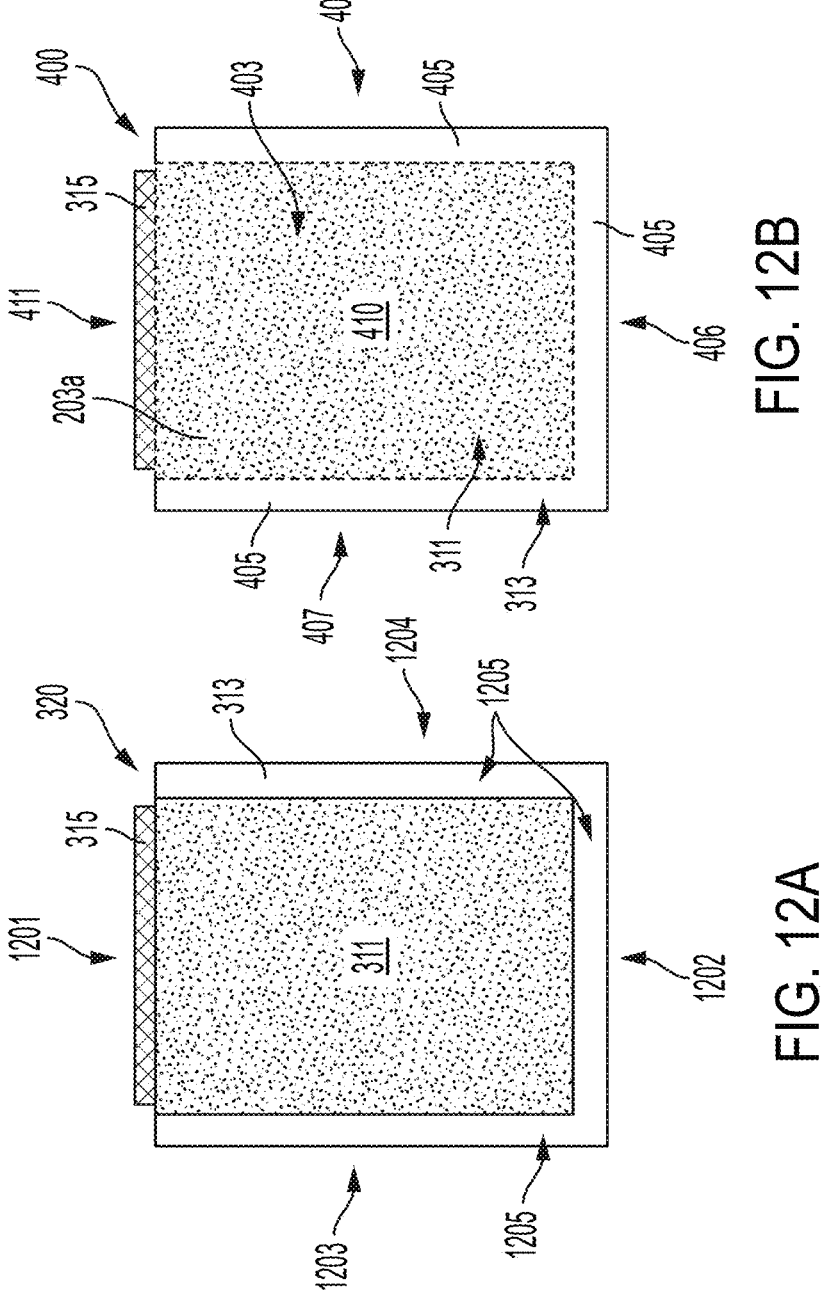
FIGS. 12A-12C illustrate a GDE assembly and a process of producing GDE assembly having a reduced active area according to an embodiment of the present disclosure.
Figure 12C:
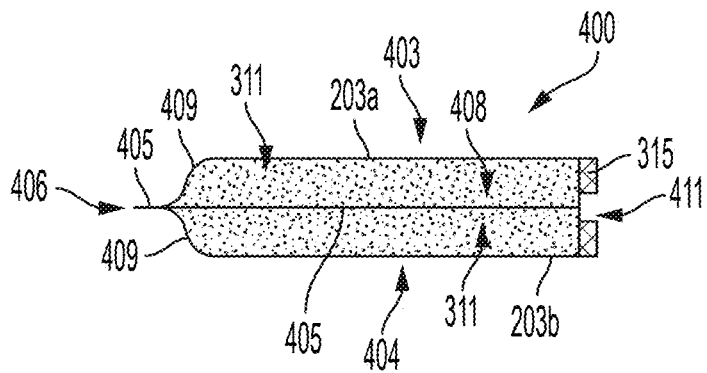

FIGS. 12A-12C illustrate a GDE assembly 400 and a process of producing GDE assembly 400 having a reduced active area according to an embodiment of the present disclosure. In some cases, it may be advantageous to limit the size of the active electrode layer material(s) used in a laminate structure GD electrode 203 and/or GDE assembly 400. For instance, limiting the area of the active layer 311 to only the electrochemically active regions of the electrode 203 and/or GDE assembly 400 (i.e., regions where a gas-liquid interface may occur) may help to reduce the cost of the electrode/GDE assembly. FIG. 12A is a top view of a layer stack 320 that includes at least one active layer 311, at least one backing layer 313, and an optional current collector 315. In one non-limiting embodiment, the layer stack 320 may include an active layer 311 located over or beneath a pair of backing layers 313 with a current collector 315 located between the pair of backing layers 313. The current collector 315 may partially extend beyond the periphery of the active layer 311 and the backing layers 313 at a first end 1201 of the stack 320. A length and/or width dimension of the active layer 311 may be less than the corresponding length and/or width dimension of the at least one backing layer 313, such that a surface of a backing layer 313 may be exposed adjacent to the active layer 311 in a gap region 1205 along a periphery of the layer stack 320. In the embodiment shown in FIG. 12A, the gap region 1205 extends continuously along the lateral edges 1203 and 1204 and a bottom edge 1202 of the layer stack FIGS. 12B and 12C are front and side views of a GDE assembly 400 that may be formed using a layer stack 320 as shown in FIG. 12A. The GDE assembly 400 may be formed using any of the methods described above, such as a "one-step" or "two-step" lamination and sealing method using mechanical pressure and heat. The layer stack 320 shown in FIG. 12A may thus form a laminate structure GD electrode 203a that may be located on one side (i.e., face) 403 of a bifacial sealed GDE assembly 400. A second laminate structure GD electrode 203b may form the opposite side (i.e., face) 404 of the bifacial sealed GDE assembly 400. As shown in FIGS. 12B and 12C, the active layer 311 of the electrode 203a is located over the central region 410 and extends to the top peripheral edge 411 of the GDE assembly 400 and may also extend over the convex portions 409 of GDE assembly 400. The active layer 311 in this embodiment does not extend to the bottom peripheral edge 406 or the lateral peripheral edges 407 and 408 of the GDE assembly 400. In some embodiments, the active layer 311 may not be present on the substantially planar, flat portion 405 of the GDE assembly 400. In other embodiments, the active layer 311 may extend over part of the planar, flat portion 405, but may not extend to the bottom peripheral edge 406 and/or the lateral peripheral edges 407 and 408 of the GDE assembly 400. In some embodiments, a backing layer 313 may be exposed on the planar, flat portion 405 of the GDE assembly 400.

Figures 13A, 13B:
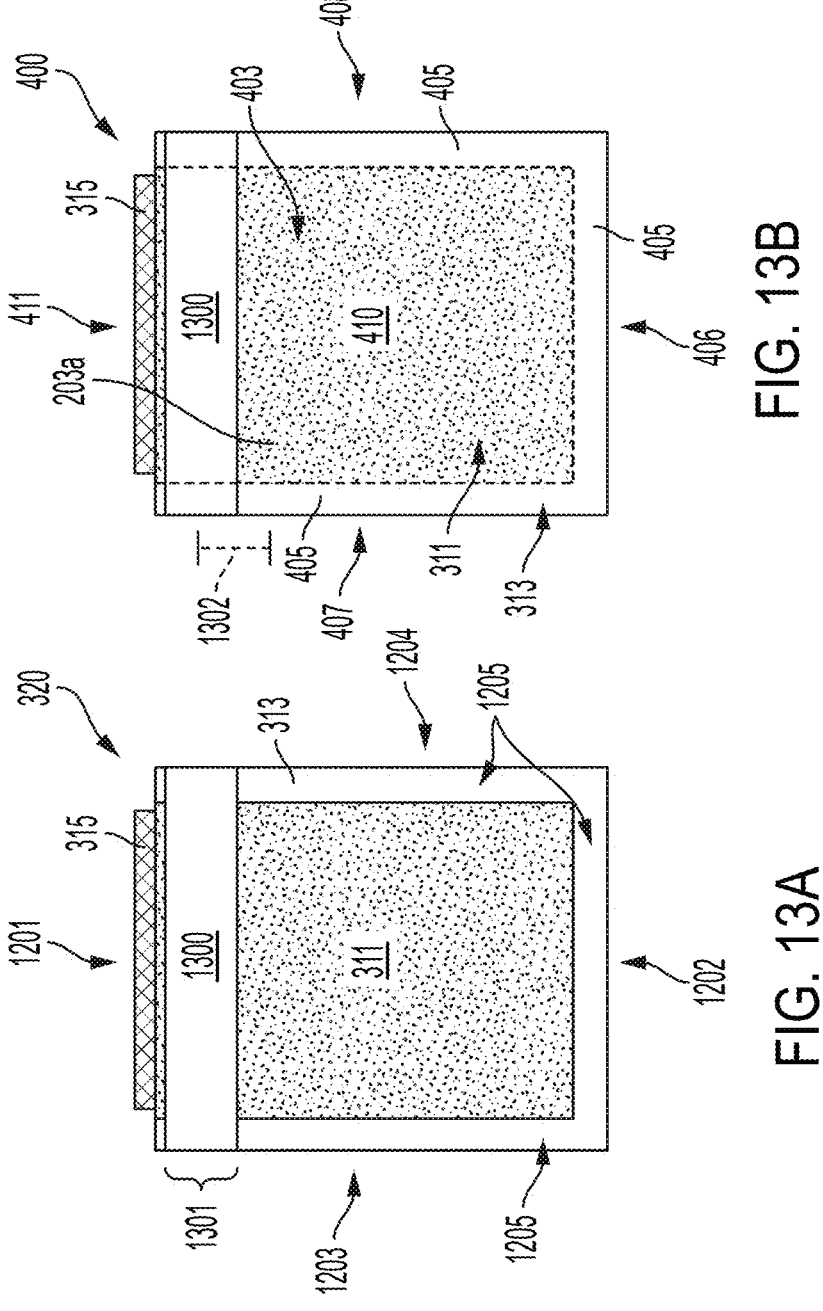
FIGS. 13A-13C illustrate a GDE assembly and a process of producing GDE assembly having a reduced active area according to another embodiment of the present disclosure.
Figure 13C:
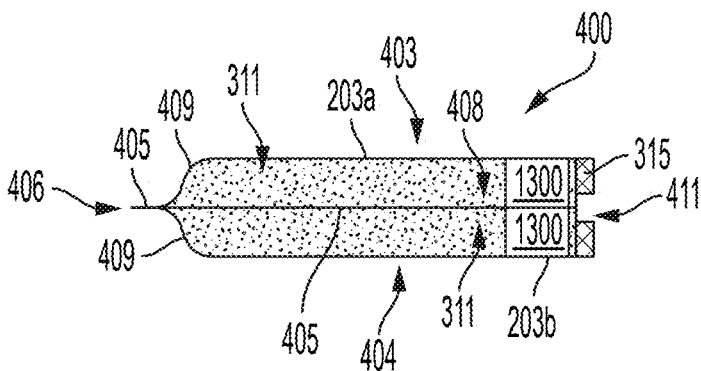

FIGS. 13A-13C illustrate a GDE assembly 400 and a process of producing GDE assembly 400 having a reduced active area according to another embodiment of the present disclosure. The embodiment of FIGS. 13A-13C is similar to the embodiment of FIGS. 12A-12C, except that the active layer 311 does not extend to the top peripheral edge 411 of the GDE assembly 400. In many instances in which a GDE assembly 400 is submerged in a liquid electrolyte bath, the liquid level of the electrolyte may not reach the uppermost portions of the GDE assembly 400. In addition, the location of the liquid level may change over time, which may be due to cycling during battery operation. This is illustrated in FIG. 13B, which schematically illustrates a range 1302 of locations of the liquid level during normal battery operation. Since the top portion of the GDE assembly 400 is not consistently wetted by electrolyte, a cost savings may be achieved by using a reduced active area such that the active layer 311 does not extend to the top peripheral edge 411 of the GDE assembly 400. However, leaving a backing layer 313 exposed in this region may not be desirable because the changing liquid level of the electrolyte means that the backing layer 313 will often be directly exposed to the liquid electrolyte. To address this issue, a strip of inactive sealing material 1300 may be provided on the outer surface of the electrode(s) 203a, 203b at or near the top peripheral edge 411 of the GDE assembly 400. FIG. 13A is a top view of a layer stack 320 that includes at least one active layer 311, at least one backing layer 313, and a current collector 315. The active layer 311 does not extend to the top peripheral edge 1201 of the layer stack 320 such that a gap region 1301 is present between the periphery of the active layer 311 and the top peripheral edge 1201 of the layer stack 320. A strip of inactive sealing material 1300 may be provided on the layer stack 320 over all or a portion of the gap region 1301. The inactive sealing material 1300 may extend between the lateral peripheral edges 1203 and 1204 of the layer stack 320, and in some embodiments, may extend to the top peripheral edge 1201 of the layer stack 320. In other embodiments, such as shown in FIG. 13A, the inactive sealing material 1300 may not extend to the top peripheral edge 1201 of the layer stack 320, such that a region of a backing layer 313 may be exposed adjacent to the top peripheral edge 1201 of the layer stack 320. The inactive sealing material 1300 may be comprised of a suitable material that is not electrochemically active in the finished electrode/GDE assembly, and also prevents or inhibits liquid electrolyte infiltration through the sealing material 1300 and into the interior of the GDE assembly. In some embodiments, the inactive sealing material 1300 may comprise a plastic sheet or membrane.

FIGS. 13B and 13C are front and side views of a GDE assembly 400 that may be formed using a layer stack 320 as shown in FIG. 13A. The GDE assembly 400 may be formed using any of the methods described above, such as a "one-step" or "two-step" lamination and sealing method using mechanical pressure and heat. Each of the laminate structure GD electrodes 203a and 203b which make up the GDE assembly 400 may include a strip of inactive sealing material 1300 extending an upper region of the electrode 203a and 203b. The active layers 311 of the electrodes 203a and 203b may be located vertically below and adjacent to the strips of inactive sealing material 1300. The strips of inactive sealing material 1300 may at least partially overlap the range 1302 of locations of the liquid level during normal battery operation. In various embodiments, the upper edges of the strips of inactive sealing material 1300 may be located above the upper end of the range 1302 of locations of the liquid level. In some embodiments, the strips 1300 may extend to the top peripheral edge 411 of the GDE assembly 400. In other embodiments, such as shown in FIGS. 13B and 13C, the upper edges of the strips 1300 may be located below top peripheral edge 411 the GDE assembly 400. A backing layer 313 may be exposed between the upper edges of the strips 1300 and the top peripheral edge 411 of the GDE assembly 400. In some embodiments, the lower end of the range 1302 of locations of the liquid level may be below the bottom edges of the strips 1300, and may correspond to the locations of the active layers 311.

Figure 14A:
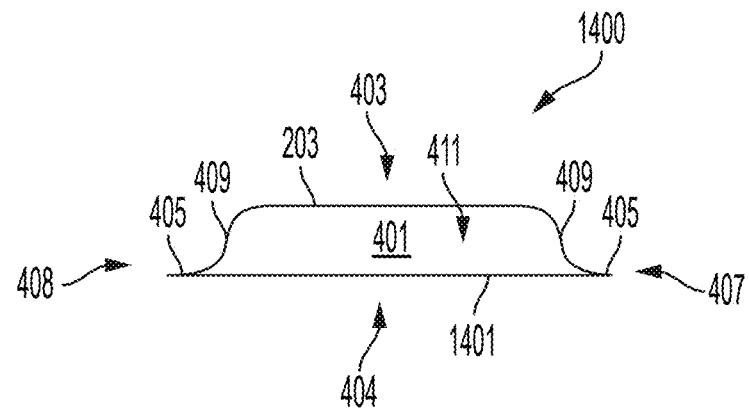
FIGS. 14A and 14B are top and side views, respectively, of a GDE assembly according to another embodiment of the present disclosure.
Figure 14B:
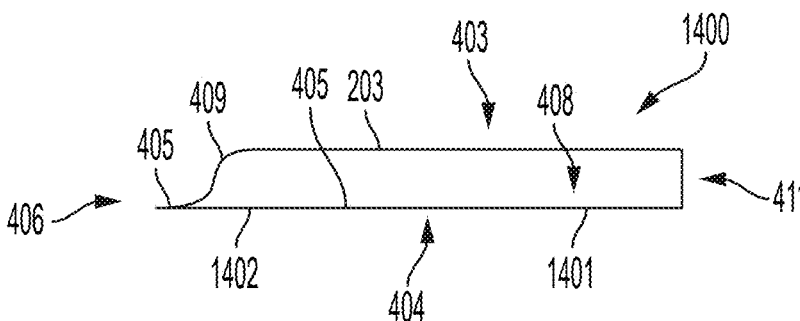

FIGS. 14A and 14B are top and side views, respectively, of a GDE assembly 1400 according to another embodiment of the present disclosure. Referring to FIGS. 14A and 14B, the GDE assembly 1400 includes a laminate structure GD electrode 203 on a first (e.g., front) side 403 of the GDE assembly 1400. The opposite (e.g., rear) side 404 of the GDE assembly 1400 includes a planar surface 1401. The laminate structure GD electrode 203 may have a contoured three-dimensional shape including a flat, planar portion 405 adjacent to the bottom peripheral edge 406 and the lateral peripheral edges 407, 408 of the laminate structure GD electrode 203, and a convex portion 409 extending from the flat, planar portion 405 to a raised central region of the laminate structure GD electrode 203. The laminate structure GD electrode 203 may be bonded to a second member 1402 that may be a substantially flat sheet or substrate that forms the planar surface 1401 on the rear side 404 of the GDE assembly 1400. The GDE assembly 1400 may include an opening at the top peripheral edge 411 of the GDE assembly 1400 into an internal chamber 401 that is located between the GD electrode 203 and the second member 1402. The GDE assembly 1400 may be sealed to hydraulically isolate the internal chamber 401 from surrounding liquid electrolyte. The GDE assembly 1400 may be sealed using any of the methods described above, such as by hot pressing the laminate structure GD electrode 203 and the second member 1402 around the flat, planar portion 405 of the GD electrode 203 (with or without a sealant material) to form a continuous seal along the lateral and bottom sides of the assembly 1400. Alternatively, or in addition, an external seal may be used to seal the edges of the assembly 1400 between the GD electrode 203 and the second member 1402.

In some embodiments, the second member 1402 may be electrochemically inert. For example, the second member 1402 may be a support substrate that may be made of plastic or another suitable material. In embodiments in which the second member 1402 is electrochemically inert, the GDE assembly 1400 includes an electrode 203 on a first (e.g., front) side 403 of the GDE assembly 1400 but does not include an electrode on the opposite (e.g., rear) side 404 of the GDE assembly 1400. Thus, the GDE assembly 1400 may be referred to as a "monofacial GDE assembly 1400."

Alternatively, the second member 1402 may be electrochemically active, and may include a planar electrode on the second (e.g., rear) side 404 of the GDE assembly 1400. The planar electrode may be an ORR electrode or an OER electrode, for example.

The laminate structure GD electrode 203 may be formed using any of the methods described above. For example, a two-step process may be used to form the GD electrode 203, including pressing a layer stack in a mold at elevated temperature to form the GD electrode 203 in the desired three-dimensional shape, and followed by a second step of bonding and sealing the GD electrode 203 to the second member 1402, such as using a heated mechanical press. Alternatively, the GDE assembly 1400 may be formed in a single-step process that may include forming the laminated structure GD electrode 203 in a mold while simultaneously sealing the GD electrode 203 to the second member 1402.

Figures 15A, 15B:
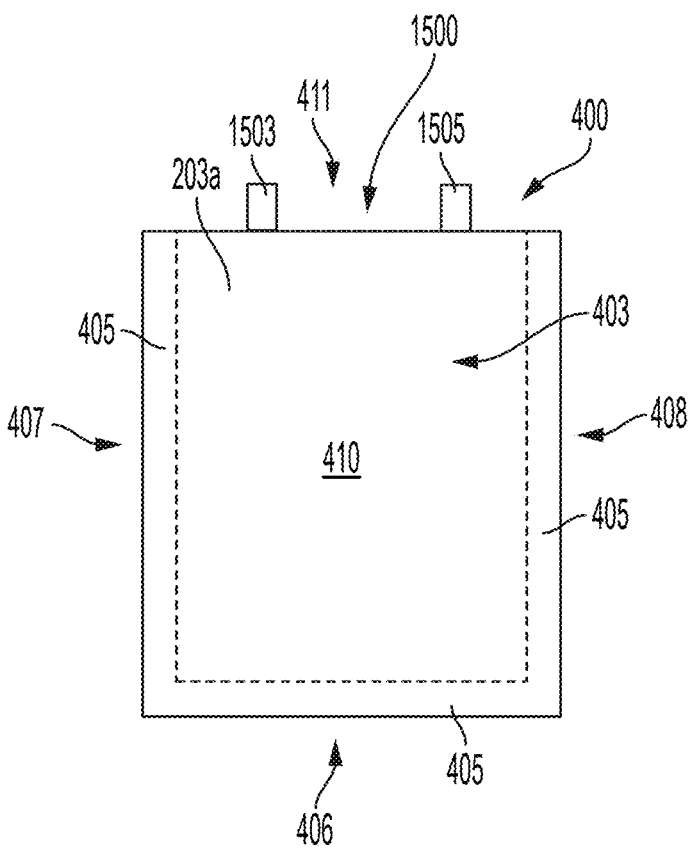
FIGS. 15A and 15B are front and top views, respectively, of a bifacial sealed GDE assembly that includes an insert within the internal chamber of the GDE assembly according to an embodiment of the present disclosure.

FIGS. 15A and 15B are front and top views, respectively, of a bifacial sealed GDE assembly 400 that includes an insert 1500 within the internal chamber 401 of the GDE assembly 400. The insert 1500 may include open regions or channels that define a flow field, such as described above with reference to FIG. 3A. The insert 1500 may define a pair of flow fields configured to direct air across the back sides of the respective GD electrodes 203a and 203b. The insert 1500 may be comprised of a suitable material, such a plastic and/or metal material. In some embodiments, the insert 1500 may be inserted into the internal chamber 401 of the GDE assembly 400 such that the flow fields may be pressed against the adjacent electrodes 203a and 203b. In some embodiments, an adhesive material may be used to bond the insert 1500 to the adjacent electrode surfaces. A filler material may optionally be provided around the periphery of the insert 1500 to fill the remaining volume of the chamber 401, such as in non-electrochemically-active regions of the GDE assembly 400. Because the insert 1500 is located within the sealed internal chamber 401 of the GDE assembly 400, the insert 1500 is not exposed to the potentially caustic liquid electrolyte. Thus, less durable and/or less expensive materials may be utilized. In addition, because the insert 1500 is not directly exposed to the electrolyte, the insert 1500 structure does not need to be liquid-tight. One or more conduits 1503 and 1503 may direct air to and from the insert 1500.

In some embodiments, the insert 1500 may be composed of or may include an electrically conductive material (e.g., a metal material) that may contact the electrodes 203a and 203b. In such embodiments, the insert 1500 may be used as an alternative to, or as a supplement to, an electrically conductive current collector embedded within the laminate structure GD electrodes 203a and 203b.

Figure 16A:
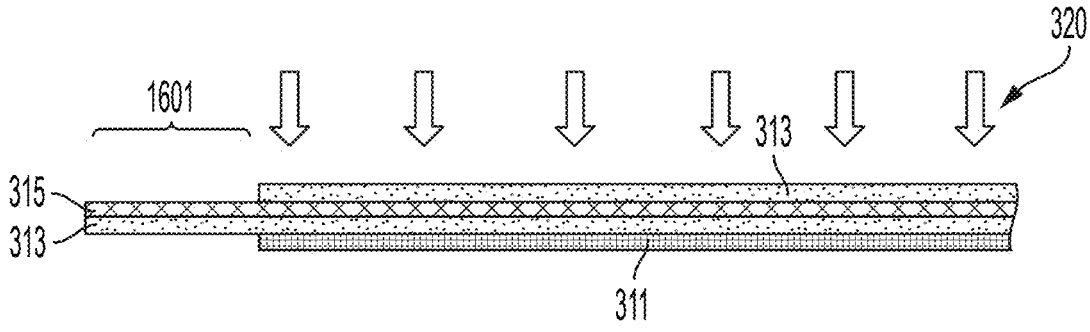
FIGS. 16A-16C illustrate a method of fabricating a bifacial sealed GDE assembly having an internal conductive member according to yet another embodiment of the present disclosure.
Figure 16B:
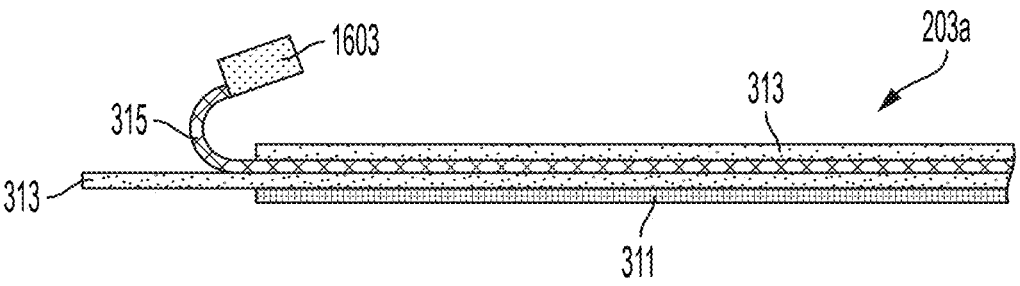
Figure 16C:
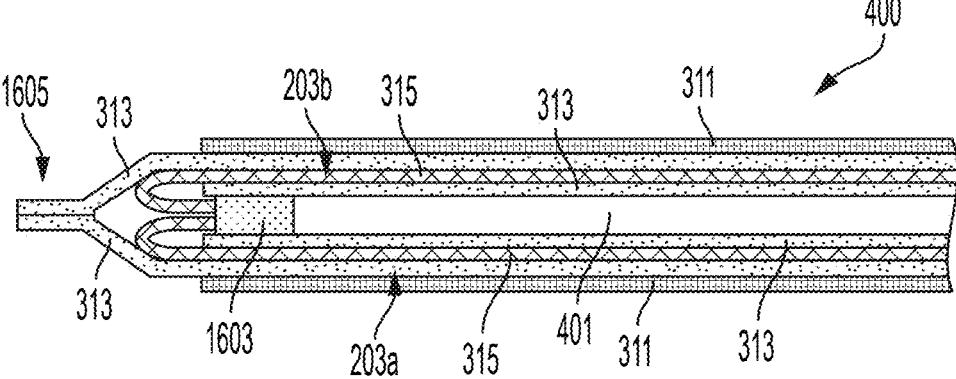

FIGS. 16A-16C illustrate a method of fabricating a bifacial sealed GDE assembly 400 having an internal conductive member 1603 according to yet another embodiment of the present disclosure. Referring to FIG. 16A, a layer stack 320 including an active layer 311, a pair of backing layers 313 and a current collector 315 between the pair of backing layers 313 is illustrated. Heat and pressure may be applied to the layer stack 320 (indicated by the arrows in FIG. 16A) to produce a laminate structure GD electrode 203a as shown in FIG. 16B. A portion of the current collector 315 and at least one backing layer 313 on an edge 1601 of the layer stack 320 may remain unlaminated, as shown in FIGS. 16A and 16B. The unlaminated portion of the current collector 315 may be attached to a conductive member 1603 as shown in FIG. 16B. In some embodiments, the conductive member 1603 may be a bus bar. The current collector 315 may be attached to the conductive member/bus bar 1603 using any suitable method, such as via a separate lamination process.

Referring to FIGS. 16B and 16C, the unlaminated portion of the current collector 315 and the conductive member/bus bar 1603 may be bent or folded over such that the conductive member/bus bar 1603 is located over a surface of the laminate structure GD electrode 203a. The conductive member/bus bar 1603 may be attached to an unlaminated portion of a current collector 315 of a second laminate structure GD electrode 203b, as shown in FIG. 16C. The unlaminated portions of the backing layers 313 of the first laminate structure GD electrode 203a and the second laminate structure GD electrode 203b may be bonded together to form a bifacial sealed GDE assembly 400 having a seal 1605 extending around the periphery of the assembly 400 as shown in FIG. 16C. The conductive member/bus bar 1603 may be located on the same side of the seal 1605 as the interior chamber 401 of the GDE assembly 400 and thus may not be exposed to liquid electrolyte when the GDE assembly 400 is submerged in an electrolyte bath. This may eliminate the need to protect the conductive member/bus bar 1603 below the liquid level of the electrolyte. In some embodiments, the conductive member/bus bar 1603 may extend in a vertical direction (into and out of the page in FIGS. 16A-16C) when the GDE assembly 400 is submerged in electrolyte.

Figures 17A, 17B:
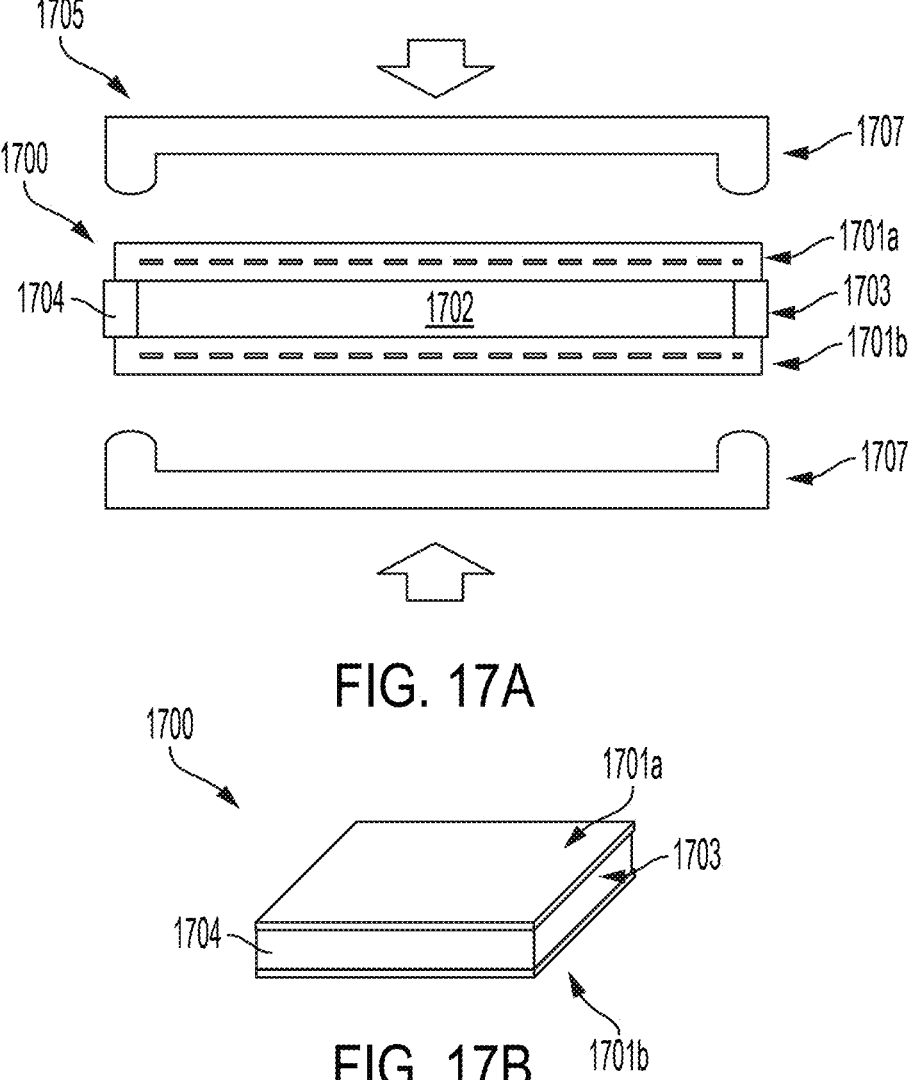
FIGS. 17A and 17B illustrate a method of fabricating a bifacial sealed GDE assembly having a pair of planar GD electrodes attached to a support frame according to an embodiment of the present disclosure.

FIGS. 17A and 17B illustrate a method of fabricating a bifacial sealed GDE assembly 1700 having a pair of planar GD electrodes 1701a and 1701b attached to a support frame 1703. FIG. 17A is a cross-section view of a pair of planar GD electrodes 1701a and 1701b and a support frame 1703 within a mechanical press apparatus 1705 during a process of manufacturing a bifacial sealed GDE assembly 1700. FIG. 17B is a perspective view of the finished bifacial sealed GDE assembly 1700. Referring to FIG. 17A, each of the GD electrodes 1701a and 1701b may be laminate structure GD electrodes that may be formed by mechanically pressing at elevated temperature (e.g., hot pressing) a layer stack including at least one active layer and at least one backing layer as described above. The laminate structure GD electrodes 1701a and 1701b may also include an embedded current collector.

The laminate structure GD electrodes 1701a and 1701b may have planar outer surfaces as shown in FIGS. 17A and 17B. Alternatively, the laminate structure GD electrodes 1701a and/or 1701b may have a textured, contoured and/or roughened outer surface, such as shown in FIGS. 11A-11C.

The support frame 1703 may include one or more sidewalls 1704 extending around the periphery of the support frame 1703. The one or more sidewalls 1704 may surround an open region 1702 interior of the sidewalls 1704. The support frame 305 may be comprised of a suitable structural material such as a plastic (e.g., polypropylene, HDPE, acrylonitrile butadiene styrene (ABS) (e.g., carbon fiber ABS, glass fiber reinforced ABS, etc.), etc.) and/or a metal (e.g., steel, nickel, etc.) material. The sidewalls 1704 of the support frame 1703 may be composed of a material that is sufficiently durable to withstand prolonged exposure to liquid electrolyte.

The one or more sidewalls 1704 may extend continuously around a portion of the periphery of the support frame 1703. One or more openings through the sidewall(s) 1704 (not shown in FIGS. 17A and 17B) may provide access to the open region 1702 of the support frame 1703. In some embodiments, the support frame 1703 may have a generally polygonal shape outer shape, such as a rectangular or square shape as illustrated in FIG. 17B. A support frame 1703 having a rectangular or square shape may have at least three sidewalls 1704 extending continuously around three sides of the support frame 1703. A fourth side of the support frame 1703 may optionally be open to the open region 1702. Other suitable shapes for the support frame 1703, including shapes having one or more curved sidewalls 1704, are within the contemplated scope of disclosure.

The laminate structure GD electrodes 1701a and 1701b and the support frame 1703 may be placed in a mechanical press apparatus 1705 as shown in FIG. 17A. The support frame 1703 may be located between the respective GD electrodes 1701a and 1701b, with the active layers of the electrodes 1701a and 1701b facing outwards. A sealant material, such as a thermoplastic material, an epoxy material, a hot-melt adhesive material, etc., may optionally be located between the sidewalls 1704 of the support frame 1703 and the respective GD electrodes 1701a and 1701b. A pair of heated press plates 1707 may compress the GD electrodes 1701a and 1701b against the support frame 1703 as indicated by the arrows in FIG. 17A to bond the GD electrodes 1701a and 1701b to the support frame 1703 and form a continuous seal between the electrodes 1701a and 1701b and the adjacent sidewall(s) 1704 of the support frame 1703. In the embodiment shown in FIG. 17A, both GD electrodes 1701a and 1701b are bonded and sealed against the support frame 1703 at the same time, although it will be understood that the GD electrodes 1701a and 1701b may be bonded to the support frame 1703 sequentially using separate pressing steps. In various embodiments, the pressure and/or temperature used to bond the GD electrodes 1701a and 1701b to the support frame 1703 may be less than the pressure and/or temperature used to laminate the GD electrodes 1701a and 1701b.

In one embodiment, a vacuum source (not shown in FIG. 17A) may be fluidly coupled to the open region 1702 of the support frame 1703 during the mechanical pressing step. The vacuum source may be used to provide a negative pressure within the open region 1702 of the support frame 1703 that may draw sealant material into pores of the adjacent backing layers of the GD electrodes 1701a and 1701b. This may help to improve the integrity of the seals formed between the GD electrodes 1701a and 1701b and the support frame 1703.

In some embodiments, the support frame 1703 may include an interior portion extending between the sidewall(s) 1704 that may define flow field(s) adjacent to the respective GD electrodes 1701a and 1701b. Alternatively, an insert, which may be similar to insert 1500 shown in FIGS. 15A and 15B, may be inserted through an opening in the support frame 1703 into the open region 1702 of the support frame 1703. The insert may define flow field(s) adjacent to the respective GD electrodes 1701a and 1701b.

In some embodiments, the support frame 1703 and/or an insert within the support frame 1703 may be composed of or may include an electrically conductive material (e.g., a metal material) that may contact the electrodes 1701a and 1701b. In such embodiments, the support frame 1703 and/or insert may be used as an alternative to, or as a supplement to, an electrically conductive current collector embedded within the laminate structure GD electrodes 1701a and 1701b.

As discussed above, in some embodiments a pair of planar GD electrodes 203 may be bonded together and sealed along the edges to provide a bifacial sealed GD electrode assembly. However, the bending and deformation of GD electrodes to create the sealed edges in these configurations may impact their durability and/or performance, as well as putting constraints on the flow field. Therefore, as discussed above with respect to FIGS. 17A and 17B, a support frame may be used in some embodiments to provide a separate perimeter for a sealed GD electrode assembly. The support frame 1703 may be made of any number of suitable materials, for example, a plastic (e.g., polypropylene, HDPE, acrylonitrile butadiene styrene (ABS) (e.g., carbon fiber ABS, glass fiber reinforced ABS, etc.), etc.) and/or a metal (e.g., steel, nickel, etc.) material, and may be pressed in-between laminate structure GD electrodes 1701a and 1701b using a pair of heated press plates or other suitable thermal sealing device. In this manner, the frame material (e.g., ABS, etc.) may be melted at the interface with the respective GD electrodes.

However, depending on the material(s), sealing the GD electrodes to the support frame using heated press plates may present too great a mismatch in coefficient of thermal expansion (CTE). For example, ABS may expand during the thermal sealing, and may subsequently shrink upon cooling to room temperature. Such change may cause surface disturbances or residual stress to the GD electrodes, as well as potentially cause other issues within the battery (e.g., shorts).

In some embodiments, a first sealant material may be used to attach the laminate GD electrodes to the support frame, eliminating the need for thermal processing to create a continuous seal.

Figures 18A, 18B:
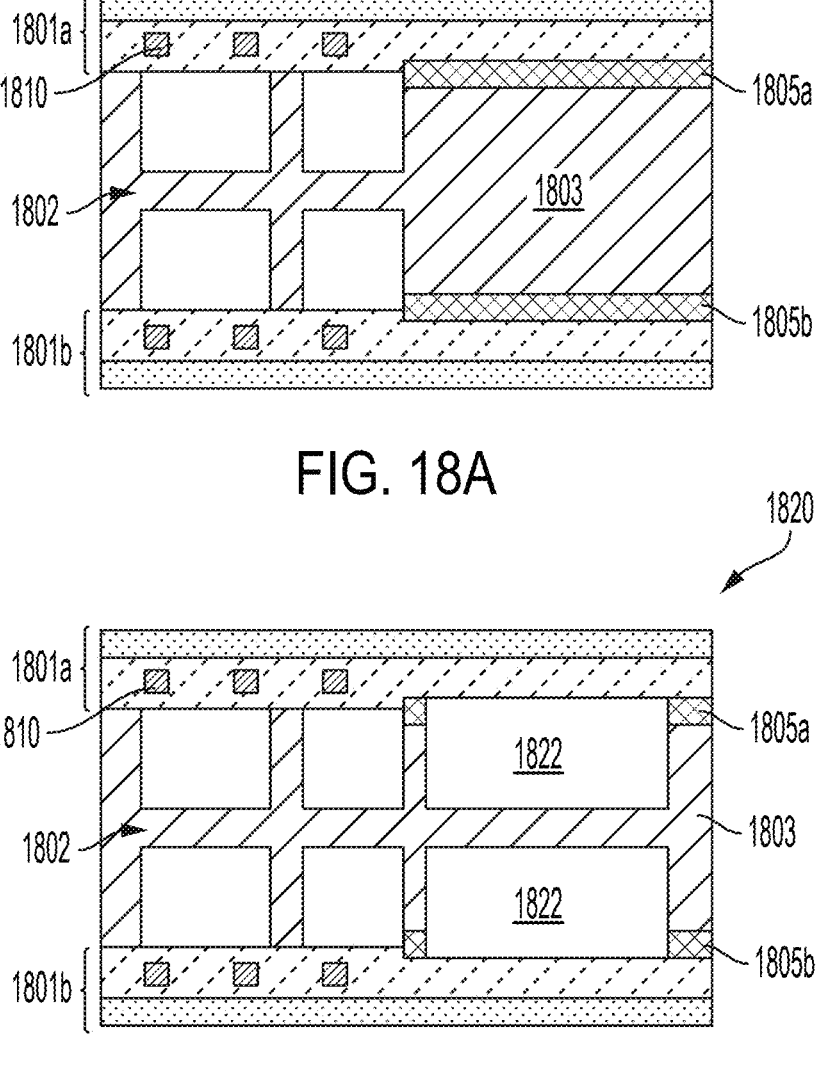
FIG. 18A is a side view of a bifacial sealed GDE assembly having a pair of planar GD electrodes attached to a support frame according to an embodiment of the present disclosure.
FIGS. 18B and 18C are side views of a bifacial sealed GDE assembly having a pair of planar GD electrodes attached to a support frame according to another embodiment of the present disclosure.

Referring to FIG. 18A, each of the GD electrodes 1801a and 1801b may laminate structure GD electrodes that may be formed from a layer stack including at least one active layer and at least one backing layer. As specific examples, the GD electrodes 1801a and 1801b may laminate structure GD electrodes formed by mechanically pressing at elevated temperature (e.g., hot pressing) a layer stack including at least one active layer and at least one backing layer as described above or may be laminate structure GD electrodes formed in other manners. The laminate structure GD electrodes 1801a and 1801b may also include an embedded current collector 1810 that does not extend to the edges where the respective GD electrode is to be sealed to an adjacent surface of the support frame 1803. The laminate structure GD electrodes 1801a and 1801b may have planar outer surfaces as described herein with respect to various embodiments.

In some embodiments, the support frame 1803 may be constructed from a plastic (e.g., ABS), and the first sealant 1805 may be any of a variety of adhesives or thermoplastic materials, such as ABS cement. While bonding the GD electrodes 1801a and 1801b to the support frame 1803 in this manner does not require any thermal processing, normal operation of the product (e.g., battery) that includes such GD electrode assembly in the field may cause thermal cycling, potentially creating the same CTE mismatch between the support frame material and electrodes bonded to the frame, as discussed above.

Therefore, to bring the CTE of the frame closer to that of the GD electrodes, the support frame 1803 in various embodiments may be made using glass fiber reinforced or carbon fiber reinforced polymer. Further, in some embodiments, the support frame 1803 may be made of metal (e.g., carbon steel, nickel-plated carbon steel, etc.) or other rigid material (e.g., graphite, etc.).

The use of a first sealant without thermal processing may be suitable in some instances, but in others may present a durability risk. Specifically, a potential leakage pathway may exist at the interface between the support frame and an adjacent GD electrode. Especially in instances in which backing layer(s) of the laminate structure GD electrodes discussed above are not normally designed to be exposed to electrolyte, use of the first sealant alone may increase the chance of future product failure.

Figure 18C:
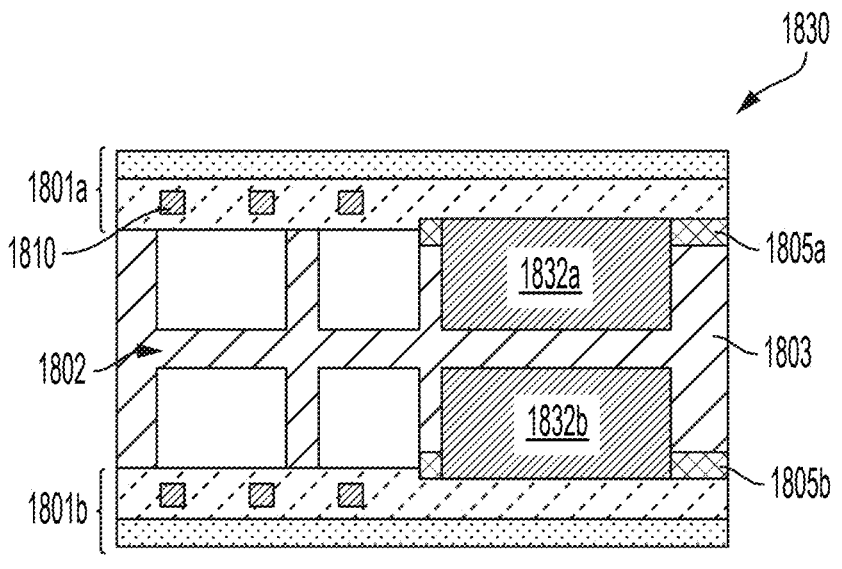

To mitigate such risk, the support frame 1803 according to some embodiments may be designed to include features 1822 for another sealant material, as shown in FIG. 18B. Specifically, the features 1822 incorporated within the support frame 1803 may be cut-outs or channels configured to receive a second sealant 1805, as shown in FIG. 18C. The second sealant 1805 according to various embodiments may include any of a number of suitable adhesive materials, such as one or more epoxy. The second sealant 1805 may be an epoxy that has been found to be durable against electrolyte and infiltrate in order to stem any potential leakage pathways in the GD electrode assembly.

In some embodiments, a bifacial sealed GD electrode assembly 1800 may be created by sealing a planar GD electrode 1801a, 1801b to both sides of the support frame 1803 using the first sealant 1805, followed by filling the features 1822 with the second sealant 1805. Alternatively, the second sealant may be provided before the GD electrodes are bonded to the support frame in some embodiments.

Figure 19A:
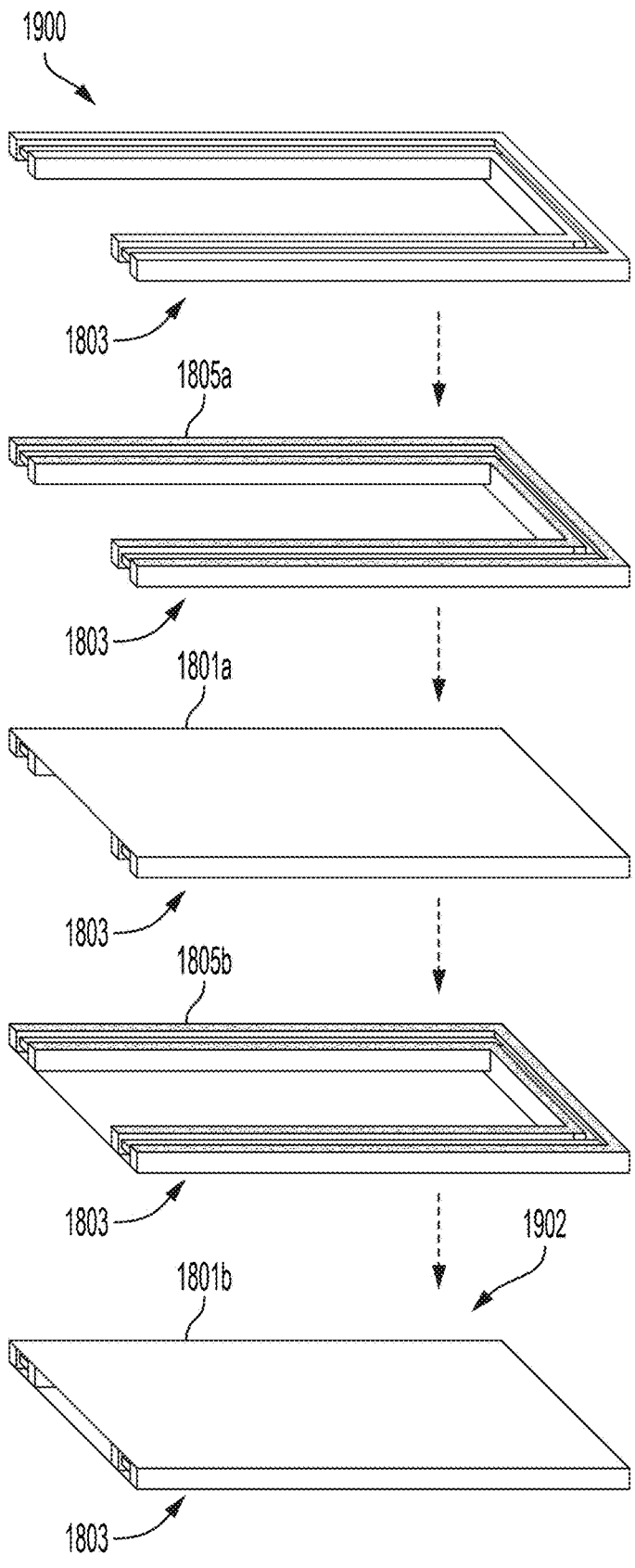
FIGS. 19A and 19B illustrate a method of fabricating bifacial sealed GDE assemblies according to the embodiment shown in FIGS. 18B and 18C.
Figure 19B:
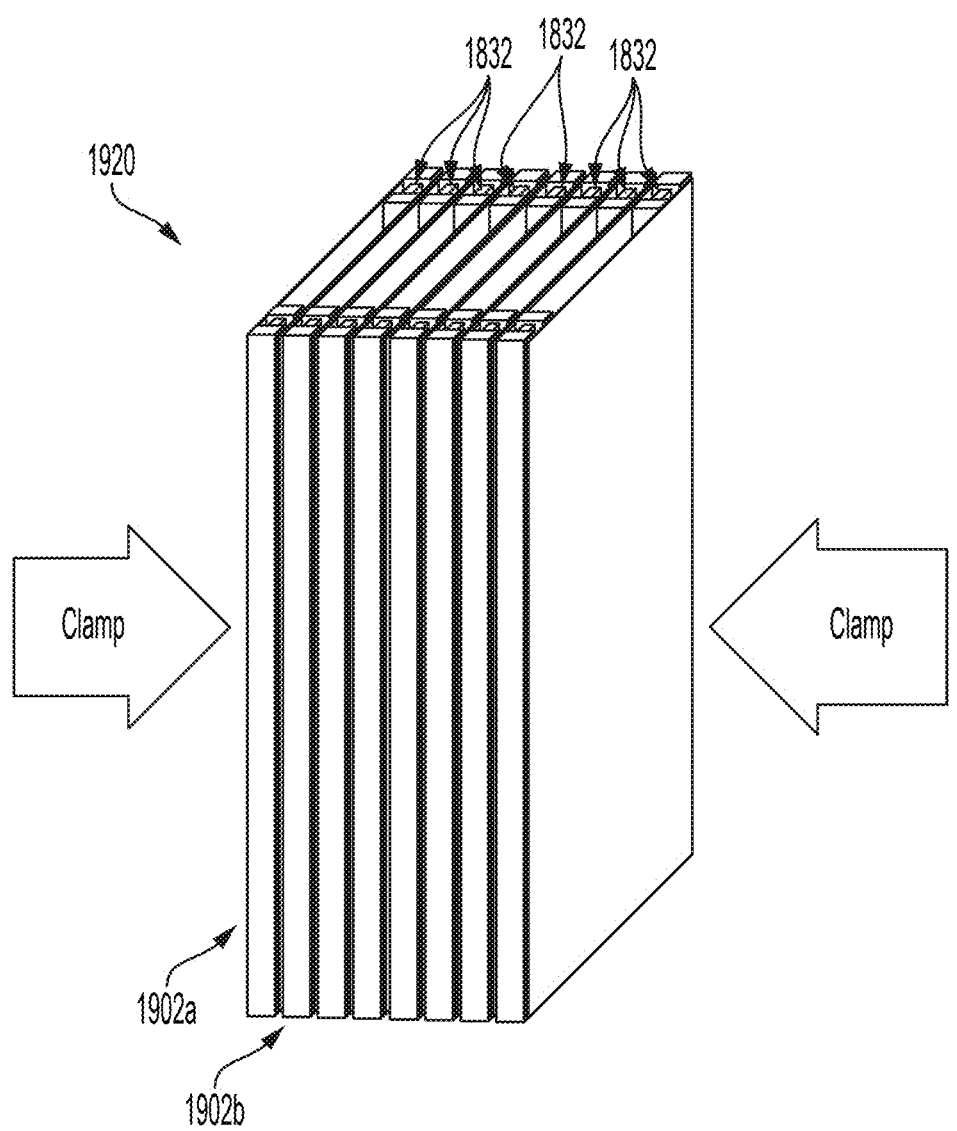

An embodiment process 1900 for manufacturing bifacial sealed GD electrode assemblies is shown in FIGS. 19A and 19B. First, a support frame 1803 made of a rigid material may be provided. The rigid material may be one that is sufficiently durable to withstand prolonged exposure to liquid electrolyte (e.g., ABS). In some embodiments, the support frame 1803 may be formed from a plurality of H-channel sidewalls that surround the periphery of an open region interior. In some embodiments, the support frame 1803 may have at least three H-channel sidewalls extending continuously to form three sides of a square or rectangle, with the fourth side open. The fourth side may be open. Other suitable shapes for the support frame 1803 are within the contemplated scope of disclosure, such as U-shapes, V-shapes, etc.

In a next step of the process 1900, a layer of a first sealant 1805a (e.g., ABS cement) may be applied to a first face of the support frame 1803. Such application may be accomplished using any of a variety of dispensing methods.

In a next step of the process 1900, a first planar GD electrode 1801a may be placed on the first face of the support frame 1803 containing the first sealant 1805a, and allowed to cure. In some embodiments, the GD electrodes used in process 1900 may be laminate structure GD electrodes that were fabricated in a separate lamination process. For example, a layer stack including at least one active layer, at least one backing layer, and a current collector (e.g., copper) may have been hot pressed together as described herein. In various embodiments, fabrication of the GD electrodes may involve intentionally not locating the current collector in the area that will be contacted by the first sealant in order to avoid conductivity in these areas, thereby mitigating risk of a short developing.

In a next step, the support structure 1803 may be flipped over and a layer of the first sealant 1805b may be applied to the opposite face of the support frame 1803, in a method similar to that of layer 1805a.

In a next step of the process 1900, a second planar GD electrode 1801b may be placed on the opposite face of the support frame 1803 containing the first sealant 1805b, and allowed to cure, thereby creating a bifacial sealed GD electrode assembly 1902. In various embodiments, each fabrication step in method 1900 may take in the order of minutes. The steps used to manufacture the bifacial sealed GD electrode assembly 1902 may be repeated a number of times in order to create multiple assemblies according to some embodiments.

As shown in FIG. 19B, multiple GD electrode assemblies (e.g., 1902a, 1902b, etc.) may be stacked vertically in alignment with one another, and clamped to form a single large fixture 1920. In a next step of the process 1900, the features 1822 in support frame 1803 (e.g., channels) may be filled with the second sealant 1832 (e.g., epoxy). In various embodiments, the second sealant may be filled in from the top of the fixture 1920, or may be injected from the bottom, such as through a port in the support frame 1803.

While the outer edge of the support frame in various embodiments is shown to be flush with the GD electrodes, other suitable configurations are within the contemplated scope of disclosure. For example, the support frames may extend out further than the edges of the bonded GD electrodes in some assemblies for various reasons (e.g., including handling and/or alignment features, providing mating/interlocking with battery cell lid, etc.).

Figures 20A, 20B:
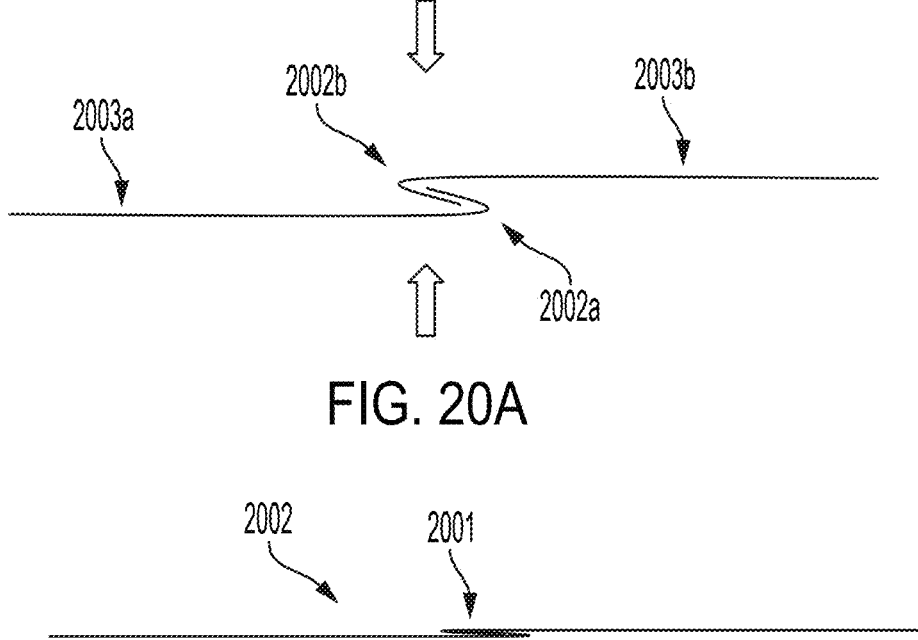
FIGS. 20A and 20B illustrate a method of fabricating a large-area laminate structure GD electrode using an interlocking seam according to an embodiment of the present disclosure.

FIGS. 20A and 20B illustrate a method of fabricating a large-area laminate structure GD electrode 2000 using an interlocking seam 2001. Referring to FIGS. 20A and 20B, the lateral edges 2002a and 2002b of a pair of electrode structures 2003a and 2003b may folded over each other as shown in FIG. 20A. The electrode structures 2003a and 2003b may be layer stacks 320 such as shown in FIG. 3B prior to being laminated. Alternatively, one or both of the electrode structures 2003a and 2003b may be a laminated electrode having an unlaminated edge portion, such as shown in FIGS. 16A and 16B. Mechanical pressure may be applied at elevated temperature to the interlocking lateral edges 2002a and 2002b, as indicated by arrows in FIG. 20A, to bond the interlocking lateral edges 2002a and 2002b together and form a seam 2001, as shown in FIG. 20B. In this way, a large area planar laminate structure GD electrode 2000 may be produced from smaller area layer stacks and/or electrodes. In some embodiments, a seam 2001 produced via the method illustrated in FIGS. 20A and 20B may form an edge seal for an electrode assembly, such as a bifacial sealed GDE assembly 400 shown in FIGS. 4A-4D.

Figures 21A, 21B, 21C, 21D, 21E:
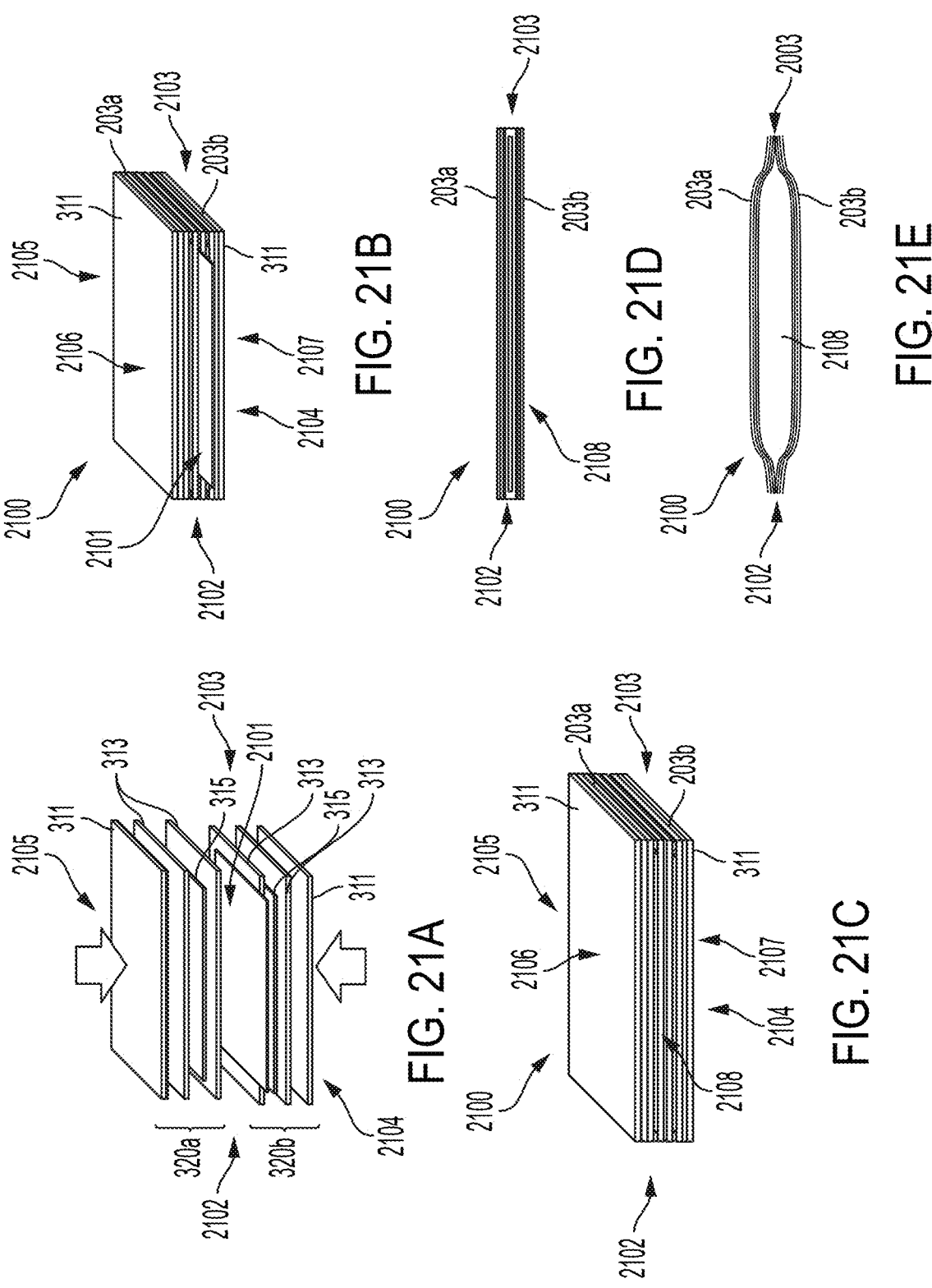
FIGS. 21A-21E illustrate a method of fabricating a bifacial sealed GDE assembly using a "flat press" process.

FIGS. 21A-21E illustrate a method of fabricating a bifacial sealed GDE assembly 2100 using a single-step "flat press" lamination and sealing process according to an embodiment of the present disclosure. FIG. 21A is a perspective view showing a pair of layer stacks 320a and 320b and a spacer 2101 located between the layer stacks 320a and 320b. Each of the layer stacks 320a and 320b may include an active layer 311, a pair of backing layers 313 and a current collector 315 between the pair of backing layers 313, as described above. The layer stacks 320a and 320b and the spacer 2101 may be placed in a thermal press apparatus that is configured to apply heat and mechanical pressure to the layer stacks 320a and 320b and spacer 2101. The spacer 2101 may have a narrower width than the widths of the backing layers 313 such that the spacer 2101 does not extend to first and second peripheral edges 2102 and 2103 on opposite sides of the layer stacks 320a and 320b. Accordingly, backing layers 313 of the respective layer stacks 320a and 320b may contact each other along the first and second peripheral edges 2102 and 2103 of the layer stacks 320a and 320b. In some embodiments, the current collectors 315 may also not extend to the first and second peripheral edges 2102 and 2103 of the layer stacks 320a and 320b in order to avoid corrosion of the current collectors 315 in the assembled GDE assembly 2100.

The spacer 2101 may extend to and/or beyond a third peripheral edge 2104 of the layer stacks 320a and 320b. Thus, the spacer 2101 may be located between backing layers 313 of the respective layer stacks 320a and 320b along the third peripheral edge 2104. In some embodiments, the spacer 2101 may be offset from a fourth peripheral edge 2105 of the layer stacks 320a and 320b that is opposite the third peripheral edge 2104. Thus, the backing layers 313 of the layer stacks 320a and 320b may contact each other along the fourth peripheral edge 2105. Alternatively, the spacer 2101 may extend to and/or beyond the fourth peripheral edge 2105 such that the spacer 2101 may be located between the backing layers 313 of the respective layer stacks 320a and 320b along the fourth peripheral edge 2105. A sealant material such as described above with reference to FIG. 5 may optionally be provided between the contacting surfaces of the backing layers 313 of the respective layer stacks 320a and 320b.

The spacer 2101 may be composed of a material that does not strongly bond to the adjacent layers of the layer stacks 320a and 320b upon the application of heat and pressure to the layer stacks 320a and 320b. Thus, the spacer 2101 may also be referred to as a "release layer." The spacer/release layer 2101 may include, for example, a film, a foil, a sheet, a membrane, a shim, or other similar structures, including various combinations thereof. Suitable materials for the spacer/release layer 2101 may include metals (e.g., steel, aluminum, etc.), fiber-reinforced plastics (e.g., fiberglass), ceramics, carbon fiber or other graphitic compounds, plastics or polymers having high thermal stability, and combinations thereof. Other suitable materials for the spacer/spacer 2101 are within the contemplated scope of disclosure. The spacer/release layer 2101 may be a reusable component or may be a consumable/disposable component that is intended for a single use. In some embodiments, the spacer/release layer 2101 may have a total thickness that is between about 0.001 and about 2 mm, although greater or lesser thicknesses for the spacer/release layer 2101 may be utilized.

In a single-step "flat press" lamination and sealing process, the layer stacks 320a and 320b and spacer/release layer 2101 may lie flat in the thermal press apparatus, rather than in a mold cavity having one or more contoured interior surfaces designed to impart a three-dimensional shape to the layer stacks 320a and 320b, such as described above with reference to FIGS. 5A-5B and 7. In contrast, in a "flat press" process, the thermal press apparatus may include heated press plates with planar surfaces that are configured to apply substantially uniform heat and pressure over the flat outer surfaces of the layer stacks 320a and 320b. The thermal press apparatus may apply sufficient heat and pressure to the layer stacks 320a and 320b and the spacer/release layer 901 (indicated by the arrows in FIG. 21A) to produce a bifacial sealed GDE assembly 2100 including a pair of laminate structure GD electrodes 203a and 203b having the spacer/release layer 2101 therebetween, as shown in FIG. 21B. The embodiment shown in FIGS. 21A and 21B is a "single step" process in which the individual layer stacks 320a and 320a are laminated and sealed together (with or without a sealant material) at the same time. Following the thermal press process, the laminate structure GD electrodes 203a and 203b may be sealed along at least the first and second peripheral edges 2102 and 2103 of the GDE assembly 2100. In embodiments in which the spacer/release layer 2101 is offset from the fourth peripheral edge 2105, the laminate structure GD electrodes 203a and 203b may also be sealed along the fourth peripheral edge 2105 of the GDE assembly 2100. An additional exterior seal as described above with reference to FIG. 6 may optionally be provided over the sealed edges of the GDE assembly 2100. Active layers 311 may be exposed on first and second major surfaces 2106 and 2107 of the GDE assembly 2100. As shown in FIG. 21B, following the thermal press process, the first and second major surfaces 2106 and 2107 of the GDE assembly 2100 may be substantially flat.

Referring to FIGS. 21C and 21D, the spacer/release layer 2101 may be removed from the GDE assembly 2100. FIG. 21C is a perspective view of the GDE assembly 2100 and FIG. 21D is a top view of the GDE assembly 2100 with the spacer/release layer 2101 removed. A cavity 2108 may be located in the space between the GD electrodes 203a and 203b from which the spacer/release layer 2101 is removed.

The sealed edges of the GDE assembly 2100 may surround the cavity 2108. The width of the cavity 2108 may be expanded by applying force to the GDE assembly 2100 to form a pocket- or pouch-like structure as shown in FIG. 21E. An insert 1500 for defining at least one flow field as described above with reference to FIGS. 15A and 15B may be inserted into the cavity 2108.

In an alternative embodiment, a two-step "flat press" lamination and sealing process may be used to provide a bifacial sealed GDE assembly 2100. In a two-step "flat press" lamination and sealing process, the individual layer stacks 320a and 320b are first laminated together to form separate GD electrodes 203a and 203b. The separate GD electrodes 203a and 203b may have substantially flat outer surfaces. The separate GD electrodes 203a and 203b may then be provided in a thermal press apparatus with a spacer/release layer 2101 located between the GD electrodes 203a and 203b. The thermal press apparatus may then be used in a "flat press" process as described above to seal the peripheral edges of GD electrodes 203a and 203b together to provide a bifacial sealed GDE assembly 2100 having a spacer/release layer 2101 between the respective GD electrodes 203a and 203b, as is shown in FIG. 21B. In some embodiments, the same thermal press apparatus that is used to laminate the layer stacks 320a and 320b may be used to seal the GD electrodes 203a and 203b via the "flat press" process. Alternatively, different thermal press apparatuses may be used for the separate lamination and sealing steps. Following the "flat press" sealing process, the spacer/release layer 2101 may be removed as shown in FIGS. 21C and 21D, and the cavity 2108 between the GD electrodes 203a and 203b may be expanded to form a pocket- or pouch-like structure as shown in FIG. 21E.

Various embodiments described and illustrated herein may provide devices and/or methods for use in bulk energy storage systems, such as long duration energy storage (LODES) systems, short duration energy storage (SDES) systems, etc. As an example, various embodiments may provide batteries (e.g., battery 200) for bulk energy storage systems, such as batteries for LODES systems. Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as LODES systems, SDES systems, etc. To support the adoption of combined power generation, transmission, and storage systems (e.g., a power plant having a renewable power generation source paired with a bulk energy storage system and transmission facilities at any of the power plant and/or the bulk energy storage system) devices and methods to support the design and operation of such combined power generation, transmission, and storage systems, such as the various embodiment devices and methods described herein, are needed.

A combined power generation, transmission, and storage system may be a power plant including one or more power generation sources (e.g., one or more renewable power generation sources, one or more non-renewable power generations sources, combinations of renewable and non-renewable power generation sources, etc.), one or more transmission facilities, and one or more bulk energy storage systems. Transmission facilities at any of the power plant and/or the bulk energy storage systems may be co-optimized with the power generation and storage system or may impose constraints on the power generation and storage system design and operation. The combined power generation, transmission, and storage systems may be configured to meet various output goals, under various design and operating constraints.

Figure 22:
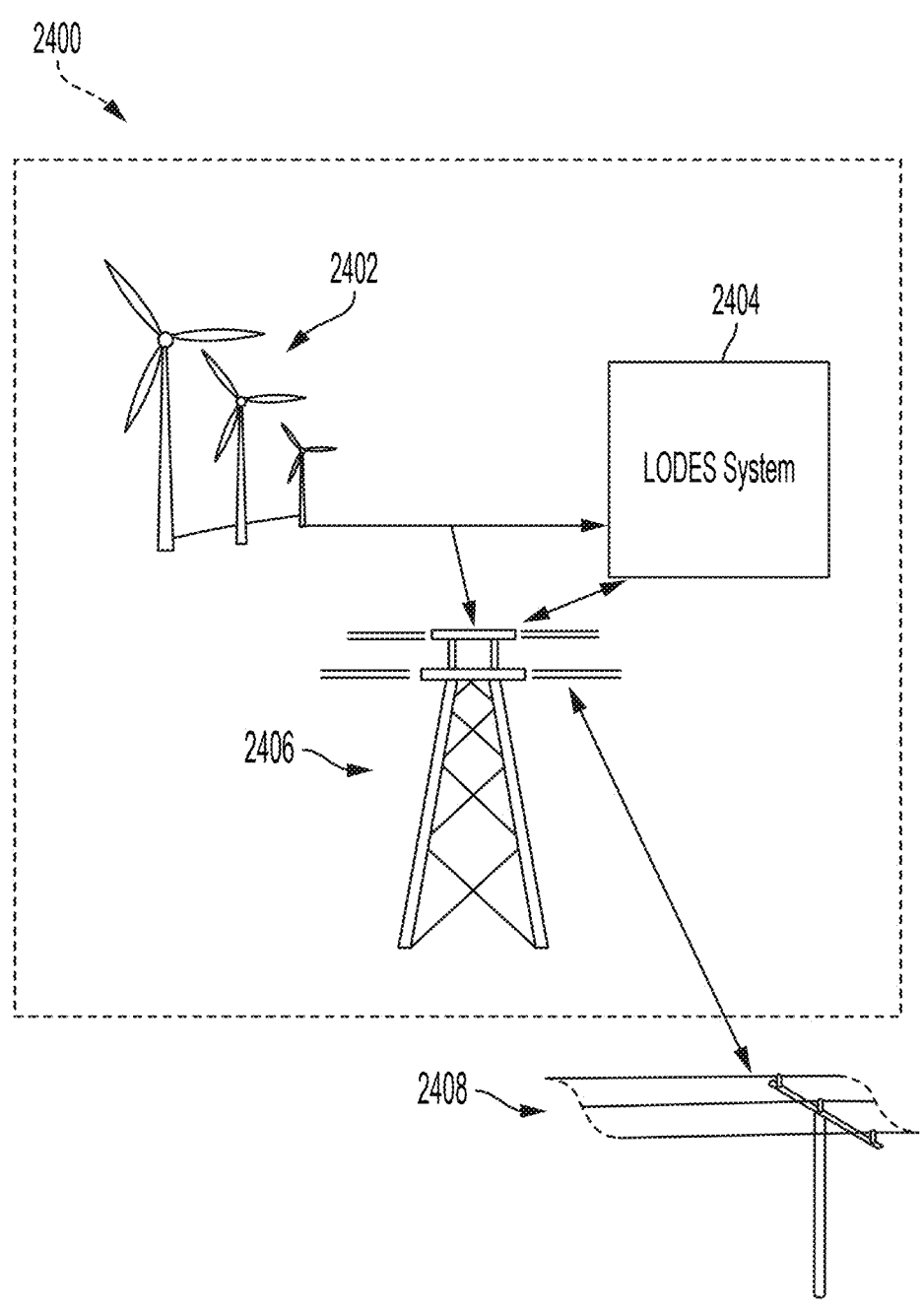
FIGS. 22-30 illustrate various example systems in which one or more aspects of the various embodiments may be used as part of bulk energy storage systems.

FIGS. 22—illustrate various example systems in which one or more aspects of the various embodiments may be used as part of bulk energy storage systems, such as LODES systems, SDES systems, etc. For example, various embodiments described herein with reference to FIGS. 1A-93 may be used as batteries for bulk energy storage systems, such as LODES systems, SDES systems, etc. and/or various electrodes as described herein may be used as components for bulk energy storage systems. As used herein, the term "LODES system" may mean a bulk energy storage system configured to may have a rated duration (energy/power ratio) of 24 hours (h) or greater, such as a duration of 24 h, a duration of 24 h to 50 h, a duration of greater than 50 h, a duration of 24 h to 150 h, a duration of greater than 150 h, a duration of 24 h to 200 h, a duration greater than 200 h, a duration of 24 h to 500 h, a duration greater than 500 h, etc.

FIG. 22 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be electrically connected to a wind farm 2402 and one or more transmission facilities 2406. The wind farm 2402 may be electrically connected to the transmission facilities 2406. The transmission facilities 2406 may be electrically connected to the grid 2408. The wind farm 2402 may generate power and the wind farm 2402 may output generated power to the LODES system 2404 and/or the transmission facilities 2406. The LODES system 2404 may store power received from the wind farm 2402 and/or the transmission facilities 2406. The LODES system 2404 may output stored power to the transmission facilities 2406. The transmission facilities 2406 may output power received from one or both of the wind farm 2402 and LODES system 2404 to the grid 2408 and/or may receive power from the grid 2408 and output that power to the LODES system 2404. Together the wind farm 2402, the LODES system 2404, and the transmission facilities 2406 may constitute a power plant 2400 that may be a combined power generation, transmission, and storage system. The power generated by the wind farm 2402 may be directly fed to the grid 2408 through the transmission facilities 2406, or may be first stored in the LODES system 2404. In certain cases the power supplied to the grid 2408 may come entirely from the wind farm 2402, entirely from the LODES system 2404, or from a combination of the wind farm 2402 and the LODES system 2404. The dispatch of power from the combined wind farm 2402 and LODES system 2404 power plant 2400 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 2400, the LODES system 2404 may be used to reshape and "firm" the power produced by the wind farm 2402. In one such example, the wind farm 2402 may have a peak generation output (capacity) of 260 megawatts (MW) and a capacity factor (CF) of 41%. The LODES system 2404 may have a power rating (capacity) of 106 MW, a rated duration (energy/power ratio) of 150 hours (h), and an energy rating of 15,900 megawatt hours (MWh). In another such example, the wind farm 2402 may have a peak generation output (capacity) of 300 MW and a capacity factor (CF) of 41%. The LODES system 2404 may have a power rating of 106 MW, a rated duration (energy/power ratio) of 200 h and an energy rating of 21,200 MWh. In another such example, the wind farm 2402 may have a peak generation output (capacity) of 176 MW and a capacity factor (CF) of 53%. The LODES system 2404 may have a power rating (capacity) of 88 MW, a rated duration (energy/power ratio) of 150 h and an energy rating of 13,200 MWh. In another such example, the wind farm 2402 may have a peak generation output (capacity) of 277 MW and a capacity factor (CF) of 41%. The LODES system 2404 may have a power rating (capacity) of 97 MW, a rated duration (energy/power ratio) of 50 h and an energy rating of 4,850 MWh. In another such example, the wind farm 2402 may have a peak generation output (capacity) of 315 MW and a capacity factor (CF) of 41%. The LODES system 2404 may have a power rating (capacity) of 110 MW, a rated duration (energy/power ratio) of 25 h and an energy rating of 2,750 MWh.

Figure 23:
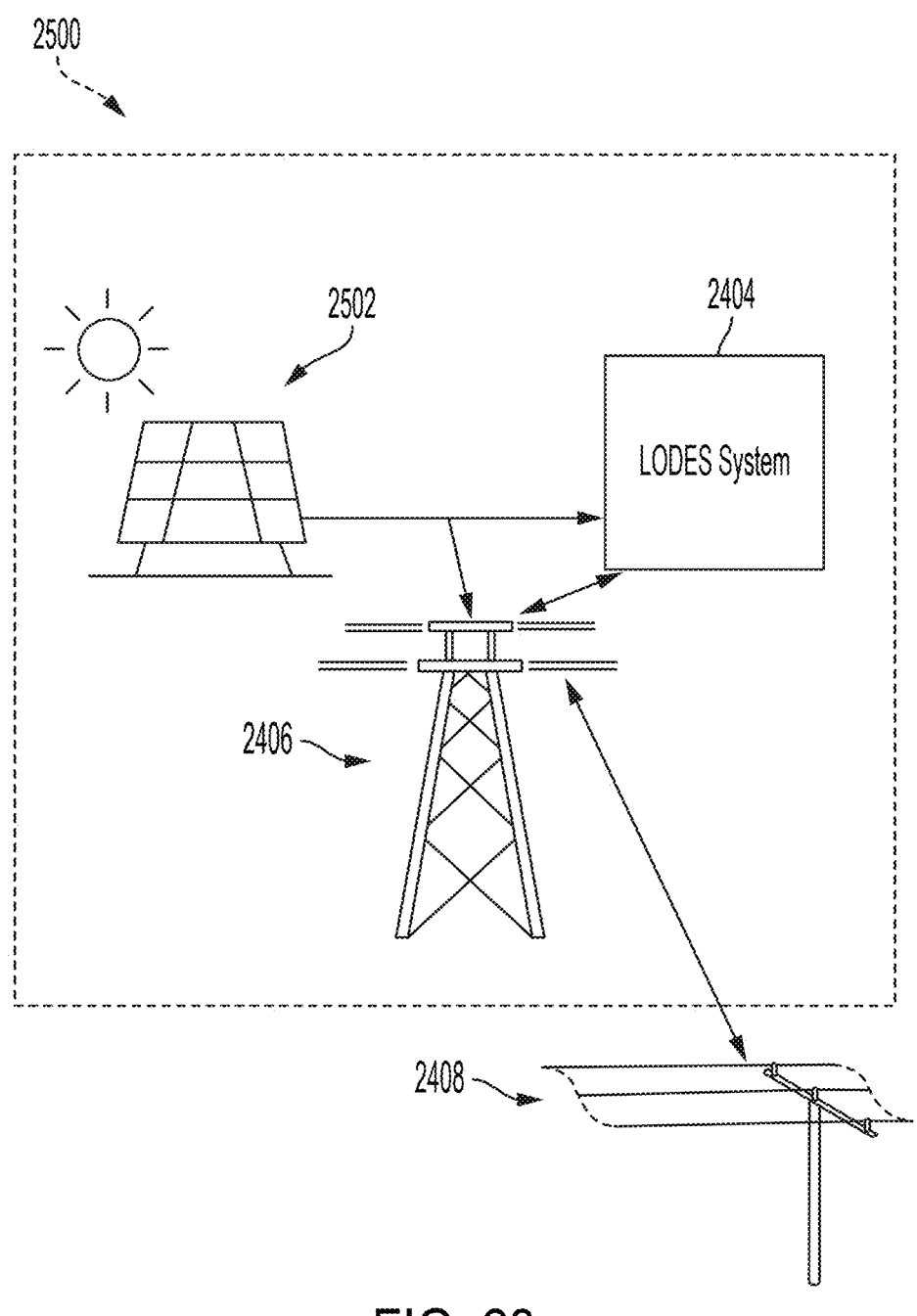

FIG. 23 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The system of FIG. 24 may be similar to the system of FIG. 22, except a photovoltaic (PV) farm 2502 may be substituted for the wind farm 2402. The LODES system 2404 may be electrically connected to the PV farm 2502 and one or more transmission facilities 2406. The PV farm 2502 may be electrically connected to the transmission facilities 2406. The transmission facilities 2406 may be electrically connected to the grid 2408. The PV farm 2502 may generate power and the PV farm 2502 may output generated power to the LODES system 2404 and/or the transmission facilities 2406. The LODES system 2404 may store power received from the PV farm 2502 and/or the transmission facilities 2406. The LODES system 2404 may output stored power to the transmission facilities 2406. The transmission facilities 2406 may output power received from one or both of the PV farm 2502 and LODES system 2404 to the grid 2408 and/or may receive power from the grid 2408 and output that power to the LODES system 2404. Together the PV farm 2502, the LODES system 2404, and the transmission facilities 2406 may constitute a power plant 2500 that may be a combined power generation, transmission, and storage system. The power generated by the PV farm 2502 may be directly fed to the grid 2408 through the transmission facilities 2406, or may be first stored in the LODES system 2404. In certain cases the power supplied to the grid 2408 may come entirely from the PV farm 2502, entirely from the LODES system 2404, or from a combination of the PV farm 2502 and the LODES system 2404. The dispatch of power from the combined PV farm 2502 and LODES system 2404 power plant 2500 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 2500, the LODES system 2404 may be used to reshape and "firm" the power produced by the PV farm 2502. In one such example, the PV farm 2502 may have a peak generation output (capacity) of 490 MW and a capacity factor (CF) of 24%. The LODES system 2404 may have a power rating (capacity) of 340 MW, a rated duration (energy/power ratio) of 150 h and an energy rating of 51,000 MWh. In another such example, the PV farm 2502 may have a peak generation output (capacity) of 680 MW and a capacity factor (CF) of 24%. The LODES system 2404 may have a power rating (capacity) of 410 MW, a rated duration (energy/power ratio) of 200 h, and an energy rating of 82,000 MWh. In another such example, the PV farm 2502 may have a peak generation output (capacity) of 330 MW and a capacity factor (CF) of 31%. The LODES system 2404 may have a power rating (capacity) of 215 MW, a rated duration (energy/power ratio) of 150 h, and an energy rating of 32,250 MWh. In another such example, the PV farm 2502 may have a peak generation output (capacity) of 510 MW and a capacity factor (CF) of 24%. The LODES system 2404 may have a power rating (capacity) of 380 MW, a rated duration (energy/power ratio) of 50 h, and an energy rating of 19,000 MWh. In another such example, the PV farm 2502 may have a peak generation output (capacity) of 630 MW and a capacity factor (CF) of 24%. The LODES system 2404 may have a power rating (capacity) of 380 MW, a rated duration (energy/power ratio) of 25 h, and an energy rating of 9,500 MWh.

Figure 24:
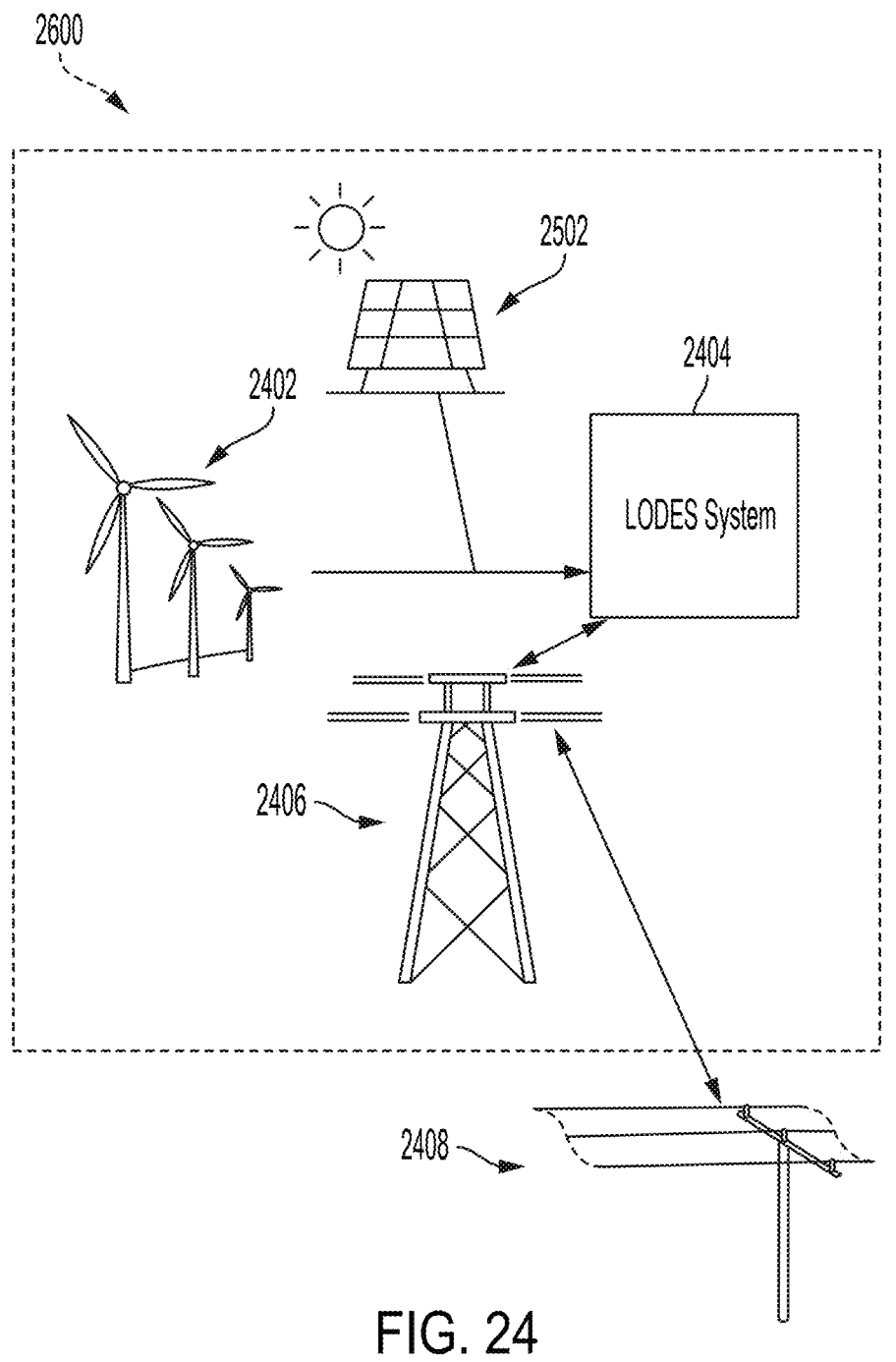

FIG. 24 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The system of FIG. 24 may be similar to the systems of FIGS. 22 and 23, except the wind farm 2402 and the photovoltaic (PV) farm 2502 may both be power generators working together in the power plant 2600. Together the PV farm 2502, wind farm 2402, the LODES system 2404, and the transmission facilities 2406 may constitute the power plant 2600 that may be a combined power generation, transmission, and storage system. The power generated by the PV farm 2502 and/or the wind farm 2402 may be directly fed to the grid 2408 through the transmission facilities 2406, or may be first stored in the LODES system 2404. In certain cases the power supplied to the grid 2408 may come entirely from the PV farm 2502, entirely from the wind farm 2402, entirely from the LODES system 2404, or from a combination of the PV farm 2502, the wind farm 2402, and the LODES system 2404. The dispatch of power from the combined wind farm 2402, PV farm 2502, and LODES system 2404 power plant 2600 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 2600, the LODES system 2404 may be used to reshape and "firm" the power produced by the wind farm 2402 and the PV farm 2502. In one such example, the wind farm 2402 may have a peak generation output (capacity) of 126 MW and a capacity factor (CF) of 41% and the PV farm 2502 may have a peak generation output (capacity) of 126 MW and a capacity factor (CF) of 24%. The LODES system 2404 may have a power rating (capacity) of 63 MW, a rated duration (energy/power ratio) of 150 h, and an energy rating of 9,450 MWh. In another such example, the wind farm 2402 may have a peak generation output (capacity) of 170 MW and a capacity factor (CF) of 41% and the PV farm 2502 may have a peak generation output (capacity) of 110 MW and a capacity factor (CF) of 24%. The LODES system 2404 may have a power rating (capacity) of 57 MW, a rated duration (energy/power ratio) of 200 h, and an energy rating of 11,400 MWh. In another such example, the wind farm 2402 may have a peak generation output (capacity) of 105 MW and a capacity factor (CF) of 51% and the PV farm 2502 may have a peak generation output (capacity) of 70 MW and a capacity factor (CF) of 31 The LODES system 2404 may have a power rating (capacity) of 61 MW, a rated duration (energy/power ratio) of 150 h, and an energy rating of 9,150 MWh. In another such example, the wind farm 2402 may have a peak generation output (capacity) of 135 MW and a capacity factor (CF) of 41% and the PV farm 2502 may have a peak generation output (capacity) of 90 MW and a capacity factor (CF) of 24%. The LODES system 2404 may have a power rating (capacity) of 68 MW, a rated duration (energy/power ratio) of 50 h, and an energy rating of 3,400 MWh. In another such example, the wind farm 2402 may have a peak generation output (capacity) of 144 MW and a capacity factor (CF) of 41% and the PV farm 2502 may have a peak generation output (capacity) of 96 MW and a capacity factor (CF) of 24%. The LODES system 2404 may have a power rating (capacity) of 72 MW, a rated duration (energy/power ratio) of 25 h, and an energy rating of 1,800 MWh.

Figure 25:
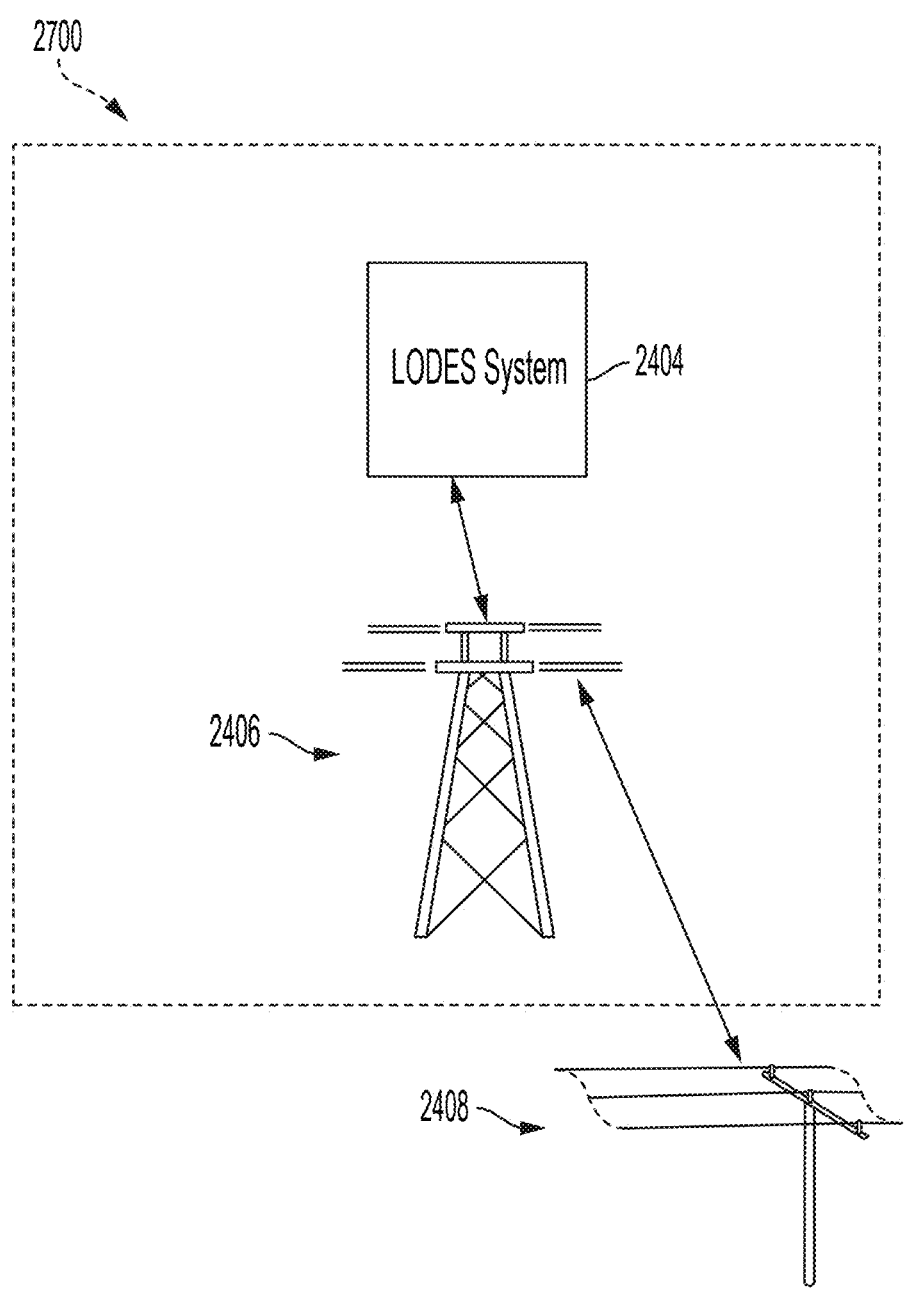

FIG. 25 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be electrically connected to one or more transmission facilities 2406. In this manner, the LODES system 2404 may operate in a "stand-alone" manner to arbiter energy around market prices and/or to avoid transmission constraints. The LODES system 2404 may be electrically connected to one or more transmission facilities 2406. The transmission facilities 2406 may be electrically connected to the grid 2408. The LODES system 2404 may store power received from the transmission facilities 2406. The LODES system 2404 may output stored power to the transmission facilities 2406. The transmission facilities 2406 may output power received from the LODES system 2404 to the grid 2408 and/or may receive power from the grid 2408 and output that power to the LODES system 2404.

Together the LODES system 2404 and the transmission facilities 2406 may constitute a power plant 900. As an example, the power plant 900 may be situated downstream of a transmission constraint, close to electrical consumption. In such an example downstream situated power plant 2700, the LODES system 2404 may have a duration of 24 h to 500 h and may undergo one or more full discharges a year to support peak electrical consumptions at times when the transmission capacity is not sufficient to serve customers. Additionally in such an example downstream situated power plant 2700, the LODES system 2404 may undergo several shallow discharges (daily or at higher frequency) to arbiter the difference between nighttime and daytime electricity prices and reduce the overall cost of electrical service to customer. As a further example, the power plant 2700 may be situated upstream of a transmission constraint, close to electrical generation. In such an example upstream situated power plant 2700, the LODES system 2404 may have a duration of 24 h to 500 h and may undergo one or more full charges a year to absorb excess generation at times when the transmission capacity is not sufficient to distribute the electricity to customers. Additionally in such an example upstream situated power plant 2700, the LODES system 2404 may undergo several shallow charges and discharges (daily or at higher frequency) to arbiter the difference between nighttime and daytime electricity prices and maximize the value of the output of the generation facilities.

Figure 26:
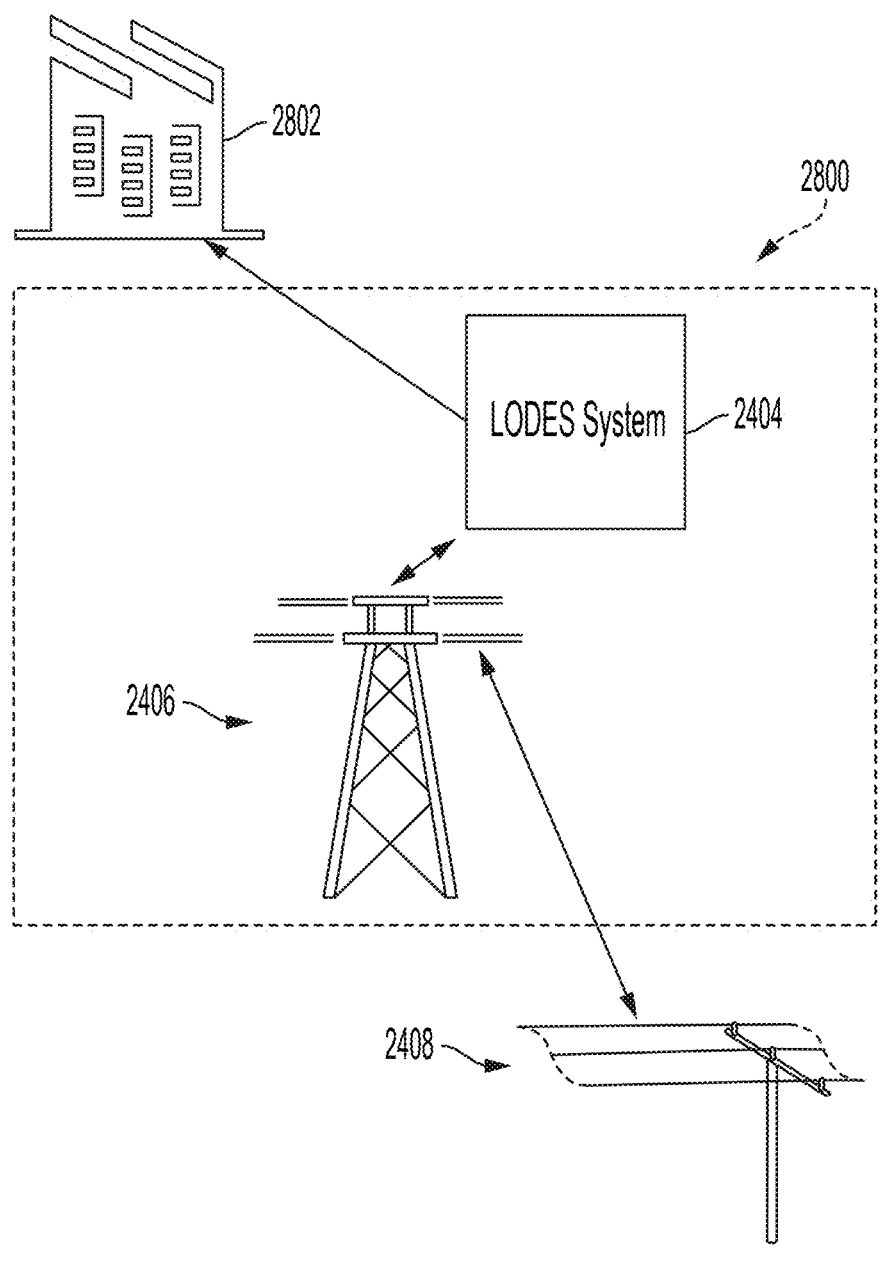

FIG. 26 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be electrically connected to a commercial and industrial (C&I) customer 2802, such as a data center, factory, etc. The LODES system 2404 may be electrically connected to one or more transmission facilities 2406. The transmission facilities 2406 may be electrically connected to the grid 2408. The transmission facilities 2406 may receive power from the grid 2408 and output that power to the LODES system 2404. The LODES system 2404 may store power received from the transmission facilities 2406. The LODES system 2404 may output stored power to the C&I customer 2802. In this manner, the LODES system 2404 may operate to reshape electricity purchased from the grid 2408 to match the consumption pattern of the C&I customer 2802.

Together, the LODES system 2404 and transmission facilities 2406 may constitute a power plant 2800. As an example, the power plant 2800 may be situated close to electrical consumption, i.e., close to the C&I customer 2802, such as between the grid 2408 and the C&I customer 2802. In such an example, the LODES system 2404 may have a duration of 24 h to 500 h and may buy electricity from the markets and thereby charge the LODES system 2404 at times when the electricity is cheaper. The LODES system 2404 may then discharge to provide the C&I customer 2802 with electricity at times when the market price is expensive, therefore offsetting the market purchases of the C&I customer 2802. As an alternative configuration, rather than being situated between the grid 2408 and the C&I customer 2802, the power plant 2800 may be situated between a renewable source, such as a PV farm, wind farm, etc., and the transmission facilities 2406 may connect to the renewable source. In such an alternative example, the LODES system 2404 may have a duration of 24 h to 500 h, and the LODES system 2404 may charge at times when renewable output may be available. The LODES system 2404 may then discharge to provide the C&I customer 2802 with renewable generated electricity so as to cover a portion, or the entirety, of the C&I customer 2802 electricity needs.

Figure 27:
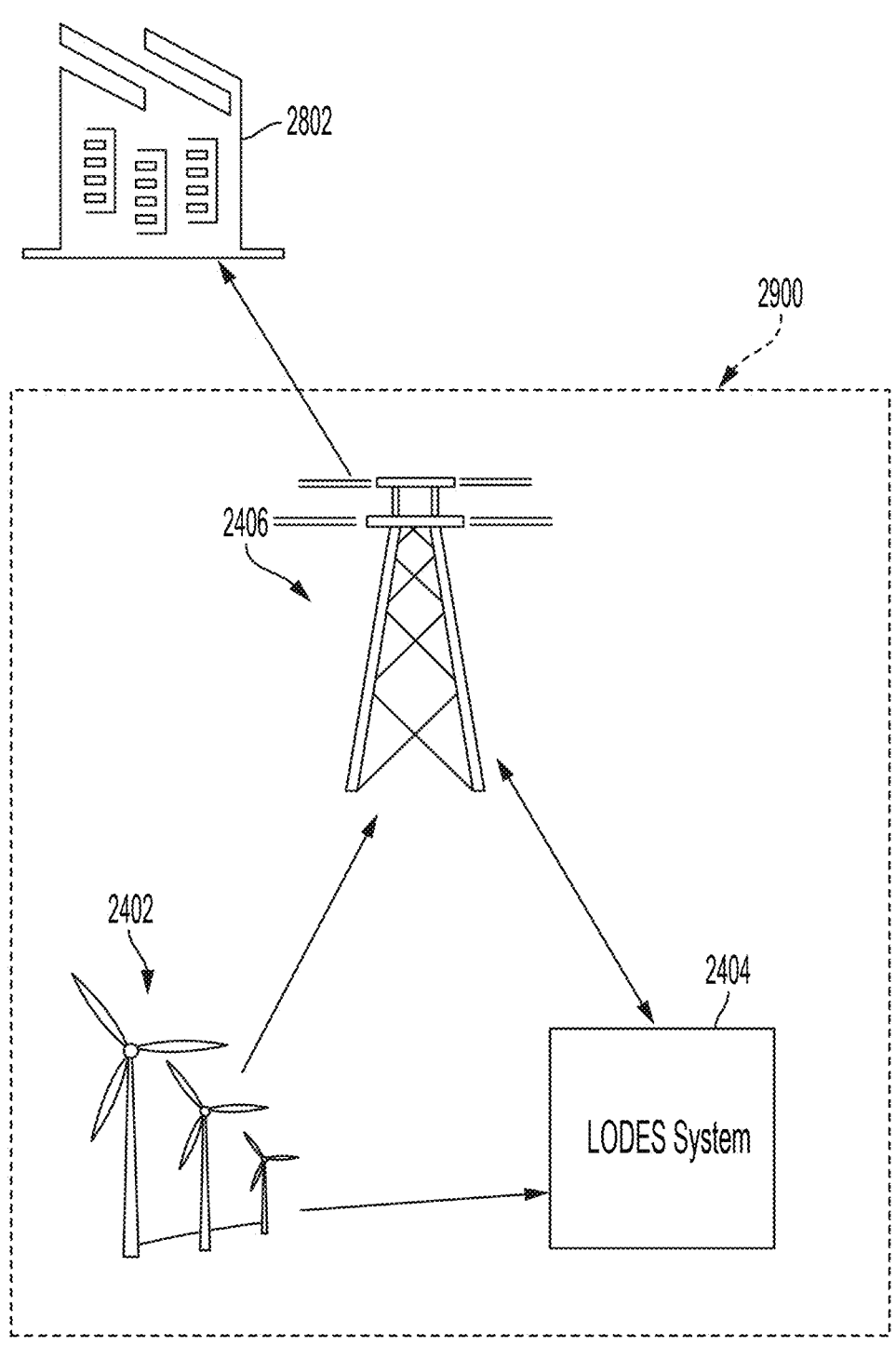

FIG. 27 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be electrically connected to a wind farm 2402 and one or more transmission facilities 2406. The wind farm 2402 may be electrically connected to the transmission facilities 2406. The transmission facilities 2406 may be electrically connected to a C&I customer 2802. The wind farm 2402 may generate power and the wind farm 2402 may output generated power to the LODES system 2404 and/or the transmission facilities 2406. The LODES system 2404 may store power received from the wind farm 2402.

The LODES system 2404 may output stored power to the transmission facilities 2406. The transmission facilities 2406 may output power received from one or both of the wind farm 2402 and LODES system 2404 to the C&I customer 2802. Together the wind farm 2402, the LODES system 2404, and the transmission facilities 2406 may constitute a power plant 2900 that may be a combined power generation, transmission, and storage system. The power generated by the wind farm 2402 may be directly fed to the C&I customer 2802 through the transmission facilities 2406, or may be first stored in the LODES system 2404. In certain cases, the power supplied to the C&I customer 2802 may come entirely from the wind farm 2402, entirely from the LODES system 2404, or from a combination of the wind farm 2402 and the LODES system 2404. The LODES system 2404 may be used to reshape the electricity generated by the wind farm 2402 to match the consumption pattern of the C&I customer 2802. In one such example, the LODES system 2404 may have a duration of 24 h to 500 h and may charge when renewable generation by the wind farm 2402 exceeds the C&I customer 2802 load. The LODES system 2404 may then discharge when renewable generation by the wind farm 2402 falls short of C&I customer 2802 load so as to provide the C&I customer 2802 with a firm renewable profile that offsets a fraction, or all of, the C&I customer 2802 electrical consumption.

Figure 28:
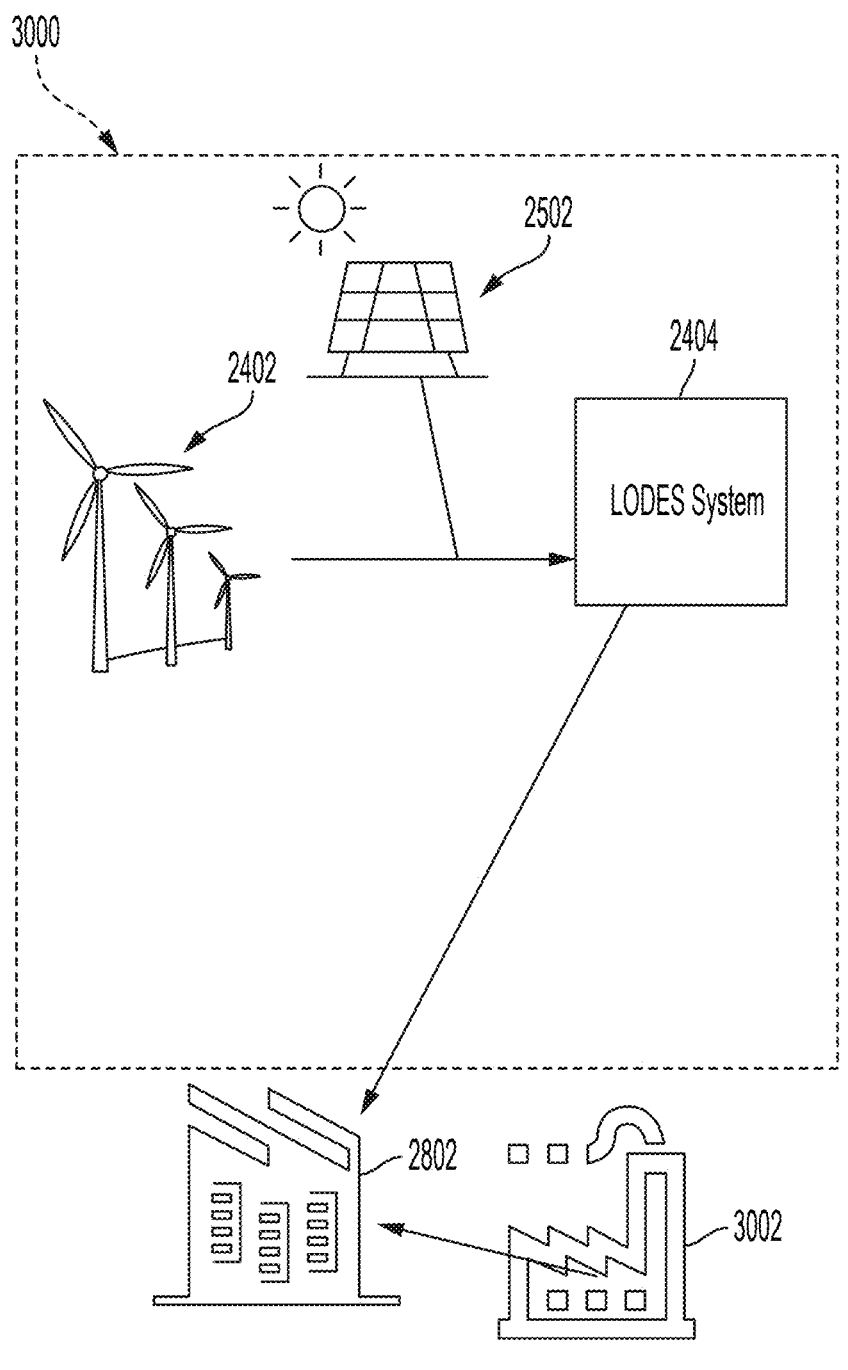

FIG. 28 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be part of a power plant 3000 that is used to integrate large amounts of renewable generation in microgrids and harmonize the output of renewable generation by, for example a PV farm 2502 and wind farm 2402, with existing thermal generation by, for example a thermal power plant 3002 (e.g., a gas plant, a coal plant, a diesel generator set, etc., or a combination of thermal generation methods), while renewable generation and thermal generation supply the C&I customer 2802 load at high availability. Microgrids, such as the microgrid constituted by the power plant 3000 and the thermal power plant 3002, may provide availability that is 90% or higher. The power generated by the PV farm 2502 and/or the wind farm 2402 may be directly fed to the C&I customer 2802, or may be first stored in the LODES system 2404.

In certain cases the power supplied to the C&I customer 2802 may come entirely from the PV farm 2502, entirely from the wind farm 2402, entirely from the LODES system 2404, entirely from the thermal power plant 3002, or from any combination of the PV farm 2502, the wind farm 2402, the LODES system 2404, and/or the thermal power plant 3002. As examples, the LODES system 2404 of the power plant 3000 may have a duration of 24 h to 500 h. As a specific example, the C&I customer 2802 load may have a peak of 100 MW, the LODES system 2404 may have a power rating of 14 MW and duration of 150 h, natural gas may cost $6/million British thermal units (MMBTU), and the renewable penetration may be 58%. As another specific example, the C&I customer 2802 load may have a peak of 100 MW, the LODES system 2404 may have a power rating of 25 MW and duration of 150 h, natural gas may cost $8/MMBTU, and the renewable penetration may be 65%.

Figure 29:
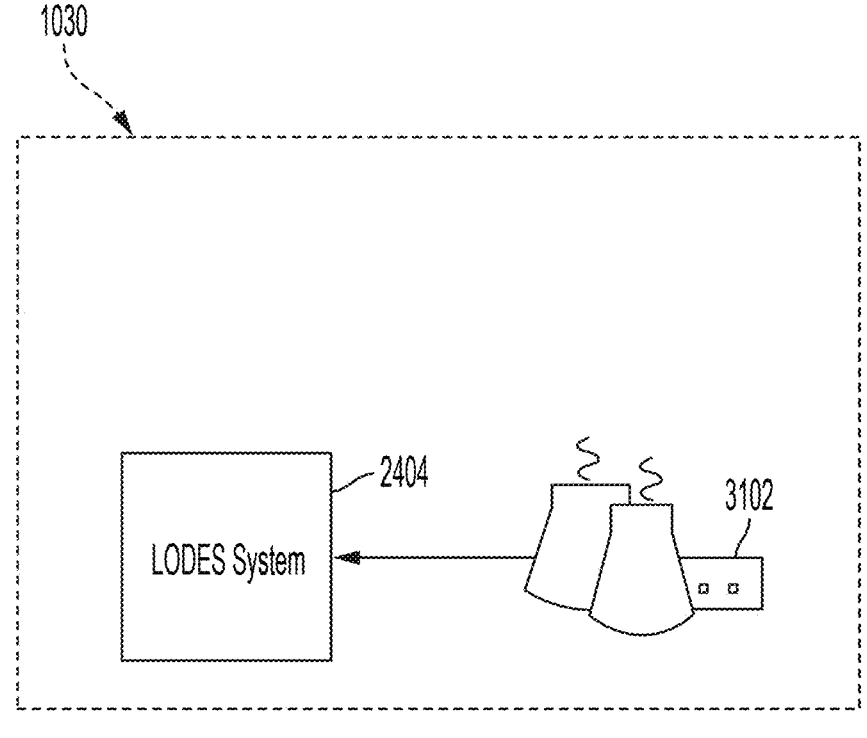

FIG. 29 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be used to augment a nuclear plant 3102 (or other inflexible generation facility, such as a thermal, a biomass, etc., and/or any other type plant having a ramp-rate lower than 50% of rated power in one hour and a high capacity factor of 80% or higher) to add flexibility to the combined output of the power plant 3100 constituted by the combined LODES system 2404 and nuclear plant 3102. The nuclear plant 3102 may operate at high capacity factor and at the highest efficiency point, while the LODES system 2404 may charge and discharge to effectively reshape the output of the nuclear plant 3102 to match a customer electrical consumption and/or a market price of electricity. As examples, the LODES system 2404 of the power plant 3100 may have a duration of 24 h to 500 h. In one specific example, the nuclear plant 3102 may have 1,000 MW of rated output and the nuclear plant 3102 may be forced into prolonged periods of minimum stable generation or even shutdowns because of depressed market pricing of electricity. The LODES system 2404 may avoid facility shutdowns and charge at times of depressed market pricing; and the LODES system 2404 may subsequently discharge and boost total output generation at times of inflated market pricing.

Figure 30:
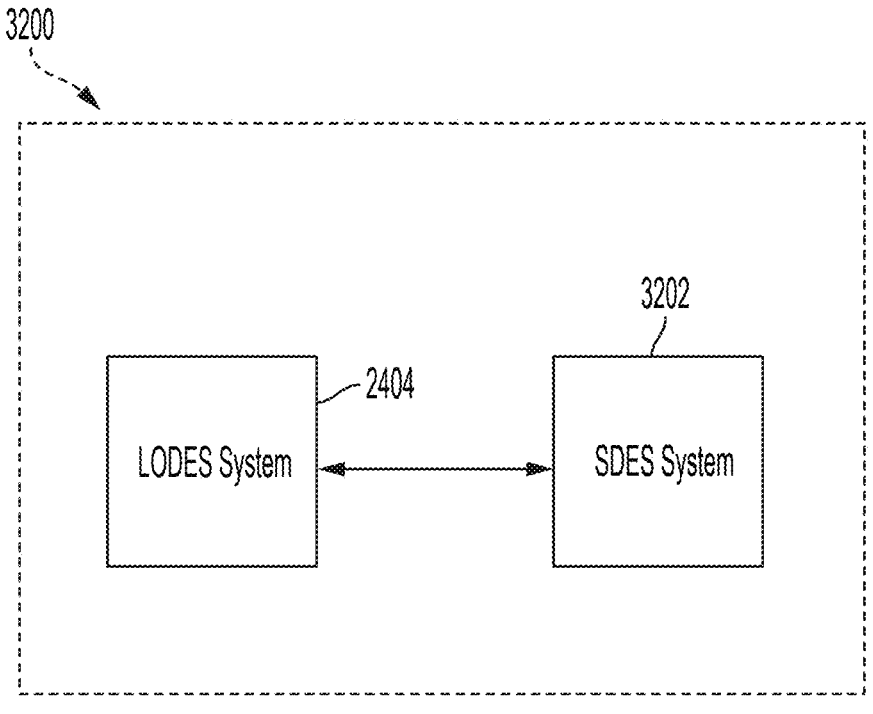

FIG. 30 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may operate in tandem with a SDES system 3202. Together the LODES system 2404 and SDES system 3202 may constitute a power plant 3200. As an example, the LODES system 2404 and SDES system 3202 may be co-optimized whereby the LODES system 2404 may provide various services, including long-duration back-up and/or bridging through multi-day fluctuations (e.g., multi-day fluctuations in market pricing, renewable generation, electrical consumption, etc.), and the SDES system 3202 may provide various services, including fast ancillary services (e.g. voltage control, frequency regulation, etc.) and/or bridging through intra-day fluctuations (e.g., intra-day fluctuations in market pricing, renewable generation, electrical consumption, etc.). The SDES system 3202 may have durations of less than 10 hours and round-trip efficiencies of greater than 80%. The LODES system 2404 may have durations of 24 h to 500 h and round-trip efficiencies of greater than 40%. In one such example, the LODES system 2404 may have a duration of 150 hours and support customer electrical consumption for up to a week of renewable under-generation. The LODES system 2404 may also support customer electrical consumption during intra-day under-generation events, augmenting the capabilities of the SDES system 3202. Further, the SDES system 3202 may supply customers during intra-day under-generation events and provide power conditioning and quality services such as voltage control and frequency regulation.

Various embodiments may include an electrode assembly, comprising: a first electrode on a first side of the electrode assembly, the first electrode comprising a planar portion adjacent to a bottom peripheral edge and first and second lateral peripheral edges of the electrode assembly, a convex portion extending from the planar portion to a raised portion of the first electrode located in a central region and extending to a top peripheral edge of electrode assembly; and a second member on a second side of the electrode assembly opposite the first side, wherein the planar portion of the first electrode contacts and is sealed against a surface of the second member, and the electrode assembly comprises an internal chamber defined between an interior surface of the first electrode and an interior surface of the second member. In some embodiments, the second member comprises a second electrode on the second side of the electrode assembly, the second electrode comprising a planar portion adjacent to the bottom peripheral edge and the first and second lateral peripheral edges of the electrode assembly, a convex portion extending from the planar portion to a raised portion of the second electrode located in a central region of the second electrode and extending to a top peripheral edge of the electrode assembly. In some embodiments, the first electrode and the second electrode each comprise Oxygen Reduction Reaction (ORR) electrodes. In some embodiments, the first electrode and the second electrode each comprise laminate structure gas diffusion (GD) electrodes comprising an active layer and at least one backing layer. In some embodiments, the active layers of the first electrode and the second electrode comprise a hydrophilic surface and the backing layers of the first electrode and the second electrode comprise a hydrophobic surface. In some embodiments, the first electrode and the second electrode each comprise laminate structure gas diffusion (GD) electrodes having an embedded current collector. In some embodiments, the current collectors electrically contact a bus bar that is located within the internal chamber of the electrode assembly. In some embodiments, the active layers of the first electrode and the second electrode are located on respective outer surfaces of the electrode assembly. In some embodiments, the active layers of the first electrode and the second electrode do not extend to the bottom peripheral edge and the first and second lateral peripheral edges of the electrode assembly. In some embodiments, the active layers of the first electrode and the second electrode do not extend to the top peripheral edge of the electrode assembly, and wherein each of the laminate structure gas diffusion electrodes comprises a strip of electrochemically inert material located between an upper edge of the respective active layers and the top peripheral edge of the electrode assembly. In some embodiments, the electrode assembly may further comprise an insert located within the internal chamber of the electrode assembly and contacting respective backing layers of the first electrode and the second electrode, the insert defining air flow fields across the respective backing layers of the first electrode and the second electrode. In some embodiments, the raised central region of the first electrode comprises a textured, contoured, and/or roughened three-dimensional shape. In some embodiments, the electrode assembly may further comprise a sealant material located between the planar portion of the first electrode and a surface of the second member. In some embodiments, the sealant material comprises at least one of a thermoplastic material, fluorinated ethylene propylene (FEP), polytetrafluoroethylene (PTFE), an epoxy material, or a hot-melt adhesive material.

In some embodiments, the electrode assembly may further comprise a sealant material over the bottom peripheral edge and the first and second lateral peripheral edges of the electrode assembly. In some embodiments, the sealant material comprises at least one of an epoxy paint, an epoxy dose, and epoxy dip seal, a clip, a clamp, and an epoxy-lined tape. In some embodiments, the second side of the electrode assembly comprises a planar surface. In some embodiments, the second member comprises a support substrate comprised of an electrochemically inert material. Some embodiments may include a battery, comprising: a housing; a liquid electrolyte within the housing; an anode electrode within the housing and at least partially submerged within the liquid electrolyte; and an electrode assembly according to any one or more of the embodiments as discussed in this paragraph, the electrode assembly within the housing, such electrode assembly and at least partially submerged within the liquid electrolyte.

Various embodiments may include a method of fabricating an electrode assembly, comprising: providing a layer stack comprising at least one active layer and at least one backing layer; forming a laminate structure gas diffusion electrode by applying pressure and heat to the layer stack, the laminate structure gas diffusion electrode including a planar portion adjacent to a bottom peripheral edge and first and second lateral peripheral edges of the electrode, a convex portion extending from the planar portion to a raised portion of the electrode located in a central region and extending adjacent to a top peripheral edge of the electrode; and bonding the laminate structure gas diffusion electrode to a second member to seal the planar portion to the second member and form an electrode assembly having an internal chamber between the laminate structure gas diffusion electrode and the second member. In some embodiments, the laminate structure gas diffusion electrode comprises a first laminate structure gas diffusion electrode, and the second member comprises a second laminate structure gas diffusion electrode. In some embodiments, the method may further comprise: providing a second layer stack comprising at least one active layer and at least one backing layer; forming the second laminate structure gas diffusion electrode by applying pressure and heat to the second layer stack, the second laminate structure gas diffusion electrode including a planar portion adjacent to a bottom peripheral edge and first and second lateral peripheral edges of the second laminate structure gas diffusion electrode, a convex portion extending from the planar portion to a raised portion of the second laminate structure gas diffusion electrode located in a central region and extending adjacent to a top peripheral edge of the second laminate structure gas diffusion electrode, and wherein bonding the first laminate structure gas diffusion electrode to the second laminate structure gas diffusion electrode comprises forming a seal between the planar portion of the first laminate structure gas diffusion electrode and the planar portion of the second laminate structure gas diffusion electrode to form the electrode assembly having an internal chamber between the first laminate structure gas diffusion electrode and the second laminate structure gas diffusion electrode. In some embodiments, the first and second laminate structure gas diffusion electrodes are formed and bonded together at the same time. In some embodiments, the first and second laminate structure gas diffusion electrodes are formed and bonded together by providing the first layer stack and the second layer stack within a mold apparatus and hot pressing the first layer stack and the second layer stack within the mold apparatus to provide the electrode assembly comprising the first laminate structure gas diffusion electrode bonded to the second laminate structure gas diffusion electrode. In some embodiments, bonding the first laminate structure gas diffusion electrode to the second laminate structure gas diffusion electrode comprises: providing the first laminate structure gas diffusion electrode and the second laminate structure gas diffusion electrode within a mechanical press apparatus; and applying mechanical pressure and heat to the planar portions of the first laminate structure gas diffusion electrode and the second laminate structure gas diffusion electrode using the mechanical press apparatus to form the seal between the planar portion of the first laminate structure gas diffusion electrode and the planar portion of the second laminate structure gas diffusion electrode. In some embodiments, the first laminate structure gas diffusion electrode and the second laminate structure gas diffusion electrode are formed on a continuous sheet that is assembled and sealed together along at least the first and second lateral sides of the electrodes.

Various embodiments may include a method of fabricating an electrode assembly, comprising: sealing a first laminate structure gas diffusion electrode against one or more sidewalls of a support frame on a first side of the support frame such that the first laminate gas diffusion electrode extends over a first side of an open region interior of the one or more sidewalls; and sealing a second laminate structure against the one or more sidewalls on a second side of the support frame such that the second laminate gas diffusion electrode extends over a second side of the open region interior of the one or more sidewalls. In some embodiments, the first laminate structure gas diffusion electrode and the second laminate structure gas diffusion electrode are sealed against the sidewalls under a negative pressure environment to promote infiltration of a sealant material into pores of the first and second laminate structure gas diffusion electrodes. Various embodiments may include a method of fabricating a large-area laminate structure gas diffusion electrode, comprising: folding over unlaminated portions of a first layer stack and a second layer stack to provide interlocking lateral edges of the first layer stack and the second layer stack, wherein each layer stack includes at least one active layer and at least one backing layer; and applying pressure and heat to the interlocking lateral edges to bond the interlocking lateral edges and form a seam the couples the first layer stack and the second layer stack.

Various embodiments may include a method of fabricating an electrode assembly, comprising: providing a first layer stack comprising at least one active layer and at least one backing layer and a second layer stack comprising at least one active layer and at least one backing layer; forming a first laminate structure gas diffusion electrode by applying pressure and heat to the first layer stack, and a second laminate structure gas diffusion electrode by applying pressure and heat to the second layer stack; bonding the first laminate structure gas diffusion electrode to the second laminate structure gas diffusion electrode to form an electrode assembly having a spacer between the first laminate structure gas diffusion electrode and the second laminate structure gas diffusion electrode; and removing the spacer from the electrode assembly to provide a cavity in the electrode assembly between the first laminate structure gas diffusion electrode and the second laminate structure gas diffusion electrode.

In some embodiments, the first and second laminate structure gas diffusion electrodes are formed and bonded together at the same time, and the method further comprises: providing the first layer stack, the second layer stack and the spacer in a thermal press apparatus such that the spacer is located between the first layer stack and the second layer stack, wherein the thermal press apparatus is used to apply sufficient heat and pressure to form and bond together the first and second laminate structure gas diffusion electrodes at the same time. In some embodiments, the method may further comprise: providing the first laminate structure gas diffusion electrode, the second laminate structure gas diffusion electrode, and the spacer in a thermal press apparatus such that the spacer is located between the first laminate structure gas diffusion electrode, the second laminate structure gas diffusion electrode, wherein the thermal press apparatus is used to apply sufficient heat and pressure to bond the first laminate structure gas diffusion electrode to the second laminate structure gas electrode. Various embodiments may include an electrode assembly, comprising: a support frame having one or more sidewalls around a periphery of the support frame and surrounding an open region interior of the one or more sidewalls; a first laminate structure gas diffusion electrode sealed to the one or more sidewalls of the support frame on a first face of the support frame; and a second laminate structure gas diffusion electrode sealed to the one or more sidewalls of the support frame on an opposite face of the support frame. In some embodiments, the first and second laminate structure gas diffusion electrodes are sealed to the respective first face and opposite face of the support frame using a first sealant material, and without thermal processing. In some embodiments, the first and second laminate structure gas diffusion electrodes are sealed to the respective first face and opposite face of the support frame using a first sealant material, and with thermal processing.

In some embodiments, the one or more support walls of the support frame comprise acrylonitrile butadiene styrene (ABS), and wherein the first sealant material comprises an ABS cement. In some embodiments, the one or more sidewalls comprise three H-channel structures that are configured to form at least three sides of a rectangle. In some embodiments, the rectangle comprises an open region configured to receive an insert defining at least one flow field for one or more of the first laminate structure gas diffusion electrode and the second laminate structure gas diffusion electrode. In some embodiments, the H-channel structures are configured to receive a second sealant material. In some embodiments, the second sealant material comprises an epoxy. In some embodiments, each of the first and second laminate structure gas diffusion electrodes includes at least one active layer, at least one backing layer, an embedded current collector. Some embodiments may include a battery, comprising: a housing; a liquid electrolyte within the housing; an anode electrode within the housing and at least partially submerged within the liquid electrolyte; and an electrode assembly according to any one or more of the embodiments as discussed within this paragraph, the electrode assembly within the housing, such electrode assembly and at least partially submerged within the liquid electrolyte.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. An electrode assembly, comprising:
a first electrode comprising a planar portion, a bottom peripheral edge, a top peripheral edge, a first lateral peripheral edge, a second lateral peripheral edge, a convex portion, and a raised portion, the planar portion of the first electrode adjacent to each one of the bottom peripheral edge, the first lateral peripheral edge, and the second lateral peripheral edge, the convex portion extending from the planar portion of the first electrode to the raised portion-in a central region and extending to the top peripheral edge; and
a second member opposite the first electrode, the second member including a surface, the planar portion of the first electrode contacting and sealed against the surface of the second member, and the first electrode and the second member defining an internal chamber therebetween, wherein
the second member comprises a second electrode, the second electrode comprises a planar portion, a convex portion, and a raised portion, the planar portion of the second electrode adjacent to the bottom peripheral edge, the first lateral peripheral edge, and the second lateral peripheral edge of the first electrode, the convex portion of the second electrode extending from the planar portion of the second electrode to the raised portion of the second electrode, the raised portion in a central region of the second electrode and extending to the top peripheral edge of the first electrode,
the first electrode and the second electrode each comprise a respective laminate structure gas diffusion electrode, each laminate structure gas diffusion electrode comprising an active layer and at least one backing layer,
the respective laminate structure gas diffusion electrode of each one of the first electrode and the second electrode has an embedded current collector, and
the embedded current collector electrically contacts a bus bar within the internal chamber.

2. The electrode assembly of claim 1, wherein the first electrode and the second electrode each comprise a respective Oxygen Reduction Reaction (ORR)-electrode.

3. The electrode assembly of claim 1, wherein the respective active layer of each of the first electrode and the second electrode comprises a hydrophilic surface and the respective backing layer of each of the first electrode and the second electrode comprises a hydrophobic surface.

4. The electrode assembly of claim 1, wherein the respective active layer of each one of the first electrode and the second electrode is spaced away from each of the bottom peripheral edge, the first lateral peripheral edge, and the second lateral peripheral edge.

5. The electrode assembly of claim 4, wherein the respective active layer of each one of the first electrode and the second electrode is spaced away from the top peripheral edge of the electrode assembly.

6. The electrode assembly of claim 1, wherein the raised portion of the first electrode comprises a textured, contoured, and/or roughened three-dimensional shape.

7. The electrode assembly of claim 1, further comprising a sealant material located between the planar portion of the first electrode and the surface of the second member.

8. The electrode assembly of claim 1, further comprising a sealant material over each one of the bottom peripheral edge, the first lateral peripheral edge, and the second lateral peripheral edge.

9. The electrode assembly of claim 8, wherein the sealant material comprises at least one of an epoxy paint, an epoxy dose, epoxy dip seal, a clip, a clamp, or an epoxy-lined tape.

10. A battery, comprising:
a housing;
a liquid electrolyte within the housing;
an anode electrode within the housing and at least partially submerged within the liquid electrolyte; and
an electrode assembly according to claim 1, the electrode assembly within the housing and at least partially submerged within the liquid electrolyte.

11. An electrode assembly, comprising:
a first electrode comprising a planar portion, a bottom peripheral edge, a top peripheral edge, a first lateral peripheral edge, a second lateral peripheral edge, a convex portion, and a raised portion, the planar portion of the first electrode adjacent to each one of the bottom peripheral edge, the first lateral peripheral edge, and the second lateral peripheral edge, the convex portion extending from the planar portion of the first electrode to the raised portion in a central region and extending to the top peripheral edge;
a second member opposite the first electrode, the second member including a surface, the planar portion of the first electrode contacting and sealed against the surface of the second member, and the first electrode and the second member defining an internal chamber therebetween,
wherein the second member comprises a second electrode, the second electrode comprises a planar portion, a convex portion, and a raised portion, the planar portion of the second electrode adjacent to the bottom peripheral edge, the first lateral peripheral edge, and the second lateral peripheral edge of the first electrode, the convex portion of the second electrode extending from the planar portion of the second electrode to the raised portion of the second electrode, the raised portion in a central region of the second electrode and extending to the top peripheral edge of the first electrode,
wherein the first electrode and the second electrode each comprise a respective laminate structure gas diffusion electrode, each laminate structure gas diffusion electrode comprising an active layer and at least one backing layer; and
an insert within the internal chamber and contacting the respective backing layer of each one of the first electrode and the second electrode, the insert defining air flow fields across the respective backing layer of each one of the first electrode and the second electrode.

12. A method of fabricating an electrode assembly, comprising:
providing a layer stack comprising at least one active layer and at least one backing layer;
forming a laminate structure gas diffusion electrode by applying pressure and heat to the layer stack, the laminate structure gas diffusion electrode including a planar portion adjacent to a bottom peripheral edge and first and second lateral peripheral edges of the laminate structure gas diffusion electrode, a convex portion extending from the planar portion to a raised portion of the laminate structure gas diffusion electrode located in a central region and extending adjacent to a top peripheral edge of the laminate structure gas diffusion electrode; and bonding the laminate structure gas diffusion electrode to a second member to seal the planar portion to the second member and form an electrode assembly having an internal chamber between the laminate structure gas diffusion electrode and the second member.

13. A method of fabricating a large-area laminate structure gas diffusion electrode, comprising:

folding over unlaminated portions of a first layer stack and a second layer stack to provide interlocking lateral edges of the first layer stack and the second layer stack, wherein each layer stack includes at least one active layer and at least one backing layer; and applying pressure and heat to the interlocking lateral edges to bond the interlocking lateral edges and form a seam that couples the first layer stack and the second layer stack.

* * * * *